United States Patent [19]

Shioya et al.

[11] Patent Number: 5,777,640
[45] Date of Patent: Jul. 7, 1998

[54] LIQUID JET RECORDING METHOD USING PLURAL SCANNING NOZZLES AND INCLUDING FIRST MAIN SCAN, SUB-SCAN, AND SECOND MAIN-SCAN STEPS FOR RECORDING PIXELS IN TONE

[75] Inventors: Makoto Shioya, Tokyo; Yasuyuki Tamura; Hiroto Takahashi, both of Yokohama; Masayoshi Tachihara, Chofu; Tadashi Yamamoto; Genji Inada, both of Yokohama; Tatsuo Kimura, Kawasaki; Jun Ashiwa, Yokohama, all of Japan

[73] Assignee: Canon Kabushiki Kaisha, Tokyo, Japan

[21] Appl. No.: 465,101

[22] Filed: Jun. 5, 1995

Related U.S. Application Data

[62] Division of Ser. No. 893,086, Jun. 3, 1992, Pat. No. 5,430,469.

[30] Foreign Application Priority Data

| | | | |
|---|---|---|---|
| Jun. 5, 1991 | [JP] | Japan | 3-134202 |
| Jun. 7, 1991 | [JP] | Japan | 3-136519 |
| Jun. 7, 1991 | [JP] | Japan | 3-136526 |
| Jun. 7, 1991 | [JP] | Japan | 3-136529 |
| Jun. 7, 1991 | [JP] | Japan | 3-136607 |
| Jun. 7, 1991 | [JP] | Japan | 3-136609 |
| Jun. 7, 1991 | [JP] | Japan | 3-136610 |
| Jun. 7, 1991 | [JP] | Japan | 3-136611 |

[51] Int. Cl.$^6$ ............................................ B41J 2/205
[52] U.S. Cl. ............................................ 347/15; 347/41
[58] Field of Search ............................................ 347/43, 41, 40, 347/15

[56] References Cited

U.S. PATENT DOCUMENTS 4,312,005  1/1982  Iwasaki .
4,313,124  1/1982  Hara .
4,345,262  8/1982  Shirato et al. .

(List continued on next page.)

FOREIGN PATENT DOCUMENTS

| | | | |
|---|---|---|---|
| 0104285 | 4/1984 | European Pat. Off. | H04N 1/18 |
| 0172592 | 2/1986 | European Pat. Off. | H04N 1/18 |
| 0300595 | 1/1989 | European Pat. Off. | B41J 3/04 |
| 0376596 | 7/1990 | European Pat. Off. | B41J 2/05 |
| 54-056847 | 5/1979 | Japan | B41M 5/26 |
| 59-123670 | 7/1984 | Japan | B41J 3/04 |
| 59-138461 | 8/1984 | Japan | B41J 3/04 |
| 60-071260 | 4/1985 | Japan | B41J 3/04 |
| 63-120660 | 5/1988 | Japan | B41J 3/04 |
| 2004523 | 1/1990 | Japan | B41J 2/21 |

Primary Examiner—Joseph W. Hartary
Attorney, Agent, or Firm—Fitzpatrick, Cella, Harper & Scinto

[57] ABSTRACT

A liquid jet recording method for recording on a recording material with liquid droplets discharged through plural scanning nozzles arranged in a width measured in a direction of main scan. The recording method includes a first main scan by relative movement between the nozzles and the recording material, in which pixels are recorded with numbers of droplets through a nozzle, the numbers of droplets corresponding to respective tone signals. The method also includes a sub-scan by relative movement between the nozzles and the recording material in a direction crossing with a movement direction of the first main scan. The method further includes a second main scan in which the pixels are recorded with numbers of droplets through a different nozzle, the latter numbers of droplets corresponding to tone level signals. The sub-scan and second main scan steps are repeated to record a tone image by discharging plural droplets for a pixel.

8 Claims, 43 Drawing Sheets

U.S. PATENT DOCUMENTS

| | | |
|---|---|---|
| 4,401,991 | 8/1983 | Martin . |
| 4,459,600 | 7/1984 | Sato et al. . |
| 4,463,359 | 7/1984 | Ayata et al. . |
| 4,528,576 | 7/1985 | Koumura et al. . |
| 4,540,996 | 9/1985 | Saito ......... 347/43 |
| 4,558,333 | 12/1985 | Sugitani et al. . |
| 4,608,577 | 8/1986 | Hori . |
| 4,622,561 | 11/1986 | Koike . |
| 4,723,129 | 2/1988 | Endo et al. . |
| 4,728,968 | 3/1988 | Hillmann ......... 347/43 |
| 4,740,796 | 4/1988 | Endo et al. . |
| 4,746,935 | 5/1988 | Allen . |
| 4,812,859 | 3/1989 | Chan et al. . |
| 4,855,752 | 8/1989 | Bergstedt ......... 347/43 |
| 4,963,882 | 10/1990 | Hickman . |
| 4,967,203 | 10/1990 | Doan et al. . |
| 4,999,646 | 3/1991 | Trask . |
| 5,121,142 | 6/1992 | Iwazawa ......... 347/41 |
| 5,300,950 | 4/1994 | Lopez ......... 347/41 |
| 5,384,587 | 1/1995 | Takagi et al. . |

|       (a)       |       (b)       |       (c)       |       (d)       |
|-----------------|-----------------|-----------------|-----------------|
| 1ST SCAN        | 2ND SCAN        | 3RD SCAN        | 4TH SCAN ······ |

```
   (a)              (b)              (c)              (d)

1ST SCAN        2ND SCAN         3RD SCAN         4TH SCAN   ······

121 OOOOOOOO    113 ⦿⦿⦿⦿⦿⦿⦿⦿    105 ●●●●●●●●    97 ********
    OOOOOOOO        ⦿⦿⦿⦿⦿⦿⦿⦿        ●●●●●●●●       ********
    OOOOOOOO        ⦿⦿⦿⦿⦿⦿⦿⦿        ●●●●●●●●       ********
    OOOOOOOO        ⦿⦿⦿⦿⦿⦿⦿⦿        ●●●●●●●●       ********
    OOOOOOOO        ⦿⦿⦿⦿⦿⦿⦿⦿        ●●●●●●●●       ********
    OOOOOOOO        ⦿⦿⦿⦿⦿⦿⦿⦿        ●●●●●●●●       ********
    OOOOOOOO        ⦿⦿⦿⦿⦿⦿⦿⦿        ●●●●●●●●       ********
128 OOOOOOOO    120 ⦿⦿⦿⦿⦿⦿⦿⦿    112 ●●●●●●●●    104 ******** 8
NZL #           121 OOOOOOOO    113 ⦿⦿⦿⦿⦿⦿⦿⦿    105 ●●●●●●●● 9
                    OOOOOOOO        ⦿⦿⦿⦿⦿⦿⦿⦿        ●●●●●●●●
                    OOOOOOOO        ⦿⦿⦿⦿⦿⦿⦿⦿        ●●●●●●●●
                    OOOOOOOO        ⦿⦿⦿⦿⦿⦿⦿⦿        ●●●●●●●●
                    OOOOOOOO        ⦿⦿⦿⦿⦿⦿⦿⦿        ●●●●●●●●
                    OOOOOOOO        ⦿⦿⦿⦿⦿⦿⦿⦿        ●●●●●●●●
                    OOOOOOOO        ⦿⦿⦿⦿⦿⦿⦿⦿        ●●●●●●●●
                128 OOOOOOOO    120 ⦿⦿⦿⦿⦿⦿⦿⦿    112 ●●●●●●●● 16
                NZL #           121 OOOOOOOO    113 ⦿⦿⦿⦿⦿⦿⦿⦿ 17
                                    OOOOOOOO        ⦿⦿⦿⦿⦿⦿⦿⦿
                                    OOOOOOOO        ⦿⦿⦿⦿⦿⦿⦿⦿
                                    OOOOOOOO        ⦿⦿⦿⦿⦿⦿⦿⦿
                                    OOOOOOOO        ⦿⦿⦿⦿⦿⦿⦿⦿
                                    OOOOOOOO        ⦿⦿⦿⦿⦿⦿⦿⦿
                                    OOOOOOOO        ⦿⦿⦿⦿⦿⦿⦿⦿
                                128 OOOOOOOO    120 ⦿⦿⦿⦿⦿⦿⦿⦿ 24
                                NZL #           121 OOOOOOOO 25
                                                    OOOOOOOO
                                                    OOOOOOOO
                                                    OOOOOOOO
                                                    OOOOOOOO
                                                    OOOOOOOO
                                                    OOOOOOOO
                                                128 OOOOOOOO 32
                                                NZL #    PXL #
```

O BY 0-1 DROP
⦿ BY 0-2 DROP
● BY 0-3 DROP
* BY 0-4 DROP

1ST SCAN  2ND SCAN  3RD SCAN  4TH SCAN  ......

```
    (a) 1ST SCAN        (b) 2ND SCAN        (c) 3RD SCAN        (d) 4TH SCAN
    113 ⊚⊚⊚⊚⊚⊚⊚⊚        97 ********          81 ◆◆◆◆◆◆◆◆          75 ■■■■■■■■  1
        ⊚⊚⊚⊚⊚⊚⊚             ********             ◆◆◆◆◆◆◆             ■■■■■■■■
        . . . . . . . .     . . . . . . . .     . . . . . . . .     . . . . . . . .
        . . . . . . . .     . . . . . . . .     . . . . . . . .     . . . . . . . .
        . . . . . . . .     . . . . . . . .     . . . . . . . .     . . . . . . . .
        ⊚⊚⊚⊚⊚⊚⊚             ********             ◆◆◆◆◆◆◆             ■■■■■■■■
    128 ⊚⊚⊚⊚⊚⊚⊚⊚        112 ********          96 ◆◆◆◆◆◆◆◆          80 ■■■■■■■■  16
        NZL #           113 ⊚⊚⊚⊚⊚⊚⊚⊚         97 ********          81 ◆◆◆◆◆◆◆◆  17
                            ⊚⊚⊚⊚⊚⊚⊚             ********             ◆◆◆◆◆◆◆
                            . . . . . . . .     . . . . . . . .     . . . . . . . .
                            . . . . . . . .     . . . . . . . .     . . . . . . . .
                            . . . . . . . .     . . . . . . . .     . . . . . . . .
                            ⊚⊚⊚⊚⊚⊚⊚             ********             ◆◆◆◆◆◆◆
                        128 ⊚⊚⊚⊚⊚⊚⊚⊚        112 ********          96 ◆◆◆◆◆◆◆◆  32
                            NZL #           113 ⊚⊚⊚⊚⊚⊚⊚⊚         97 ********  33
                                                ⊚⊚⊚⊚⊚⊚⊚             ********
                                                . . . . . . . .     . . . . . . . .
                                                . . . . . . . .     . . . . . . . .
                                                ⊚⊚⊚⊚⊚⊚⊚             ********
                                            128 ⊚⊚⊚⊚⊚⊚⊚⊚        112 ********  48
                                                NZL #           113 ⊚⊚⊚⊚⊚⊚⊚⊚  49
                                                                    ⊚⊚⊚⊚⊚⊚⊚
                                                                    . . . . . . . .
                                                                    . . . . . . . .
                                                                    ⊚⊚⊚⊚⊚⊚⊚
                                                                128 ⊚⊚⊚⊚⊚⊚⊚⊚  64
                                                                    NZL #    PXL #
```

⊚ BY 0-2 DROP
* BY 0-4 DROP
◆ BY 0-6 DROP
■ BY 0-8 DROP

FIG. 8

|  | EMB 1 | EMB 2 | EMB 3 | EMB 4 | EMB 5 | EMB 6 |
|---|---|---|---|---|---|---|
| NOZZLE No. (n) | 128 | 512 | 256 | 128 | 129 | 128 |
| MAX DROP No. (k) PER 1 PXL & 1 SCAN | 1 | 1 | 1 | 2 | 1 | 4 |
| SCAN No. (n) FOR 1 PXL | 16 | 8 | 16 | 8 | 3 | 4 |
| TONE LEVEL No.-1 (g-1) | 16 | 8 | 16 | 16 | 3 | 16 |
| SUB-SCAN (NOZZLE No.) (s) | 8 | 64 | 16 | 16 | 43 | 32 |
| REC SYSTEM | SER. | DRUM | DRUM (SPIRAL) | SER. | DRUM (SPIRAL) | SER. |

FIG. 10

| $k_{x,y}$ | 16 | 15 | 14 | 13 | 12 | 11 | 10 | | 2 | 1 | 0 |
|---|---|---|---|---|---|---|---|---|---|---|---|
| $A_1$ | 4 | 4 | 4 | 4 | 3 | 3 | 3 | | 1 | 1 | 0 |
| $A_2$ | 4 | 4 | 4 | 4 | 3 | 3 | 3 | | 1 | 0 | 0 |
| $A_3$ | 4 | 4 | 4 | 4 | 3 | 3 | 3 | | 0 | 0 | 0 |
| $A_4$ | 4 | 3 | 2 | 1 | 3 | 2 | 1 | | 0 | 0 | 0 |

FIG. 11

|   (a)    |   (b)    |   (c)    |   (d)    |
|----------|----------|----------|----------|
| 1ST SCAN | 2ND SCAN | 3RD SCAN | 4TH SCAN ....... |

⊚ BY 0-2 DROP
∗ BY 0-4 DROP
◆ BY 0-6 DROP

FIG. 14

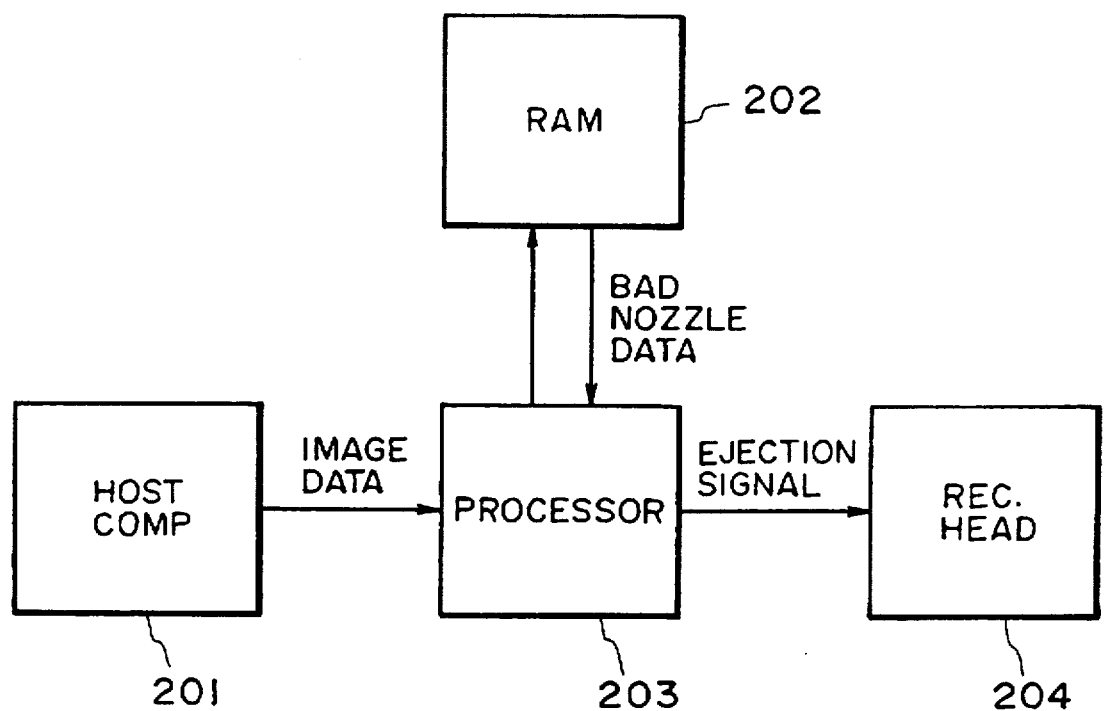
F I G. 17

| f(m,n) = 1 ··· EJECTED | | | | | | | | | | | | | | | | |
|---|---|---|---|---|---|---|---|---|---|---|---|---|---|---|---|---|
| | | | | | | n TH DROPS | | | | | | | | | | |
| m \ n | 1 | 2 | 3 | 4 | 5 | 6 | 7 | 8 | 9 | 10 | 11 | 12 | 13 | 14 | 15 | 16 |
| 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 |
| 2 | 0 | 1 | 1 | 0 | 0 | 0 | 0 | 0 | 0 | 0 | 0 | 0 | 0 | 0 | 0 | 0 |
| 3 | 0 | 0 | 0 | 1 | 1 | 1 | 0 | 0 | 0 | 0 | 0 | 0 | 0 | 0 | 0 | 0 |
| 4 | 0 | 0 | 0 | 0 | 0 | 0 | 1 | 1 | 1 | 1 | 0 | 0 | 0 | 0 | 0 | 0 |
| 5 | 0 | 0 | 0 | 0 | 0 | 0 | 0 | 0 | 0 | 0 | 1 | 1 | 1 | 1 | 1 | 0 |
| 6 | 1 | 1 | 1 | 1 | 1 | 0 | 0 | 0 | 0 | 0 | 0 | 0 | 0 | 0 | 0 | 1 |
| 7 | 0 | 0 | 0 | 0 | 0 | 1 | 1 | 1 | 1 | 1 | 1 | 1 | 0 | 0 | 0 | 0 |
| 8 | 1 | 1 | 1 | 1 | 0 | 0 | 0 | 0 | 0 | 0 | 0 | 0 | 1 | 1 | 1 | 1 |
| 9 | 0 | 0 | 0 | 0 | 1 | 1 | 1 | 1 | 1 | 1 | 1 | 1 | 0 | 0 | 0 | 0 |
| 10 | 1 | 1 | 1 | 1 | 1 | 1 | 1 | 0 | 0 | 0 | 0 | 0 | 0 | 1 | 1 | 1 |
| 11 | 1 | 1 | 0 | 0 | 0 | 0 | 0 | 1 | 1 | 1 | 1 | 1 | 1 | 1 | 1 | 1 |
| 12 | 0 | 0 | 1 | 1 | 1 | 1 | 1 | 1 | 1 | 1 | 1 | 1 | 1 | 1 | 0 | 0 |
| 13 | 1 | 1 | 1 | 1 | 1 | 1 | 1 | 1 | 1 | 1 | 1 | 0 | 0 | 0 | 1 | 1 |
| 14 | 1 | 1 | 1 | 1 | 1 | 1 | 1 | 1 | 1 | 0 | 0 | 1 | 1 | 1 | 1 | 1 |
| 15 | 1 | 1 | 1 | 1 | 1 | 1 | 1 | 1 | 0 | 1 | 1 | 1 | 1 | 1 | 1 | 1 |
| 16 | 1 | 1 | 1 | 1 | 1 | 1 | 1 | 1 | 1 | 1 | 1 | 1 | 1 | 1 | 1 | 1 |
| $\sum_{m=0}^{N} f(m,n)$ | 9 | 9 | 9 | 9 | 9 | 9 | 9 | 9 | 8 | 8 | 8 | 8 | 8 | 8 | 8 | 8 |

FIG. 18

| f(m,n) = 1 ··· EJECTED  f(m,n) = 0 ··· NOT EJECTED |||||
|---|---|---|---|---|
| n  m | n TH DROP |||| 
|  | 1 | 2 | 3 | 4 |
| TONE 0 | 0 | 0 | 0 | 0 |
| 1 | 1 | 0 | 0 | 0 |
| 2 | 0 | 1 | 1 | 0 |
| 3 | 0 | 1 | 1 | 1 |
| 4 | 1 | 1 | 1 | 1 |
| $\sum_{m=0}^{N} f(m,n)$ | 2 | 3 | 3 | 2 |

F I G. 19

| TONE m | O D |
|---|---|
| 0 | 0.02 |
| 1 | 0.55 |
| 2 | 0.95 |
| 3 | 1.24 |
| 4 | 1.38 |

F I G. 20

| f(m,n) = 1 ··· EJECTED  f(m,n) = 0 ··· NOT EJECTED | | | | | | | | | | | | | | | | |
|---|---|---|---|---|---|---|---|---|---|---|---|---|---|---|---|---|
| m \ n | \multicolumn{16}{c}{n TH DROPS} |||||||||||||||
| | 1 | 2 | 3 | 4 | 5 | 6 | 7 | 8 | 9 | 10 | 11 | 12 | 13 | 14 | 15 | 16 |
| 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 |
| 2 | 0 | 0 | 1 | 0 | 1 | 0 | 0 | 0 | 0 | 0 | 0 | 0 | 0 | 0 | 0 | 0 |
| 3 | 0 | 0 | 0 | 0 | 0 | 0 | 1 | 0 | 1 | 0 | 1 | 0 | 0 | 0 | 0 | 0 |
| 4 | 1 | 0 | 0 | 0 | 0 | 0 | 0 | 0 | 0 | 0 | 0 | 0 | 1 | 0 | 1 | 0 |
| 5 | 0 | 0 | 0 | 0 | 1 | 0 | 1 | 0 | 1 | 0 | 1 | 0 | 1 | 0 | 0 | 0 |
| 6 | 1 | 0 | 1 | 0 | 1 | 0 | 1 | 0 | 1 | 0 | 0 | 0 | 0 | 0 | 1 | 0 |
| 7 | 1 | 0 | 1 | 0 | 1 | 0 | 1 | 0 | 1 | 0 | 1 | 0 | 0 | 0 | 1 | 0 |
| 8 | 1 | 0 | 1 | 0 | 1 | 0 | 1 | 0 | 1 | 0 | 1 | 0 | 1 | 0 | 1 | 0 |
| 9 | 1 | 0 | 1 | 0 | 1 | 0 | 1 | 0 | 1 | 0 | 1 | 0 | 1 | 1 | 1 | 0 |
| 10 | 1 | 0 | 1 | 0 | 1 | 0 | 1 | 0 | 1 | 0 | 1 | 1 | 1 | 1 | 1 | 0 |
| 11 | 1 | 1 | 1 | 1 | 1 | 0 | 1 | 0 | 1 | 0 | 1 | 0 | 1 | 0 | 1 | 1 |
| 12 | 1 | 0 | 1 | 0 | 1 | 1 | 1 | 1 | 1 | 1 | 1 | 1 | 1 | 0 | 1 | 0 |
| 13 | 1 | 1 | 1 | 1 | 1 | 1 | 1 | 0 | 1 | 0 | 1 | 0 | 1 | 1 | 1 | 1 |
| 14 | 1 | 1 | 1 | 0 | 1 | 0 | 1 | 1 | 1 | 1 | 1 | 1 | 1 | 1 | 1 | 1 |
| 15 | 1 | 0 | 1 | 1 | 1 | 1 | 1 | 1 | 1 | 1 | 1 | 1 | 1 | 1 | 1 | 1 |
| 16 | 1 | 1 | 1 | 1 | 1 | 1 | 1 | 1 | 1 | 1 | 1 | 1 | 1 | 1 | 1 | 1 |
| $\sum_{m=0}^{N} f(m,n)$ | 13 | 4 | 13 | 4 | 13 | 4 | 13 | 4 | 13 | 4 | 12 | 5 | 11 | 6 | 12 | 5 |
| SUM | 17 | 17 | 17 | 17 | 17 | 17 | 17 | 17 | 17 | 17 | 17 | 17 | 17 | 17 | 17 | 17 |

F I G. 21

|        (a)         |        (b)         |        (c)         |        (d)         |
| :---: | :---: | :---: | :---: |
| 1ST SCAN | 2ND SCAN | 3RD SCAN | 4TH SCAN ······ |

```
     (a)              (b)              (c)              (d)
  1ST SCAN         2ND SCAN         3RD SCAN         4TH SCAN ······

97 OOOOOOOO   65 ⊚⊚⊚⊚⊚⊚⊚⊚    33 ●●●●●●●●    1 ********  1
     OOOOOOOO      ⊚⊚⊚⊚⊚⊚⊚⊚       ●●●●●●●●      ********
     ········      ·········       ········       ·········
     ········      ·········       ········       ·········
     ········      ·········       ········       ·········
     OOOOOOOO      ⊚⊚⊚⊚⊚⊚⊚⊚       ●●●●●●●●      ********
 128 OOOOOOOO   96 ⊚⊚⊚⊚⊚⊚⊚⊚    64 ●●●●●●●●    32 ******** 32
  NZL #         97 OOOOOOOO    65 ⊚⊚⊚⊚⊚⊚⊚⊚   33 ●●●●●●●● 33
                   OOOOOOOO       ⊚⊚⊚⊚⊚⊚⊚⊚      ●●●●●●●●
                   ·········      ·········     ·········
                   ·········      ·········     ·········
                   ·········      ·········     ·········
                   OOOOOOOO       ⊚⊚⊚⊚⊚⊚⊚⊚      ●●●●●●●●
               128 OOOOOOOO    96 ⊚⊚⊚⊚⊚⊚⊚⊚   64 ●●●●●●●● 64
                NZL #          97 OOOOOOOO   65 ⊚⊚⊚⊚⊚⊚⊚⊚ 65
                                  OOOOOOOO      ⊚⊚⊚⊚⊚⊚⊚⊚
                                  ·········     ·········
                                  ·········     ·········
                                  ·········     ·········
                                  OOOOOOOO      ⊚⊚⊚⊚⊚⊚⊚⊚
                              128 OOOOOOOO   96 ⊚⊚⊚⊚⊚⊚⊚⊚ 96
                               NZL #         97 OOOOOOOO 97
                                                OOOOOOOO
                                                ·········
                                                ·········
                                                ·········
                                                OOOOOOOO
                                            128 OOOOOOOO 128
                                              NZL #      PXL #
```

O BY O-1 DROP
⊚ BY O-2 DROP
● BY O-3 DROP
* BY O-4 DROP

F I G. 24

| EJECTED DROP # | COMBINATION OF USED NOZZLES | TOTAL EJECTION (pl) |
|---|---|---|
| 1 | 1<br>33<br>65<br>97 | 8<br>10<br>10<br>12 |
| 2 | 1, 33<br>1, 65<br>1, 97<br>33, 65<br>33, 97<br>65, 97 | 18<br>18<br>20<br>20<br>22<br>22 |
| 3 | 1, 33, 65<br>1, 33, 67<br>1, 65, 97<br>33, 65, 97 | 28<br>30<br>30<br>32 |
| 4 | 1, 33, 65, 97 | 40 |

FIG. 26

| CONTENTS | % BY WEIGHT |
|---|---|
| DI ETHYLENE GLYCOL | 30 |
| WATER | 67 |
| C. I. HOOD BLACK 2 | 3 |

|       (a)        |       (b)        |       (c)        |
| :---: | :---: | :---: |
| 1ST SCAN | 2ND SCAN | 3RD SCAN |

○ BY O-2 DROP
◉ BY O-3 DROP

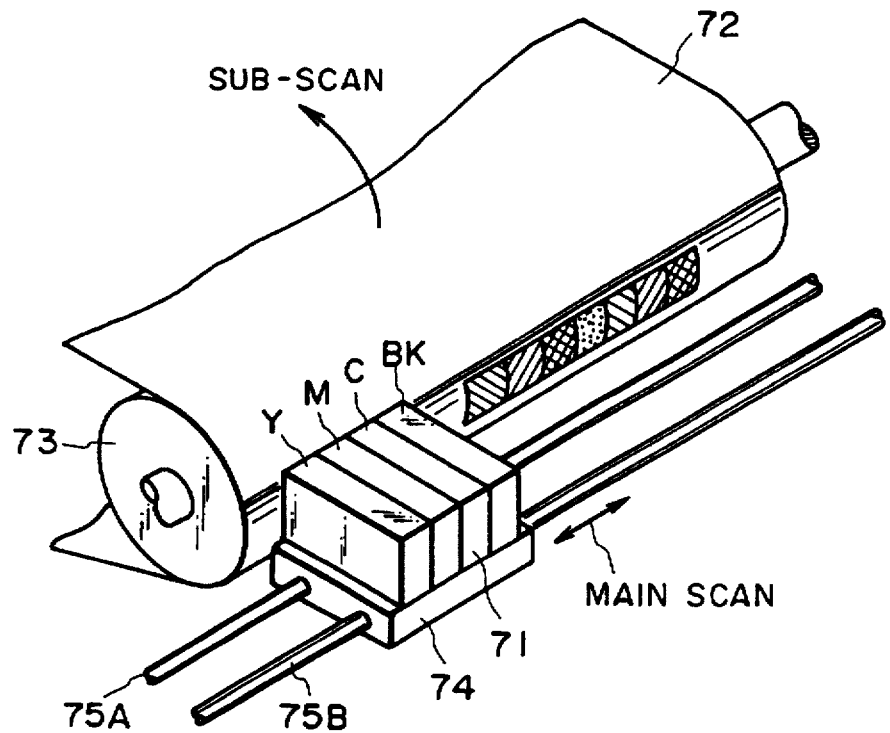
F I G. 45
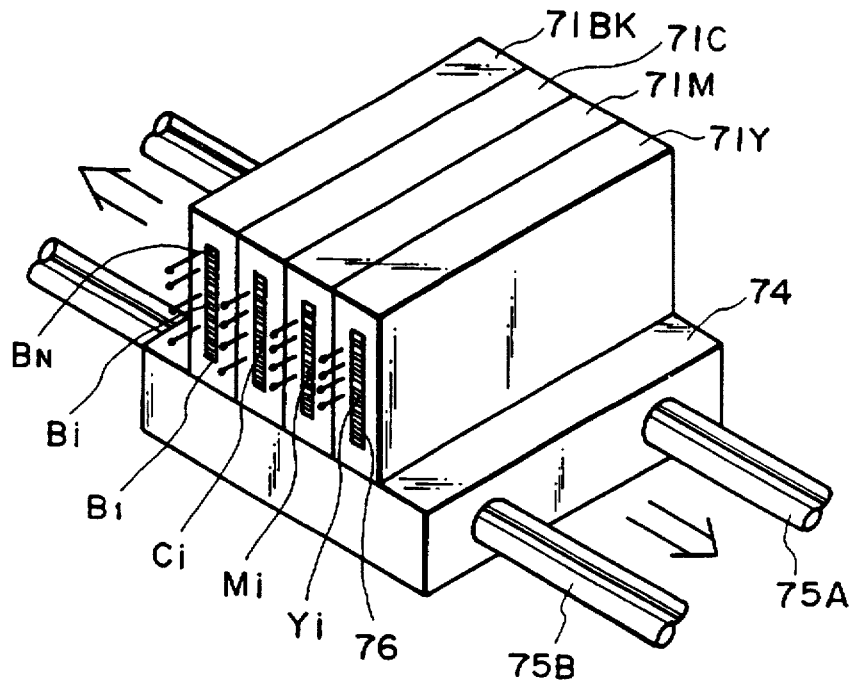
F I G. 46

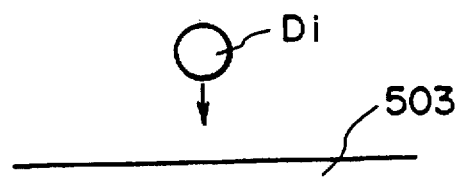
F I G. 49(a)
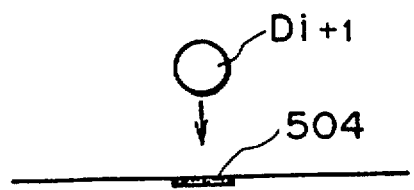
F I G. 49(b)
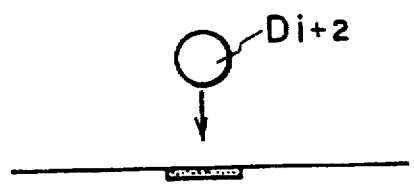
F I G. 49(c)
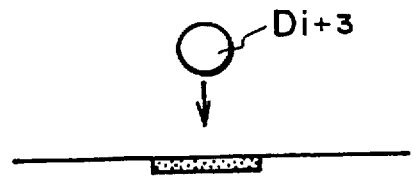
F I G. 49(d)
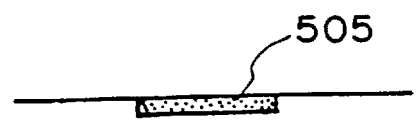
F I G. 49(e)

F I G. 51(a) SCAN 1 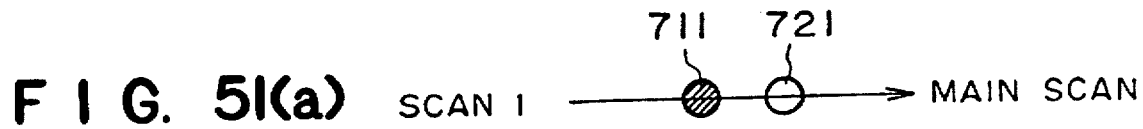
F I G. 51(b) SCAN 2 
F I G. 51(c) SCAN 3 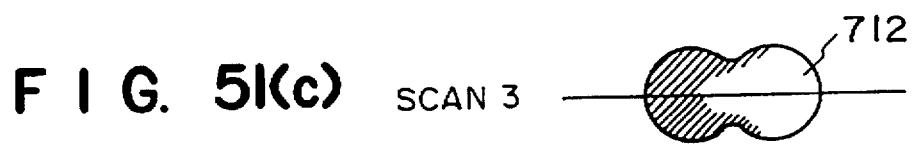
F I G. 53(a) SCAN 1 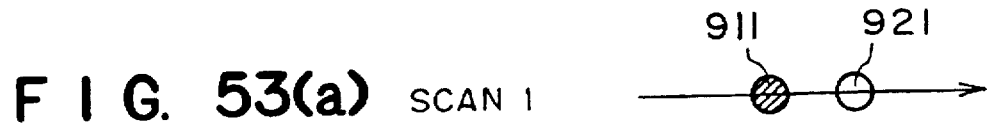
F I G. 53(b) SCAN 2 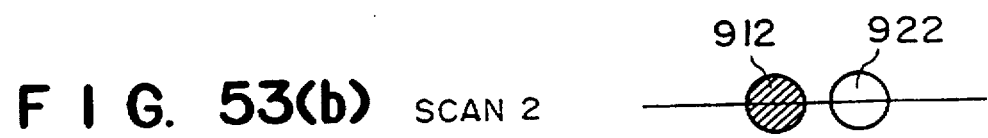
F I G. 53(c) SCAN 3 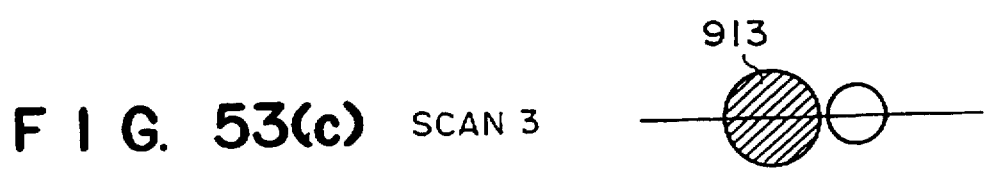
F I G. 53(d) SCAN 4 

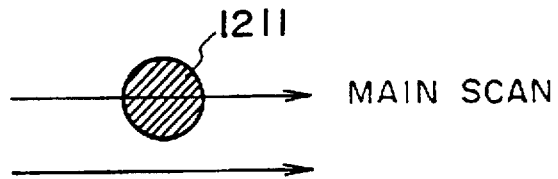
FIG. 56(a) SCAN 1
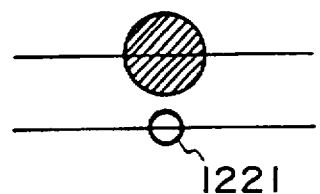
FIG. 56(b) SCAN 2
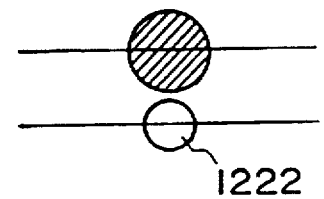
FIG. 56(c) SCAN 3
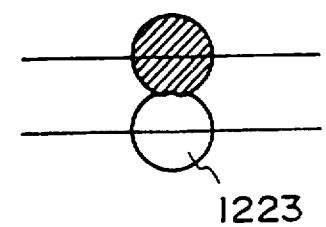
FIG. 56(d) SCAN 4

LIQUID JET RECORDING METHOD USING PLURAL SCANNING NOZZLES AND INCLUDING FIRST MAIN SCAN, SUB-SCAN, AND SECOND MAIN-SCAN STEPS FOR RECORDING PIXELS IN TONE

This application is a division of application Ser. No. 07/893,086 filed Jun. 3, 1992, allowed U.S. Pat. No. 5,430,469.

FIELD OF THE INVENTION AND RELATED ART

The present invention relates to an ink jet recording method and apparatus using an ink jet recording head having a plurality of ejection outlets (nozzles), capable of tone recording.

In an ink jet recording system using the recording head, the ink is ejected to a recording material in accordance with recording signals. The system is widely used because of the low running cost and the quietness. A great number of nozzles are arranged in a line extending perpendicular to the relative movement direction between the recording material and the recording head, and therefore, one scan of the recording head over the recording material can cover a recording width corresponding to the number of nozzles, so that the high speed recording is accomplished relatively easily.

When a tone gradation is to be provided in the ink jet recording system, it will be considered to change the size of liquid droplet ejected. However, there is no practical method for accomplishing this. Usually, therefore, the number of ink droplets per unit area is controlled on the basis of pseudo-half-tone image processing. In another method called "multi-droplet system", a smaller size ink droplet is used, and a plurality of such ink droplets are deposited substantially at the same point on the recording material to provide one recorded dot, in which the number of ink droplets is changed to reproduce the tone. This system permits the tone recording without reduction of the image resolution, and is particularly effective for the ink jet recording system in which difficulties arise in significantly changing the size of one liquid droplet.

However, in a conventional multi-droplet system, one picture element (pixel) is recorded by a plurality of ink droplets ejected from one and the same nozzle, and therefore, if there is a variation in the sizes of the ink droplets of the individual nozzles, a non-uniform image results which includes stripes and/or image density unevenness.

This problem becomes more significant where the number of nozzles of a recording head is increased to expand the recording width covered by one scan in an attempt to accomplish the high speed recording. The increase of the nozzle number and therefore the recording width results in a greater no frequency component of the spatial frequency of the unevenness, and therefore, in more conspicuous unevenness. Thus, the image quality is degraded. In the case of the tone recording, the unevenness is so conspicuous that only a several % variation among the ejection quantities of the nozzles is enough for one to recognize stripes caused by the density unevenness.

In order to avoid the problem, the conventional multi-droplet system requires very accurate head manufacturing in order to reduce the variation in the ejection quantities through the individual nozzles. This brings about high cost and low yield. As a method for removing the density unevenness through software, it is effective to change the number of ink ejections to compensate for the variation among the nozzles with the aid of image processing of error diffusing method or the like. However, such an image processing system results in increase of the system cost. In addition, even if such a processing is used, the number of ink droplets has to be readjusted if the variation among nozzles in the ink volumes changes with time. This makes the maintenance operation difficult. Furthermore, this method does not work where there is a non-ejection nozzle.

This system also involves the problem that the density unevenness is not sufficiently suppressed when the variation in the ink droplet volume is larger.

In order to accomplish a high quality tone recording of not less than 16 tone gradations in the above-described system, stabilized ink ejections with very small droplets are required. Therefore, the manufacturing accuracy of the recording head has to be very high, so that the manufacturing method is totally different from that for the bi-level recording heads. This results in high cost and low yield.

In the case of multi-droplet system of 3–5 tone gradations, the droplet size, volume or quantity is permitted to be relatively large as compared with that in the case of the 16 or more tone gradations. Therefore, the manufacturing tolerance in the recording head is so large that the same manufacturing method as in the bi-level recording head can be used. The cost can be reduced.

The image provided by the recording head having such a large number of tone gradations is better in the image quality than the image recorded by the bi-level recording head because the grains are not conspicuous. However, as compared with the image provided by the recording head having the 16 or like tone levels, particularly in the grains in the high light portions.

U.S. Pat. No. 4,746,935 proposes multi-tone ink jet printer capable of accomplishing the tone recording on the basis of combinations of 1 pl, 2 pl and 4 pl for one pixel. According to this proposal, 8 kinds of ink droplet volumes, i.e., 0, 1, 2, 1+2(=3), 4, 1+4(=5), 2+4(=6), 1+2+4(=7), can be provided by three kinds of ink droplets (volume ratio). Therefore, the printing speed is increased as compared with the case where one ink droplet is overlaid 7 times. However, as shown in FIG. 2 of the U.S. '935 Patent, the curve representing the relationship between the reflection density and the total volume of the ink droplets for one pixel is steep and convex-up. For this reason, even if the differences between adjacent total volumes of the ink for one picture element are the same, the differences, in the reflection density, corresponding thereto, are not the same. Therefore, in the zone where the volume of the ink droplet for one pixel is small, the differences of the adjacent possible reflection densities is large. On the contrary, in the zone where the volume of the ink droplet for one pixel is large, the difference between the possible reflection densities is small. In other words, the volume of the ink droplet does not significantly influence the tone gradation in the zone where the volume of the ink droplet for one pixel is large. In addition, since the number of combinations of different ink droplets for one picture element is large (8 combinations in the case of 1 pl, 2 pl and 4 pl), the image processing circuit becomes complicated with the result of high design and manufacturing cost.

Another problem of the ink jet printer of the U.S. Patent is that one recording head has to be provided with the nozzles having different ejection volumes, the difference being as large as 4 times (4 pl/1 pl), or 8 times in the case of 1 pl to 8 pl. In this case, the difficulties arise in the manufacturing of the recording head. Generally, the recording head parameters influential to the volume of the ink droplet ejected, a distance between the heater and the ejection outlet, a size of the heater, a configuration of the ink outlet or barrier and an ejection outlet area. In order to change the volume of the ink droplet from 1 to 4, the changes of the heater-outlet distance, the heater area and the ejection outlet area has to be changed. The manufacturing will be difficult only using the conventional practical method. Therefore, in order to accomplish such a recording head, a new process has to be added, with the result of increase of the manufacturing cost.

In the ink jet printer disclosed in the U.S. '935 Patent, the ink ejection outlets providing the different ejection volumes (1 pl, 2 pl, and 4 pl) are arranged along a scanning direction of the recording head and closely with each other at the front side of the recording head, so that the plural ink droplet ejections for a given one pixel can be effected through one scan. Therefore, the ink droplets are sequentially overlaid before the previous ink droplet has not yet seeped into or fixed on the recording material. In the image region in which the number of overlying droplets is large, the adjacent pixels are in contact with the result of feathering. If this occurs, the characters or the like become less clear. In the case of color image, the edges of the image becomes blurred by the feathering and ink mixture adjacent the edge of the monochromatic region, with the result of significant problem of the unacceptable degradation of the record quality.

In the case of color image in the ink jet recording head, there is a problem that the edges of the image is blurred due to the smear resulting from ink mixture before the fixing at the edge of the monochromatic region, particularly. In order to avoid this problem, in the pixel area modulating method such as dithering method, there are known methods in which special recording material having a coated layer of high ink-absorbing nature to prevent the color mixture for individual dots, or in which different color dots are arranged in a staggered fashion as a preventing method for individual picture elements. However, if such method as used as they are, the running cost for the image output is increased, or the image resolution is decreased due to the staggered arrangement.

The feathering or expansion of the ink in the recording material can be reduced by providing a certain length of fixing period. As a method using this, Japanese Laid-Open Patent Application No. 4523/1990 proposes that the recording material is scanned on the same line plural times, while the recording material is at rest, the number of scans being larger than the number of required colors. However, with this method, when black, yellow, magenta and cyan ink materials are used, the required time is 4 times with the result of significant reduction of the output speed.

On the other hand, in order to provide a wide tone gradation range with the multi-droplet system, the adjacent liquid droplets are not in contact with the result of less expansion of the liquid when the number of liquid droplets overlaid on the recording material is small, although a sufficiently small liquid droplet is required as compared with the bi-level recording. However, where the number of liquid droplets overlaid is large, the adjacent liquid dots are in contact with the result of the large expansion or feathering.

SUMMARY OF THE INVENTION

Accordingly, it is a principal object of the present invention to provide an ink jet recording method and apparatus in which the tone recording is improved.

It is another object of the present invention to provide an ink jet recording method and apparatus in which the tone recording is improved even if the ink droplet volumes are varied among the nozzles.

It is a further object of the present invention to provide an ink jet recording method and apparatus in which the tone recording is improved even if one or some nozzles failed.

It is a yet further object of the present invention to provide an ink jet recording method and apparatus in which uniform tone gradation can be provided despite property change of the recording head with time.

It is a yet further object of the present invention to provide an ink jet recording method and apparatus wherein the variations in the volumes of the ink droplets ejected through individual nozzles is reduced for any tone gradation to suppress the unevenness of the image.

It is a yet further object of the present invention to provide an ink jet recording method and apparatus in which the high quality tone recording without conspicuous grains is possible without extremely reducing the ink droplet volume.

It is a further object of the present invention to provide an ink jet recording method and apparatus in which a large number of tone gradation levels can be provided with a small number of droplets.

It is a yet further object of the present invention to provide an ink jet recording method and apparatus in which the expansion or feathering of the image dot is suppressed to provide desired colors of the image.

According to an aspect of the present invention, there is provided a liquid jet recording method of recording on a recording material with liquid droplets discharged through n ($n \geq 2$) scanning nozzles arranged at a first pitch p in a width measured in a direction of a sub-scan. The method includes the steps of performing a first main scan by relative movement between the n scanning nozzles and the recording material in which each of a plurality of pixels are recorded with at least one of the liquid droplets through one of the n scanning nozzles. A number of the liquid droplets used to record each pixel corresponds to respective tone level signals and is not more than k where $k \geq 1$. A sub-scan step is provided by a relative movement between the n scanning nozzles and the recording material in a direction substantially transverse to a direction of the first main scan, in which a distance s of the relative movement in the substantially transverse direction is less than the width. The method further includes the step of performing a second main scan in which each of the plurality of pixels is recorded with at least one of the liquid droplets through a different one of the n scanning nozzles, the number of the liquid droplets used to record each of the plurality of pixels in the second main scan corresponding to the respective tone level signals and being not more than k, wherein g is a number of tone levels and $g \geq 3$, and wherein the steps of performing the sub-scan and the second main scan are performed for at least $(g-1)/(k-1)$ times so as to record g tone images by discharging substantially a same volume of the liquid droplets of which a maximum number is $g-1$, for each of the plurality of pixels.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3a–3d illustrate the image formation process in the first embodiment.

FIGS. 7a–7d, 8a–8d and 9a–9d illustrate image formation processes in the third, fourth and fifth embodiments.

FIG. 10 illustrates the recording method in the first–sixth embodiments.

FIG. 11 is a table of ink droplet numbers for respective scans in the sixth embodiment.

FIGS. 14(a)–14d, 15 and 16 show the image formation process in the seventh, eighth and ninth embodiments.

FIG. 17 is a block diagram of a control system usable with the present invention.

FIGS. 18, 19 and 21 show tables of ink ejections capable of providing the tone gradation in the tenth, eleventh and twelfth embodiments.

FIG. 20 is a table of image densities corresponding to the tone gradation in the eleventh embodiment.

FIGS. 24a–24d illustrates the image forming process in the thirteenth embodiment.

FIG. 26 is a table for nozzle selection in the thirteenth embodiment.

FIGS. 31(a)–31(c) illustrates the image formation process in the sixteenth embodiment.

FIGS. 32(a)–32(c) shows the detail of the image formation in the sixteenth embodiment.

FIG. 45 is a perspective view of an major part of an ink jet recording apparatus according to an embodiment of the present invention.

FIG. 46 is a perspective view of a nozzle arrangement of the ink jet recording head of FIG. 45.

FIGS. 49(a)–49(e) is a side view illustrating image forming process.

FIG. 51 is a top plan view showing image formation process with the ejection signals applied in accordance with the timing of FIG. 50.

FIG. 53 is a top plan view illustrating image formation with the ejection signals applied with the timing of FIG. 52.

FIG. 56 is a top plan view illustrating image formation with the ejection signals at the timing of FIG. 55.

DESCRIPTION OF THE PREFERRED EMBODIMENTS

Referring to the accompanying drawings, the preferred embodiments of the present invention will be described in detail.

Embodiment 1

Figure 1:
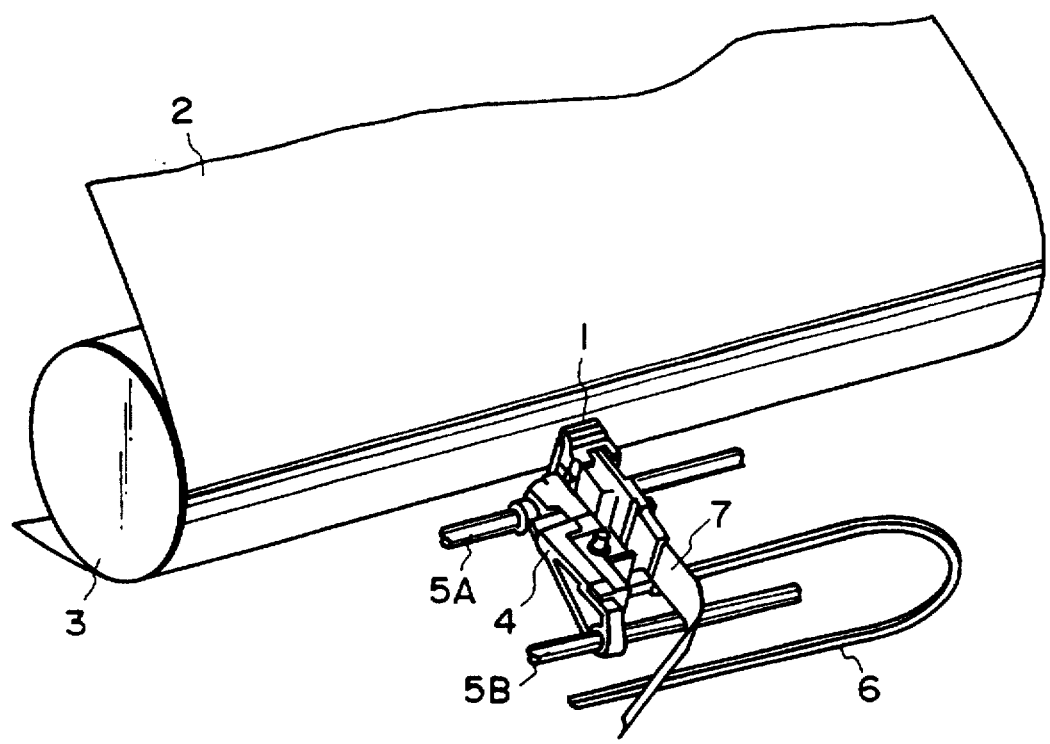
FIG. 1 is a perspective view of an ink jet recording apparatus according to an embodiment of the present invention.

FIG. 1 shows an ink jet recording apparatus according to this invention. It comprises a recording head 1 having 128 nozzles (ink ejection or discharging outlets) at the density of 16 nozzles/mm (400 dpi). Each of the nozzles is provided with a heater (heat generating element) in the liquid passage communicating with the associated nozzle to produce ink ejection energy. The heater generates heat in response to electric pulse signal applied thereto. Upon the electric pulse supply thereto, the film boiling occurs in the ink. With the expansion of the bubble created by the film boiling, the ink is ejected. In this example, the ejection frequency of each of the nozzles is 2 kHz, and therefore, the driving frequency for the heater is 2 kHz.

The recording apparatus further comprises a carriage 4 for carrying the recording head 1. The carriage 4 moves along the guiding shafts 5A and 5B. An ink supply tube 6 functions to supply the ink to the recording head 1 from an unshown ink container. A flexible cable 7 functions to supply driving signals and controlling signals from an unshown controller to a head driving circuit mounted on the recording head 1 in accordance with record data (image information). The ink supply tube 6 and the flexible cable 7 are made of flexible material capable of following the movement of the carriage 4.

To the carriage 4, an unshown belt extending in parallel with the guiding shafts 5A and 5B, is connected. The belt is driven by an unshown carriage motor, so that the carriage 4 is moved.

A platen 3 extends also in parallel with the guiding shafts 5A and 5B. Designated by a reference numeral 2 is a recording material. While the carriage 4 is moved, the recording head 1 eject the ink to the recording material 2 at the portion faced thereto to effect the recording operation.

Figure 2:
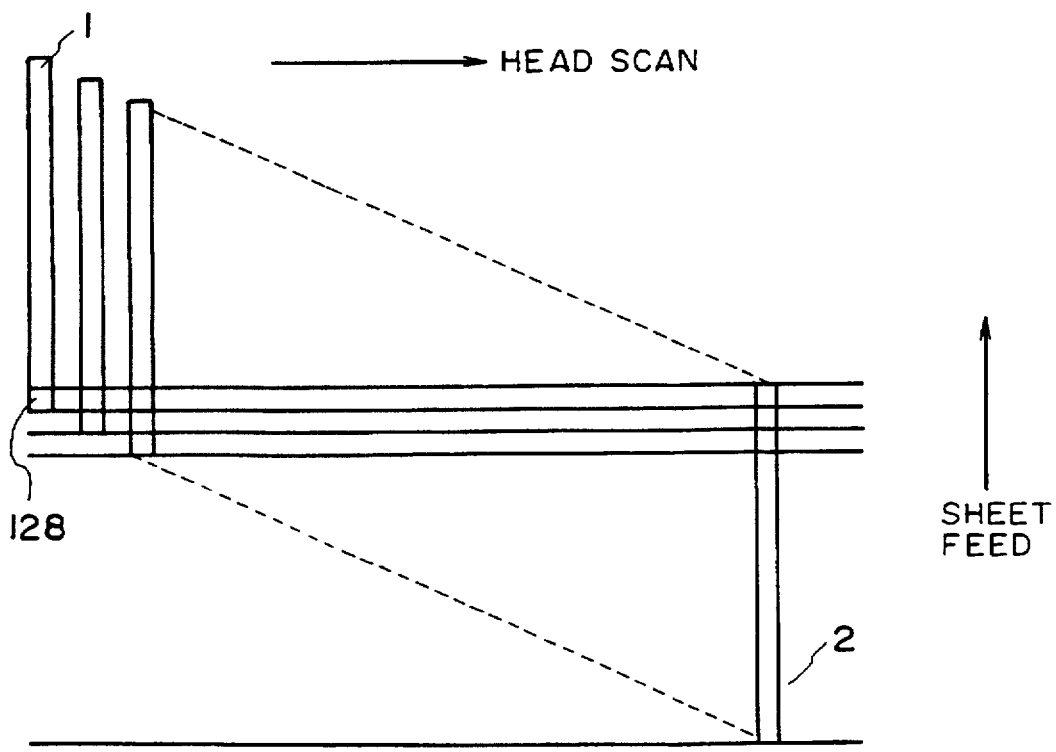
FIG. 2 illustrates a recording operation in the first embodiment.

The description will be made as to the method for 17 tone gradation recording, in which the number of liquid droplets per pixel is variable in the range of 0–16 inclusive. FIGS. 2 and 3 illustrate the concept of the recording method of this embodiment. The recording head 1 has vertically arranged 128 nozzles. For the convenience of explanation, the nozzles are identified by the numerals 1, 2, . . . , 128 from the top in this Figure.

In operation, while the carriage is moved at the speed of 31.75 mm/sec in the main scan direction, the recording operation is carried out using only nozzles Nos. 121–128. Then, as shown in FIG. 3 at portion (a), the pixels 1–8 (from the top of the recording material) are recorded 0 or 1 ink droplet. Subsequently, the recording material is fed upwardly (sub-scan direction) by a distance corresponding to 8 pixels (for the convenience of explanation, the recording head is shown as moving downwardly relative to the recording material in the Figure). Then, the recording operation is carried out using the nozzles Nos. 113–128. Then, as shown in FIG. 3 at portion (b), the nozzles Nos. 113–120 effect the recording on the picture elements 1–8 which have already been recorded by the nozzles Nos. 121–128 in the previous scan, and the nozzles Nos. 121–128 effect the recording on new picture elements 9–16. Thus, the picture elements 1–8 are recorded by 0–2 ink droplet per pixel.

Thereafter, the recording material (sheet) is fed upwardly by the distance corresponding to the 8 pixels, and then, the recording operation is carried out using the nozzles Nos. 105–128. By repeating sequentially such recording operations, the pixels 1–8 are recorded by 0–16 ink droplets per pixel, after 16 scanning operations are completed, as shown in FIG. 3 at portions (c) and (d). In this manner, 17 tone gradation recording is effected. The similar operations are repeated thereafter so that the 17-tone-gradation image is formed on the entire surface of the recording material. At the bottom of the image, each 8 nozzles is sequentially stopped from the bottom each time the scanning operation is completed.

Noting one pixel, No. 1 pixel, for example in the resultant image, the pixel receives the liquid, 0 or 1 from 16 nozzles, i.e., Nos. 1, 9, 17, 25, 33, 41, 49, 57, 65, 73, 81, 89, 97, 105, 113, 121 (the order of nozzle actuations is the opposite). Therefore, the variation of the ink ejection volume from the nozzles is averaged, so that the resultant image does not have any conspicuous stripe or unevenness, as contrasted to the image recorded through a conventional method in which one pixel is recorded by plural ink droplets from the same nozzle.

Embodiment 2

Figure 4:
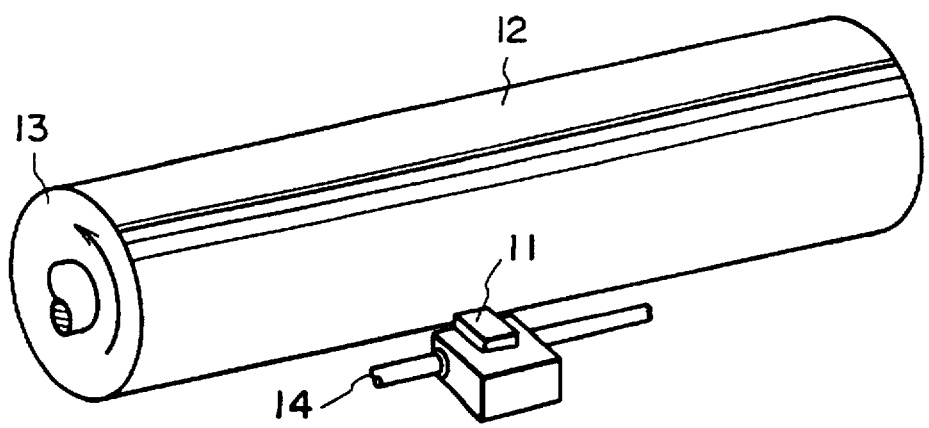
FIG. 4 is a perspective view of an ink jet recording apparatus according to a second embodiment of the present invention.

FIG. 4 is a perspective view of an ink jet recording apparatus of the second embodiment. A recording head 11 is a thermal energy ink jet recording head having 512 nozzles at the density of 16 nozzles/mm. The nozzles are arranged in the horizontal direction on the Figure. The recording head is movable along the rail 14. The recording material 12 is wrapped on a drum 13, which is rotated by an unshown motor.

Figure 5:
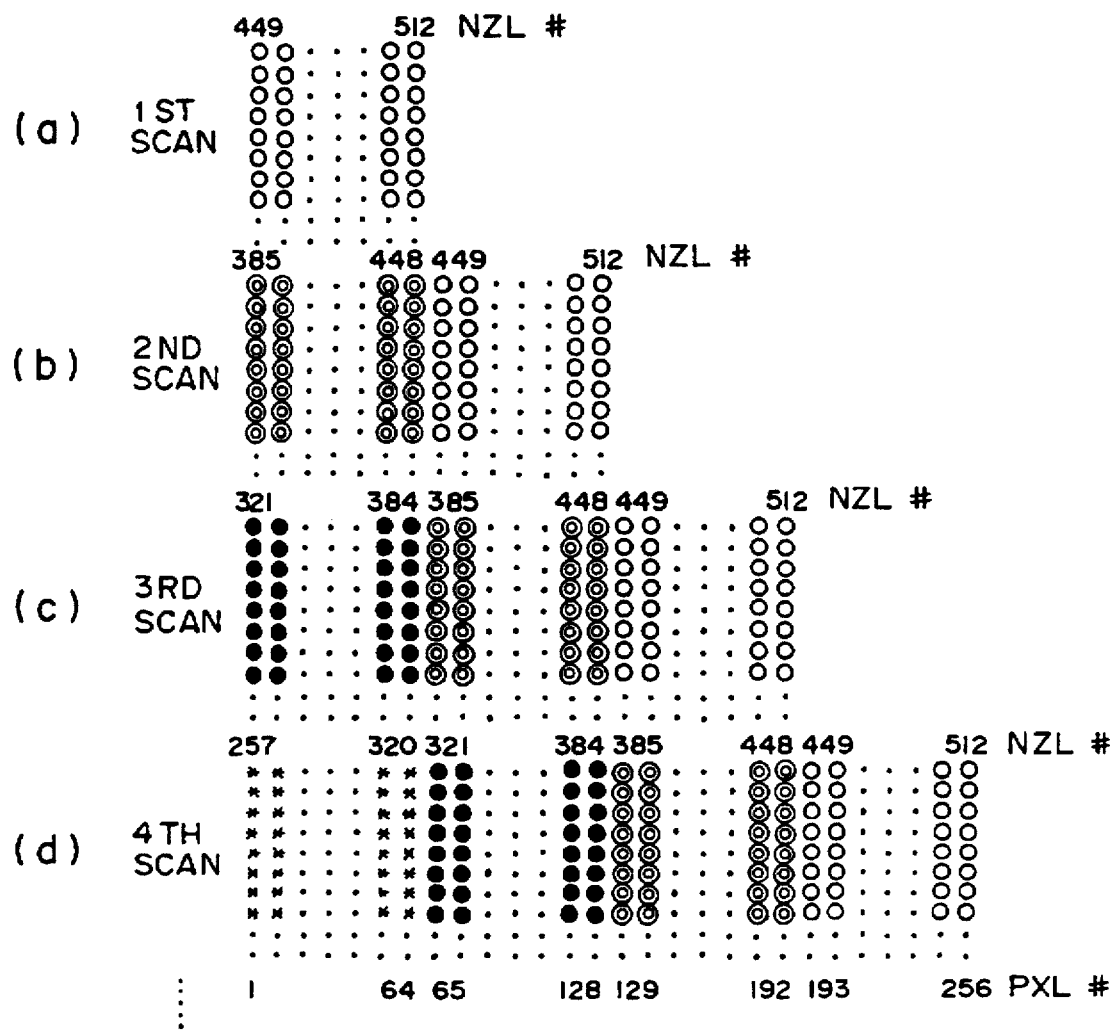
FIGS. 5a–5d represent the image formation process in the second embodiment.

Referring to FIG. 5, the image formation process will be described in this method to provide 9 tone gradation recording. First, the recording head 11 is moved to the leftmost position in FIG. 4. The recording operation is carried out using only 64 nozzles, i.e., nozzles Nos. 449–512, while the drum 13 is rotated one full turn (main scan) (FIG. 5, portion (a)). Then, the recording head 11 is moved to the right by a distance corresponding to 64 pixels (sub-scan direction). Then, the recording operation is carried out using nozzles Nos. 385–512, while rotating the drum 13 through one turn (FIG. 5, portion(b)). The rightward movement of the recording head 11 and the rotation of the drum 13, are repeated to effect the recording on the recording material.

As a result, the first pixel, for example, is recorded by 8 nozzles, i.e., nozzles Nos. 1, 65, 129, 193, 257, 321, 385 and 449. The 9 level tone recording is effected by 0–8 droplets of the ink.

Various images have been recorded with this method, and it has been confirmed that uniform and sharp images are provided without stripe.

Embodiment 3

In this embodiment, 17 tone gradation recording is possible. The structures of the apparatus are the same as that of the second embodiment except for the recording head. The recording head 11 has 256 nozzles, each of which ejects a smaller volume of ink droplet than in the second embodiment.

Figure 6:
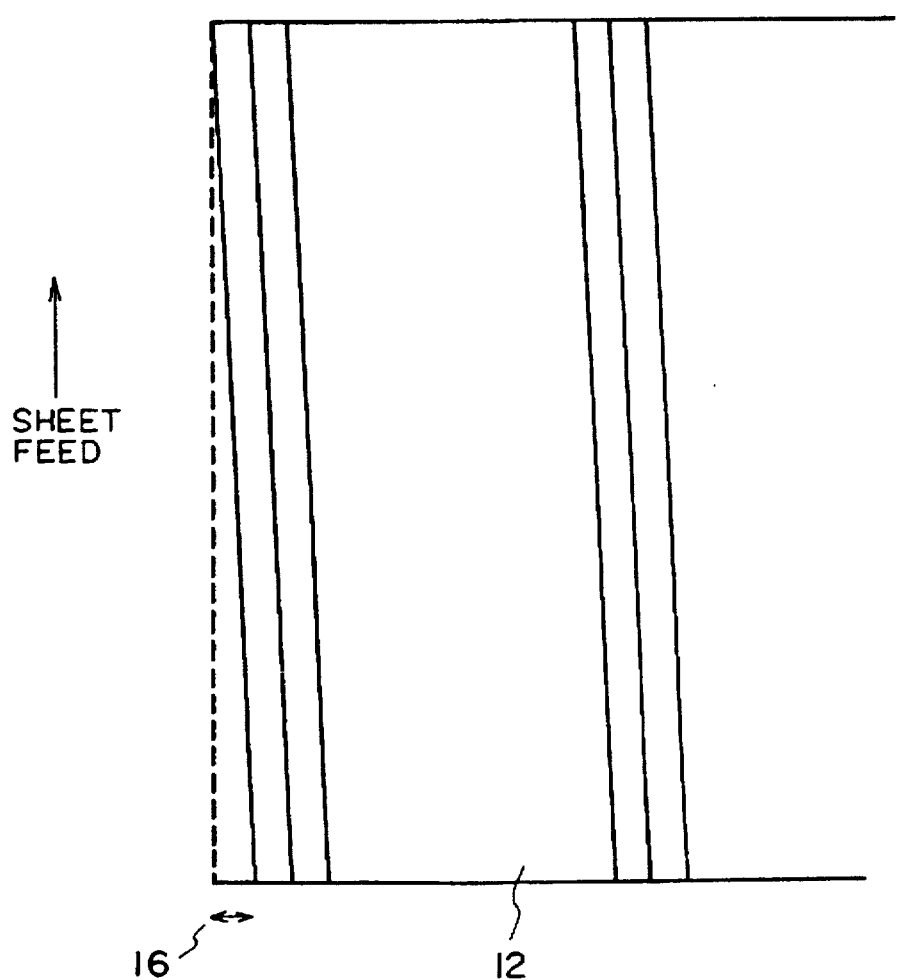
FIG. 6 illustrates a recording operation in the third embodiment.
Figure 7:
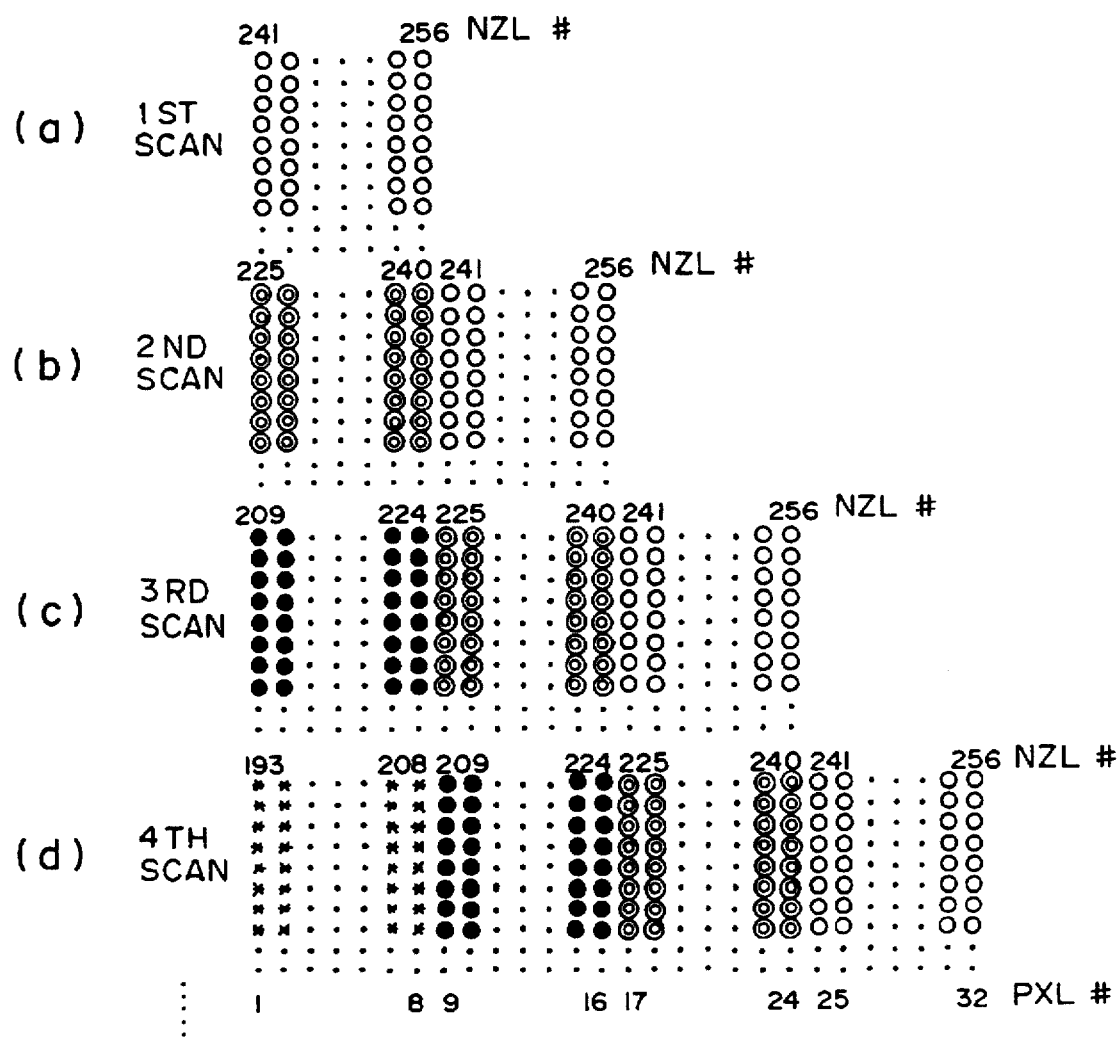

FIG. 6 shows the concept of the recording in this embodiment. In this Figure, the recording material 12 is removed from the drum 13, and is expanded vertically. The position of the recording head 11 is designated by a reference numeral 11a. In this embodiment, the recording head 11 moves to the right (sub-scan direction) when the drum 13 rotates (main scan direction). The movement speed is such that the recording head 11 moves to the right by the distance corresponding to 16 pixels when the drum 1 rotates one full turn. In other words, the continuous motion is used such that the recording head 11 is at a position 1b at the start of the second rotation of the drum 13 and at a position 1c at the start of the third rotation. As a result, the recording operation is effected along a helical line on the drum. Similarly to the first and second embodiment, any one pixel is recorded by plural different nozzles. The image formation process is shown in FIG. 7. Various images have been recorded, and it has been confirmed that the images are substantially free from stripe and unevenness.

In this embodiment, the image is slightly oblique, but the inclination is 16 (pixels)/image size, and therefore, when, for example, the image size is 200 mm, the inclination is as small as 0.3 degrees which is not noticeable by human eyes. If the recording material 12 is inclined in the opposite direction when it is mounted on the drum 13, the deviation is compensated for, and therefore, the image is free from inclination.

Embodiment 4

The same recording apparatus and recording head 1 as in Embodiment 1 (FIG. 1) was used, but the recording method was different. The number of toner gradation levels was 17 in this embodiment.

FIG. 8 shows the image formation process in this embodiment.

In operation for recording on the recording material 2, the carriage 4 is moved (main scan) using nozzles Nos. 113–128 (16 nozzles). Each of the nozzles ejects 0, 1 or 2 ink droplets per pixel in accordance with the image density (FIG. 8, portion (a)). Then, the recording medium 2 is fed upwardly (sub-scan) through a distance corresponding to 16 pixels. Subsequently, the recording operation is carried out using nozzles Nos. 97–128. At this time, the nozzles Nos. 97–112 effect additional recording on the pixels 1–16 which have been subjected to the recording operation by the nozzles 113–128 during the previous scan, whereas the nozzles Nos. 113–128 effect recording on the new pixels 17–32 (FIG. 8, portion (b)). Therefore, each of the pixels 1–16 is recorded by 0–4 droplets of the ink.

Then, the recording material 2 is fed upwardly through the distance of 16 pixels, and the recording operation is carried out using the nozzles Nos. 81–128 (FIG. 8, portion (c)). By repeating this printing operation, each of the pixels 1–16 is recorded by 0–16 droplets of the ink after completion of the eighth scan. Thus, 17 tone gradation record is provided. The same operation is repeated from the ninth scan so as to provide the 17 tone level image is provided on the entire surface.

Various images have been recorded through this recording method, and it has been confirmed that the sharp and uniform images can be provided without stripe.

In this embodiment, the selectable number of ink droplets is 3 (0, 1, 2) per picture element during one scan, but it may be larger.

Embodiment 5

In this embodiment, only the recording head 11 is different from Embodiment 3 apparatus. The number of tone gradations is 4. The recording head 11 has 129 nozzles and ejects large volume droplets.

Figure 9:
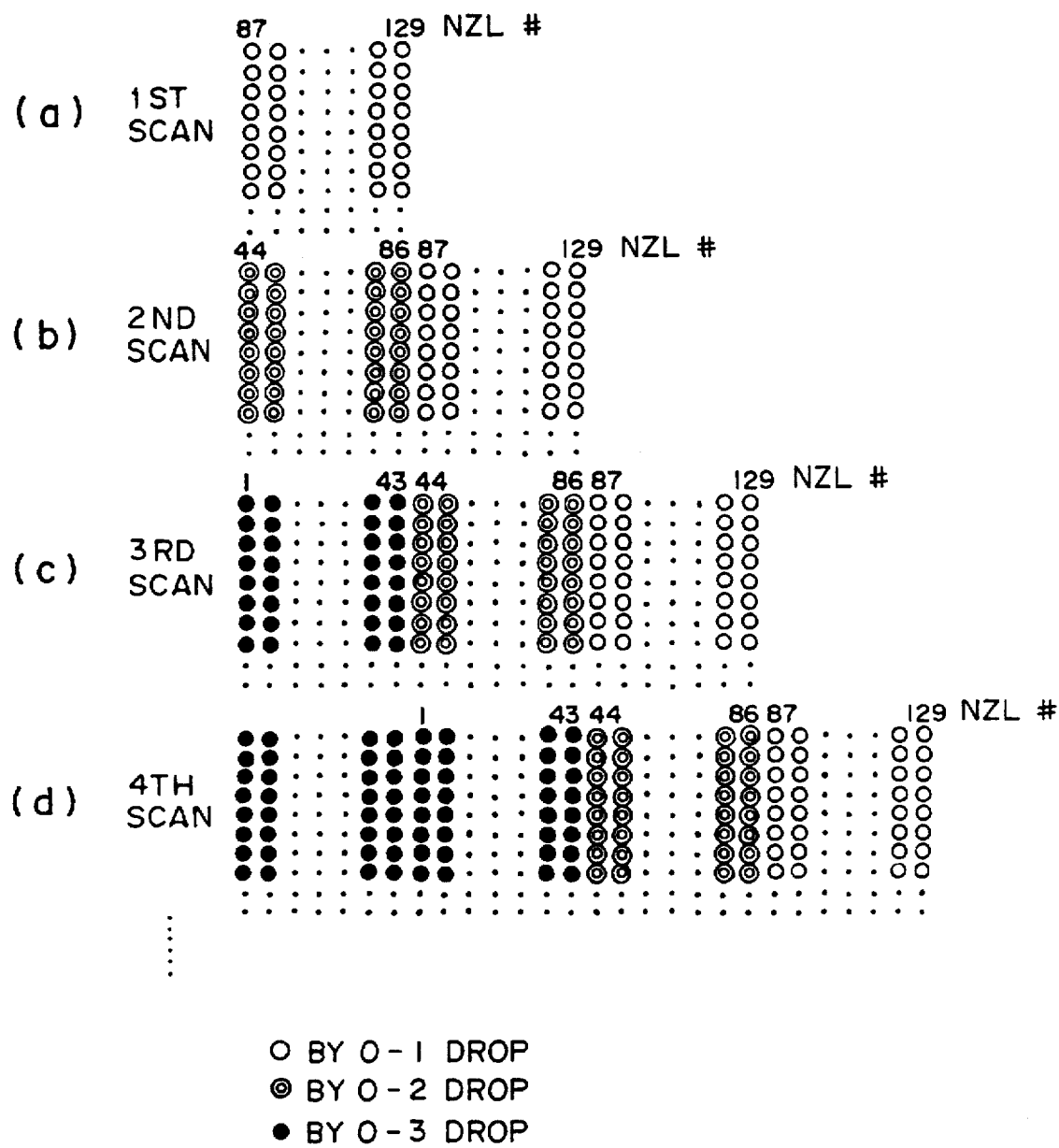

FIG. 9 illustrates the image formation process of this embodiment. In this embodiment, the movement speed of the drum 13 (main scan) is such that the recording head 11 moves rightwardly (sub-scan) through the distance corresponding to 43 pixels per one full turn of the drum 1. As a result, similarly to Embodiment 3, the image is recorded along a helical line on the drum 13. The same pixel is recorded by different 3 nozzles.

Various images have been recorded, and it has been confirmed that sharp images can be provided without stripe and unevenness.

In this embodiment, the image is oblique as in Embodiment 3. However, the inclination is 43 pixels/image size, and therefore, the inclination is not noticeable with human eyes. Further, if the recording material 12 is mounted on the drum 13 with the opposite inclination, the image is without the inclination.

FIG. 10 summarizes the above-described embodiments. Here, n is the number of nozzles, s is the number of nozzles corresponding to the feed distance in the sub-scan direction; k is the maximum number of the ink droplets per pixel and per scan; g is the number of capable tone gradations or levels; and m=n/s. In the foregoing embodiments, m≧3, and therefore one pixel is recorded by m main scans and by different m nozzles. When, therefore, the variation of the ink droplet volumes among the nozzles is in the form of the normal distribution with a standard deviation σ, for example, the variation of the ink volumes for the respective picture elements each recorded by different m nozzles is reduced to σ/√m. The ink volume variation among the pixels, is recognized as the variation in the image density, but the image density variation is not necessarily required to be 0 for the purpose of clear image. Rather, it will suffice if it is small enough. Accordingly, as compared with the conventional apparatus, the clearer images can be provided with a simple structure. As for the value of m, it is desirably large in order to reduce the variations among the picture elements. If it is not less than 3 (m≧3), very clear record of the pixel can be provided. The inventors' investigations have revealed that the image is sufficiently clearer when m=2 than the conventional record.

Embodiment 6

In this embodiment, the same apparatus as in Embodiment 1 was used. A different recording method is used to provide 17 tone gradation recording. Here, the maximum number of ink droplets per pixel and per scan (k) is 4, and the number of scans required for forming one pixel is 4 (FIG. 10).

In this embodiment, when the maximum ink droplet number (k) per pixel and per scan is not less than 2, the ink droplet ejections are uniformly allotted to the individual nozzles so as to avoid concentration of ejecting actions on limited number of working nozzles.

In operation, the recording operation is carried out using nozzles Nos. 97–128 (s=32) out of 128 nozzles (n=128) in the first scan, while the carriage 4 is moved at a speed of 31.75 mm/sec in the main scan direction. During the recording, A1 (number) droplets (Kx, y/n/s: decimal fraction is rounded up to an integer) are ejected at a pixel (x, y) on the recording material 2 in accordance with the tone level information Kx,y (0–16) given for each pixels. Thereafter, the tone level information Kx,y is replaced by K1x,y (K11x, y=Kx,y−A1). Assuming that the tone level information Kx,y is 13, A1 is 4, and K1x,y is 9.

In the second scan, the recording sheet 2 is fed in the upward direction by a distance corresponding to s nozzles (sub-scan direction). Then, the recording operation is carried out using 2×s nozzles, i.e., nozzles Nos. 65–128, while the carriage 4 is moved at the speed of 31.75 mm. At this time, the nozzles Nos. 97–128 effect the similar recording operation in accordance with new tone level information Kx,y, whereas the s nozzles Nos. 65–96 ejects A2 ink droplets (K1x,y/(n/s−1), the decimal fraction is rounded up to an integer. At the pixel position (x, y) on the recording material 2 in accordance with the tone level information K1x,y produced after the first scan. Then, the tone level information K1x,y is replaced with K2x,y (K2x,y=K1x,y−A2). In the same example, A1 is 4, K2x,y is 5.

In the third scan, the recording material is fed up through a distance corresponding to s nozzles. The recording operation is carried out using 3×s nozzles, i.e., the nozzles Nos. 33–128, while the carriage is moved at a speed of 31.75 mm. During this operation, the nozzles Nos. 97–128 effects the similar recording operation in accordance with new tone level information Kx,y. The s nozzles, that is, the nozzles Nos. 65–96 effects the similar recording operation in accordance with the tone level information K1x,y produced after the previous main scan. The s nozzles Nos. 33–64 eject A3 ink droplets (K2x,y/(n/s−2), the decimal fraction is rounded up to an integer) at the pixel position (x, y) on the recording material. Then, the tone level information K2x,y is replaced with K3x,y (K3x,y=K2x,y−A3). In the same example, A3 is 4, K3x,y is 1.

Before the fourth scan, the recording material 2 is fed up through a distance of s nozzles. Then, the recording operation is carried out using all the nozzles, i.e., the nozzles Nos. 1–128, while the carriage 4 is moved at the speed of 31.75 mm/sec. During the recording, the nozzles Nos. 97–128 effect the similar recording operation in accordance with new tone level information Kx,y. The s nozzles, i.e., the nozzles Nos. 65–96 effect the similar recording in accordance with the tone level information K1x,y produced after the previous main scan. The s nozzles Nos. 33–64 effect the similar recording operation in accordance with the tone level information K2x,y produced after the previous scan. The s nozzles Nos. 1–32 eject A4 ink droplets (K3x,y/(n/s−3)= K3x,y) on the pixel (x, y) on the recording material in accordance with the tone level information K3x,y produced after the previous main scan. The operations in the fourth scan are sequentially repeated to effect the recording on the entire surface of the recording material 2. As a result, a pixel at a position (x, y) on the recording material 2 has received Kx,y (number) ink droplets, the number being equal to the tone level information Kx,y.

A pixel having the tone level information Kx,y which is not less than 2 in the image, is recorded by not less than 2 nozzles (the maximum number is n/s, here it is 4), and therefore, the variation in the ink volumes from the nozzles is reduced, so that the unevenness stripes is not recognized or less conspicuous.

FIG. 11 shows the number of ink droplets A1–A4 ejected in a scan in response to 0–16 tone level information K.

Figure 12:
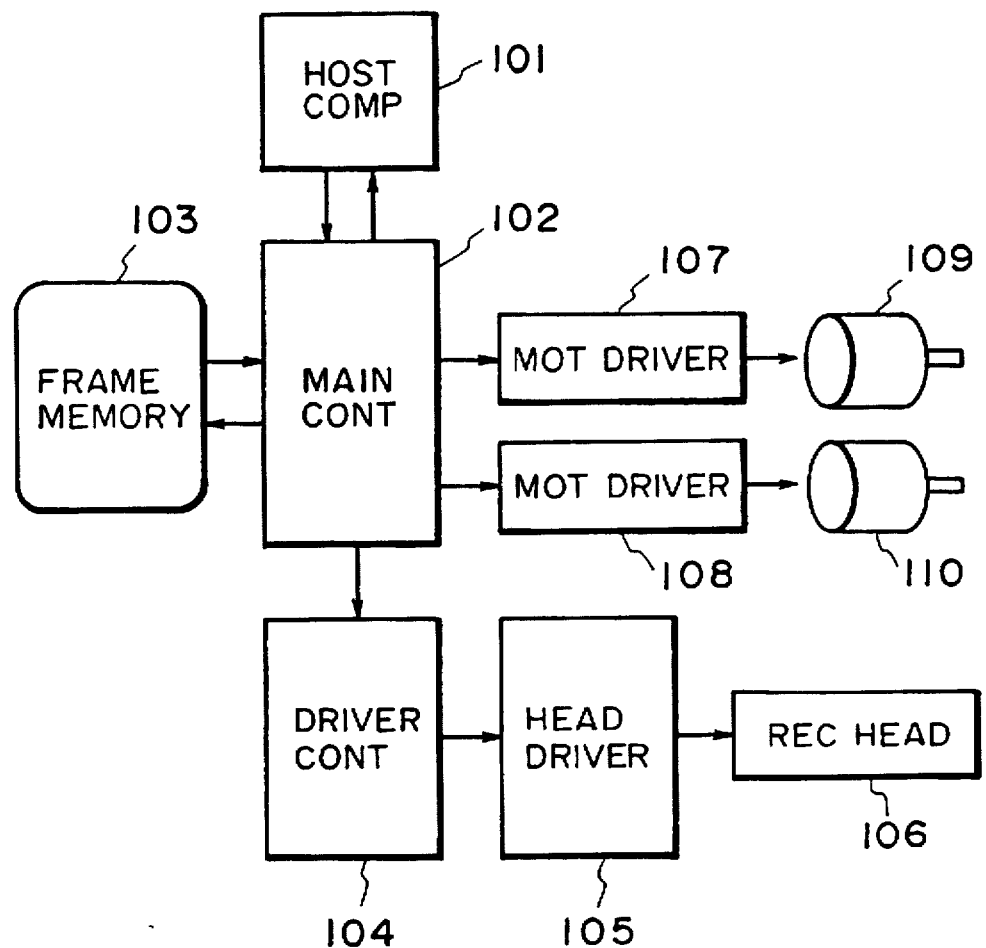
FIG. 12 is a block diagram of a control system with which the present invention is usable.

Referring to FIG. 12, the description will be made as to the structure of the control system usable with the present invention. The image information supplied from a host computer 101 is once stored in a frame memory 103 by a main controller 102. The main controller 102 processes the image information to convert it to tone gradation or level signals suitable for the system (recording apparatus) used therewith. For example, the image information having 0–255 levels is converted to 17 tone signals (0–16) in the foregoing Embodiment 1. The tone signal is supplied to a driver controller 104 which divide the tone signal into plural scans, and the divided signals are supplied to the head driver 105 as the recording signals. The head driver 105 drives the recording head 106 in accordance with the supplied recording signal, thus ejecting droplets of the ink. Motor drivers 107 and 108 are effective to control a carriage moving motor 109 and a sheet feeding motor 110.

Embodiment 7

In this embodiment, the same apparatus of Embodiment 1 is used except for the recording head. In this embodiment, the recording is effected with 7 tone gradations. The recording head 1 has 129 nozzles which are capable of ejecting the droplets at the frequency of 12 kHz, in other words, the heater driving frequency is 12 kHz. The carriage 4 is moved at a speed of 0.25 m/sec. The recording material 2 is fed up by 268.75 microns which corresponds to 43 nozzles, after each scan.

The 7 tone gradation recording using the apparatus of this embodiment will be described. The number of ink droplets per pixel (square of 1/16 mm×1/16 mm (62.5×62.5 microns)) is changed within the range of 0–6 inclusive.

Figure 13:
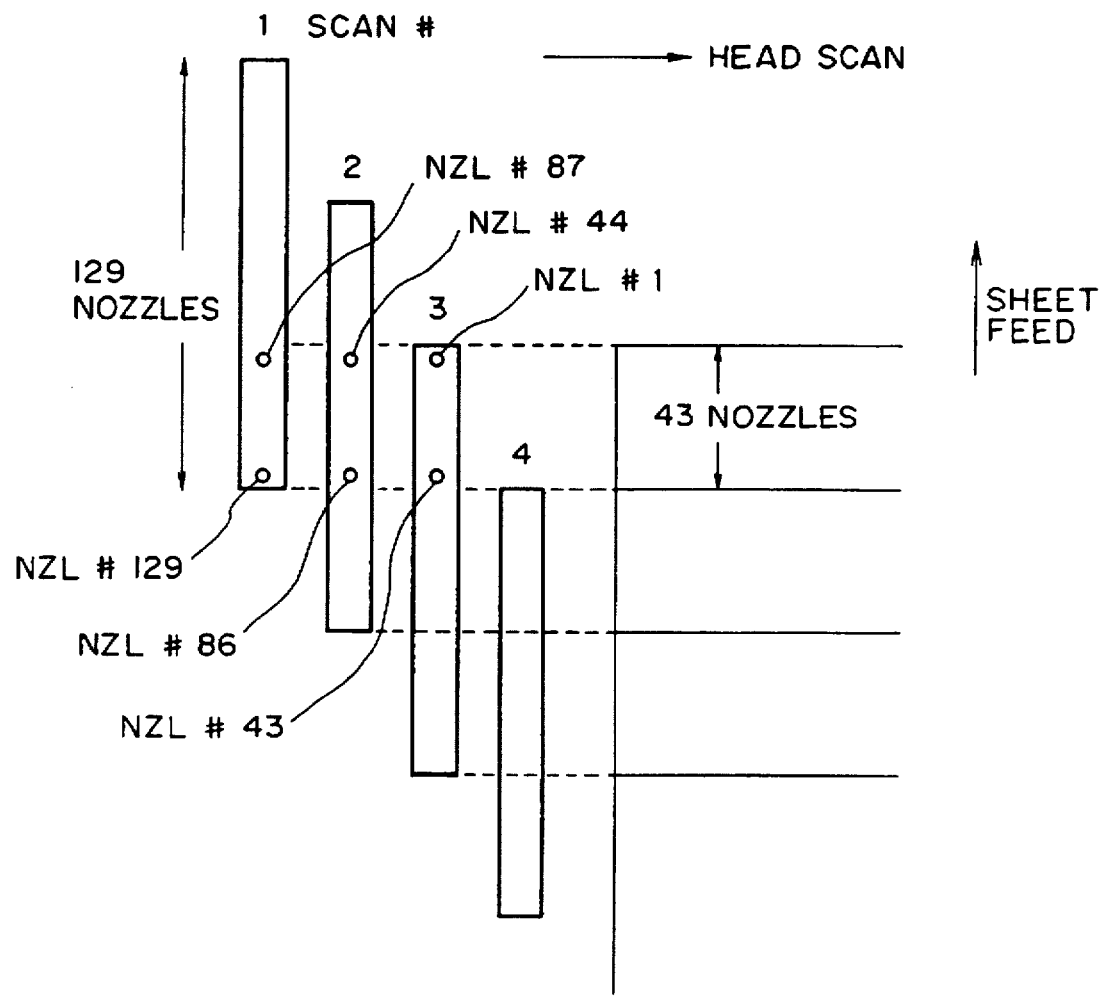
FIG. 13 illustrates the recording operation in the seventh embodiment of the present invention.

FIGS. 13 and 14 illustrate the recording method in this embodiment. The recording head 1 which is schematically shown in provided with 129 nozzles arranged in the vertical direction. For the convenience of explanation, the nozzles are numbered 1, 2, . . . , 128 and 129 from the top of the Figure.

In operation, the recording operation is carried out using only the nozzles Nos. 87–129, while the carriage is moved in the main scan direction. At this time, in this embodiment, 3, at the maximum, ink droplets can be ejected per pixel because of the relation among the size of the pixel (62.5 microns), the carriage movement speed (0.25 m/sec) and the nozzle actuating frequency (12 kHz), as will be understood from the following equation. However, the recording operation is carried out using only two droplets.

[time required for the carriage to pass one pixel]=[size of pixel]/[carriage speed]

[maximum number of droplets in one pixel]=[carriage passing time]×[ejection frequency]

As a result, as shown in FIG. 14, at portion (a), the pixels 1–43 from the top of the recording material is recorded by 0–2 droplets of the ink. then, the recording material is fed up in the sub-scan direction through a distance corresponding to 43 pixels (in the Figure, the recording head is shown as being moved down, for the simplicity of explanation). Then, the recording operation is carried out using the nozzles Nos. 44–129. As a result, as shown in FIG. 14 at portion (b), the nozzles Nos. 44–86 record the 1–43 pixels having been recorded by the nozzles Nos. 87–129 in the previous scan. The nozzles Nos. 87–129 carry out the recording operation for the fresh pixel (44–86). Therefore, each of the pixels 1–43 are now recorded by 0–4 droplets of the ink.

Then, the recording material is again fed up through the distance of 43 pixels. The recording operation is carried out using the nozzles Nos. 1–129. Thereafter, the recording material is fed up through the distance of 48 pixels. As shown in FIG. 14 at portions (c) and (d), the recording operation is repeated using all the nozzles Nos. 1–129. Then, the pixel 1, for example, receives 0–6 droplets of the ink supplied from 3 nozzles, i.e., the nozzles Nos. 1, 44 and 87 (the order of the ejecting operation is opposite), so that 7 tone gradation record is provided. Each of all the other pixels has uniform volume of ink droplets, and therefore, the image has less conspicuous unevenness.

If there is a failed nozzle, that is, a nozzle incapable of ejecting the ink droplet, in this embodiment, for example, the nozzle No. 44 is failed, then the pixel to receive 2 droplets (at the maximum) from the nozzles Nos. 1, 44 and 87, is recorded by ejecting 3 ink droplets (at the maximum) from the remaining two nozzles, i.e., the nozzles Nos. 1 and 87. If the existence of the failed nozzle is known during the recording apparatus manufacturing process, the information to that event is stored in the memory (ROM or RAM) in the recording apparatus, and the controller properly selects the ejecting nozzles. If one or more nozzles become failed during use of the apparatus after the manufacturing thereof, a service man or user can write the information in the RAM of the recording apparatus, so that the other working nozzles can compensate for the failed nozzle or nozzles.

Embodiment 8

In this embodiment, the recording head has 288 nozzles which are operable at the ejecting frequency of 4 kHz, and the carriage moving distance per scan is 4500 microns (72 nozzles). The number of recordable tone gradations per pixel is 4. In the other respects, the apparatus is the same as in Embodiment 7.

Figure 15:
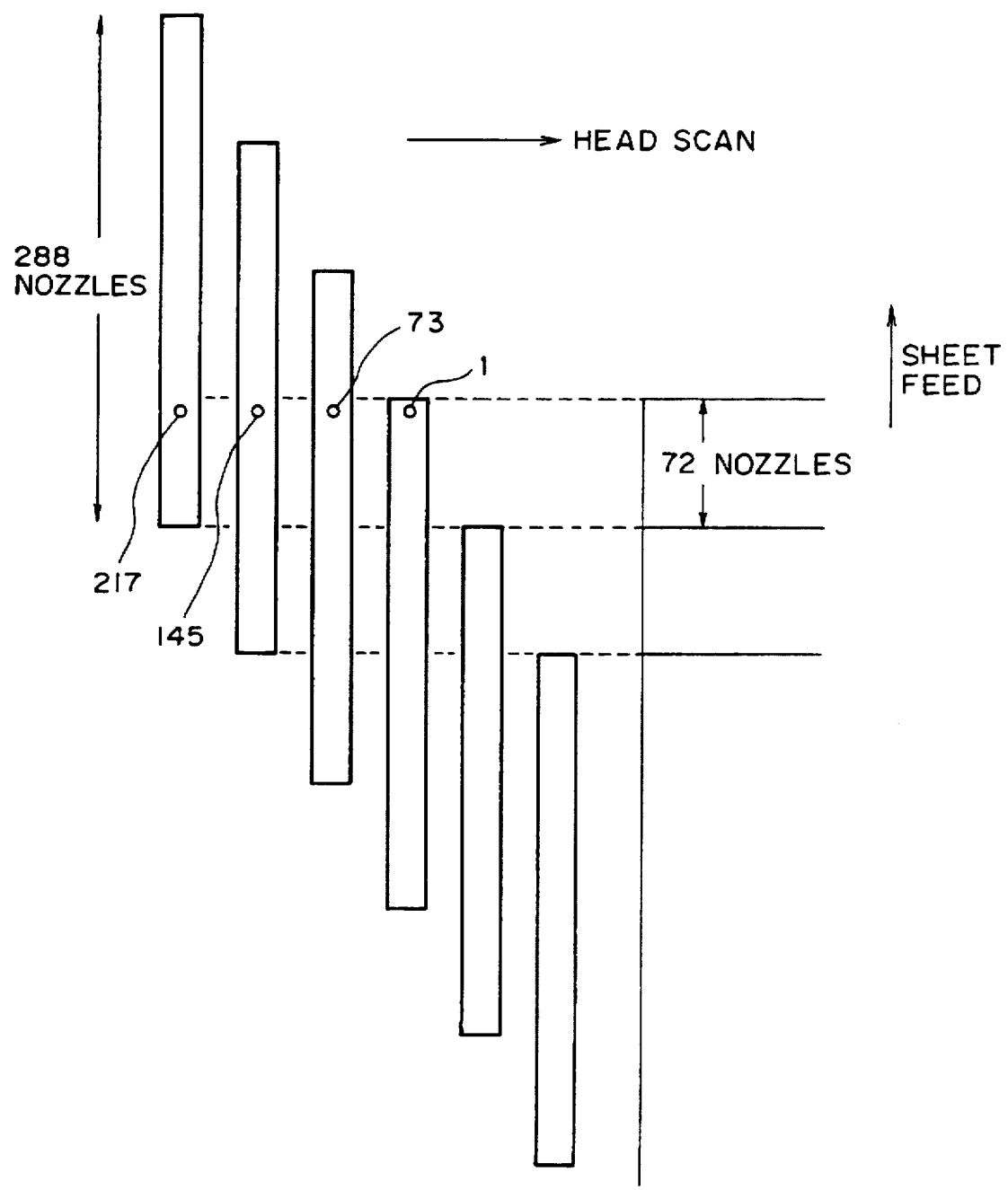

FIG. 15 illustrates concept of the recording method of this embodiment. In this embodiment, the number of droplets per pixel and per scan is 0–1, and one pixel is recorded by 4 scans, and therefore, the maximum number of droplets capable of being supplied to one pixel 4 as a total. On the other hand, the number of ink droplets to be supplied to one pixel is 0–3, and therefore, when all of the nozzles are in order, 3 scanning operations are enough. One or more nozzles can fail. If this occurs, during 3 scans other than the scan using the nozzle, the other 3 nozzles are used, so that the resultant image is free from stripes.

For example, pixel 1 is to be recorded by 0–3 ink droplets ejected through 4 nozzles, i.e., the nozzles Nos. 1, 73, 145 and 217 (the order of ejecting operation is the opposite). If the nozzle No. 73 fails, the pixel is recorded by 3 (at the maximum) ink droplets through the nozzles Nos. 1, 145 and 217. Similarly to the foregoing embodiment, if the existence of the non-ejecting nozzle is known during the recording apparatus manufacturing process, the information to that event may be stored in memory of the recording apparatus (ROM or RAM), and the nozzles are properly selected through the control system.

Embodiment 9

In this embodiment, the recording head has 36 nozzles which are capable of being operated at frequency of 4 kHz. The carriage feeding distance per scan is 687.5 microns (11 nozzles). The number of tone gradations per pixel is 4. In the other respects, the apparatus of this embodiment is the same as Embodiment 7.

Figure 16:
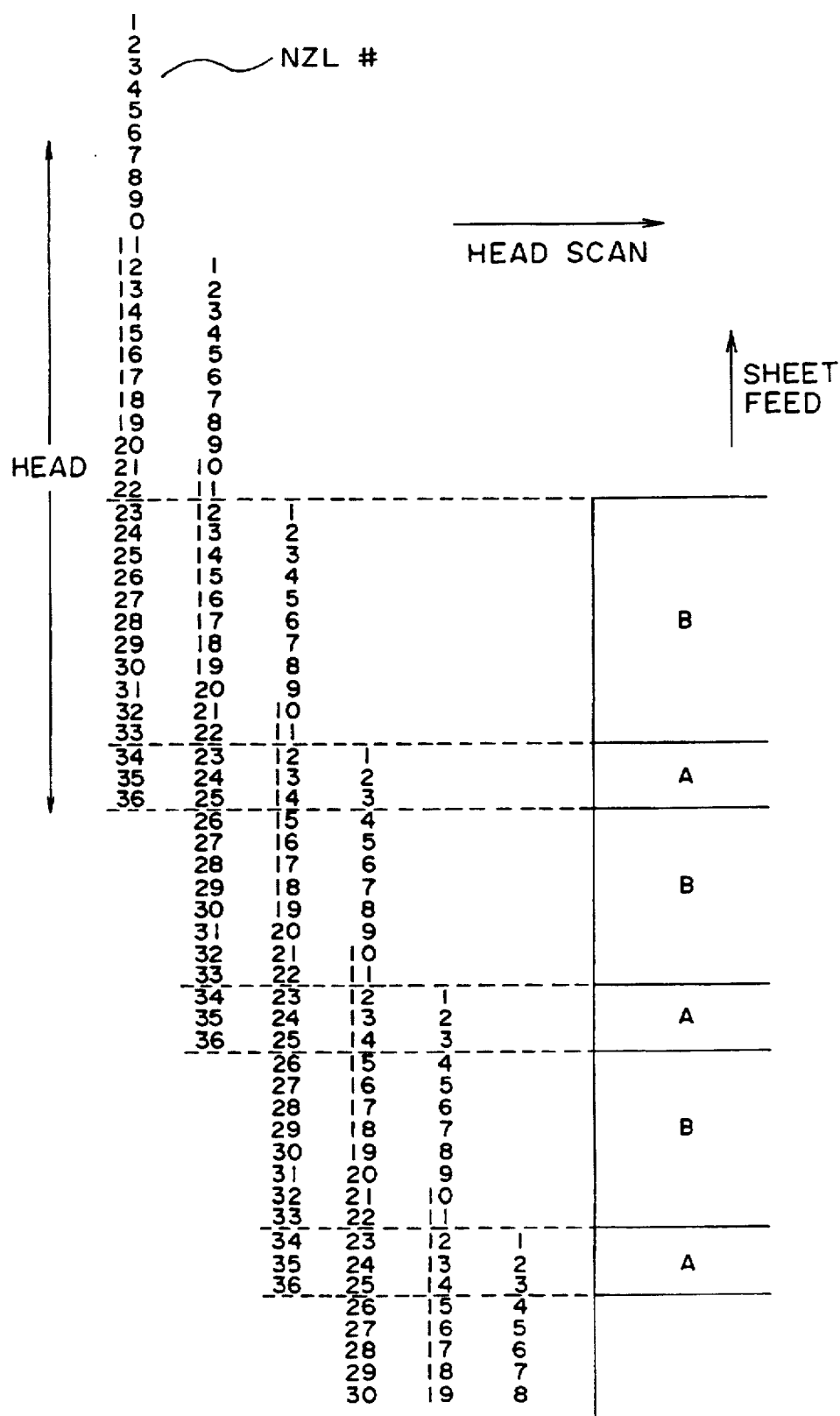

FIG. 16 illustrates the conception of the recording method of this embodiment. In this embodiment, the carriage feeding distance per scan in the unit of nozzle number is not a reciprocal of an integer multiplied by the number of the nozzles of the head. Therefore, the number of scans for recording one pixel is either 3 or 4. In this embodiment, the number of ink droplets capable of being ejected per pixel per scan is 0–1, and therefore, the number of droplets capable of being ejected to one pixel is 3 at the minimum (FIG. 16, at portion 8) or 4 (FIG. 16 at portion A).

Since the number of droplets to be supplied to one pixel is 0–3, the portion A has a margin of one drop. Therefore, as regards the nozzles Nos. 1, 2, 3, 12, 13, 14, 23, 24, 25, 34, 35 and 36, even if they fail, the other nozzles can compensate for them similarly to Embodiments 7 and 8, so that the resultant image is free from stripes.

FIG. 17 is a block diagram of an ink jet recording apparatus usable with the present invention. It comprises a host computer 201 for supplying the image data to be recorded, a memory (RAM) 202 storing the data concerning the failed nozzles, a controller processor 203 for determining the number of ink droplets to be ejected in accordance with the image data and for selecting the nozzles to be actuated in accordance with the failed nozzle data in the RAM 202. Designated by a reference numeral 204 is an ink jet recording head.

Embodiment 10

In this embodiment, the operational frequency of each of the nozzles is made more uniform. In this embodiment, the ejection or non-ejection of the ink f (m, n) is determined in accordance with the density or tone gradation for each pixel, as shown in FIG. 18.

In FIG. 18, the n-th ink droplet is the droplet ejected through 16 nozzles for the same pixel. When the first pixel in FIG. 3 is noted, for example (FIG. 3), No. 121 nozzle ejects the first ink. No. 113 nozzle ejects the second ink droplet; No. 105 nozzle, the third droplet; No. No. 97 nozzle, the fourth droplet; No. 89 nozzle, the fifth droplet; No. 81 nozzle, the sixth droplet; No. 73 nozzle, the seventh droplet; No. 65 nozzle, the eighth droplet; No. 57 nozzle, the ninth droplet; No. 49 nozzle, the tenth droplet; No. 41 nozzle, the eleventh droplet; No. 33 nozzle, the twelfth droplet; No. 25 nozzle, the thirteenth droplet; No. 17 nozzle, the fourteenth droplet; No. 9 nozzle, the fifteenth droplet; and No. 1 nozzle, the sixteenth droplet.

In FIG. 18, the ink droplet is ejected when f (m, n)=1, while the ink droplet is not ejected when f (m, n)=0.

Therefore, when the tone m=1, for example, the first ink droplet is ejected, but when the tone m=2, the first ink droplet is not ejected (the nozzle is not used for the recording), the desired image density is provided by the second and third ink droplets.

Therefore, the following represent the nozzle actuation frequency:

$$\sum_{m=0}^{N} f(m, n)$$

At the bottom of FIG. 18 represents the operational frequency of the nozzle.

By determining the ejection and non-ejection of the nozzles f (m, n), no particular order of ink droplets is frequently used, and therefore, the frequent drivings of particular nozzle or nozzles can be avoided, as long as the image to be recorded includes one or more particular tone levels.

In the example of FIG. 18, $$\sum_{m=0}^{N} f(m, n)$$

is 8 or 9. In this embodiment, the maximum number of droplets N is 16, and therefore:

$$\sum_{m=0}^{N} f(m, n) \leq (N/2) + 1$$

This inequality accomplishes most uniform operation of the nozzles when the tone levels appear uniformly.

If the following inequality is satisfied, it is sufficiently effective to extend the service life of the frequently used nozzle or nozzles.

Embodiment 11

In this embodiment, the used apparatus is the same as in Embodiment 2 of FIG. 4 except that the recording head has 256 nozzles and that the tone gradation number per pixel is 5.

First, the recording head 11 is moved to the leftmost position in FIG. 4, and the recording operation is carried out using only nozzles Nos. 193–256 (64 nozzles), while the drum 13 is rotated through one full turn.

Then, the recording head 11 is moved to the right through a distance corresponding to 64 pixels. Then, the recording operation is carried out using 128 nozzles, i.e., the nozzles Nos. 129–256, while the drum is rotated through one full turn. In this manner, the recording head is moved to the right through the distance corresponding to 64 pixels, while the drum 13 is rotated one turn. This is repeated, so that the whole surface is recorded.

As a result, the first pixel, for example, is recorded by nozzles Nos. 1, 65, 129 and 193 (4 nozzles). Therefore, 5 tone gradation recording is accomplished with 0–4 ink droplets.

In this embodiment, the ejection and non-ejection of the nozzle f (m, n) is determined in accordance with the tone or density level of a pixel, as shown in FIG. 19. In this embodiment, $$\sum_{m=0}^{N} f(m, n) \leq (N/2) + 1$$

is satisfied, too. Here, the image density (OD) for each of the tone levels was as shown in FIG. 20.

In the practical full-color image recording, the use of 5 tone levels is not enough, and therefore, it will be preferable to use also the known tone processing method such as dither method or error diffusing method or the like.

In the combination with the known method, one droplet per pixel or zero droplet per pixel where the image density OD is not more than 0.55, and therefore, the operational frequency of the nozzle corresponding to the tone level 1 tends to increase in order to decrease the operational frequency of the nozzle corresponding to the tone level m=1 (the nozzle corresponding to the first ink droplet in this case) in view of the above.

$$\sum_{m=0}^{N} f(m, n)$$

at n=1 is set to be 2 which is lower than the average.

Thus, the tendency of significant increase of the operational frequency for 1 droplet per pixel, is particularly significant when the maximum number of ink droplets n is not more than 10.

Embodiment 12

In this embodiment, the use is made with the recording head which is the same as in Embodiment 4, and the operational frequencies of the nozzles are made more uniform.

The ejection or non-ejection of the ink may be determined in accordance with the tone level for each of picture elements in the same manner as in Embodiment 10. Since, however, the first and second ink droplets, the third and fourth ink droplets, and the fifteenth and sixteenth ink droplets, are ejected through the same nozzles, respectively, the uniformity between the ink droplets ejected through the same nozzle is achieved.

It is preferable that one pixel is recorded by as large a number of different nozzles as possible from the standpoint of less unevenness. In view of this, the ejection and non-ejection is determined as shown in FIG. 21.

In FIG. 21, the values given in "SUM" are sums of $$\sum_{m=0}^{N} f(m, n)$$

With respect to the liquid droplets ejected from the same nozzle. By determining the ejection and non-ejection in accordance with FIG. 21, the nozzles can be operated at more even frequencies.

The timing of one droplet ejection for the case of one droplet per pixel, is determined so that the ink is ejected at the earlier timing for all cases. Therefore, even if the density or tone levels are different in the adjacent pixels, two droplets are not ejected continuously except for the high density cases (m≦8), and therefore, the ejections are stabilized. This is effective to improve the uniformity. The structure of the control system is the same as in FIG. 12.

As described in the foregoing, according to Embodiments 10–12, the nozzles are operated at more even frequencies. Thus, the reduction of the recording head service life attributable to the articular nozzle or nozzles operated at higher frequencies, can be avoided.

Embodiment 13

Figure 22:
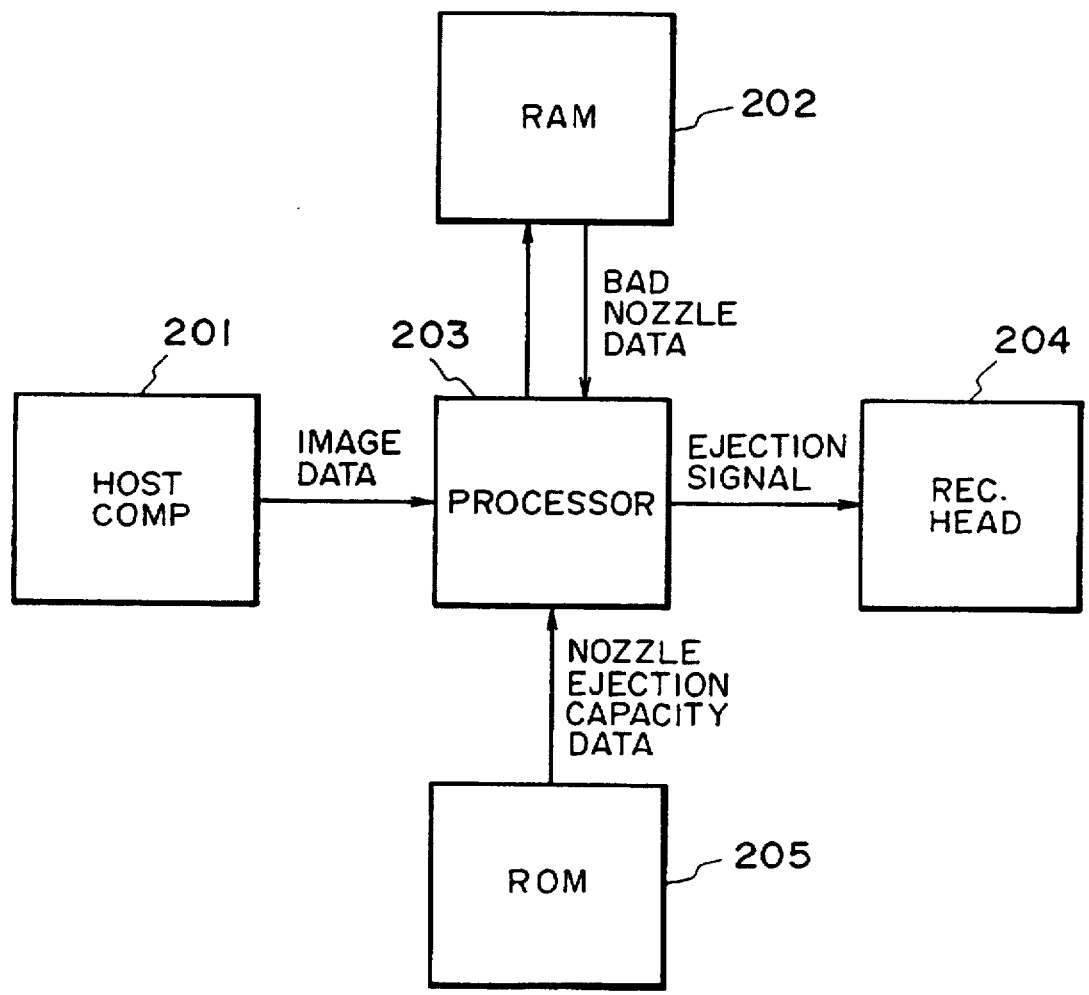
FIG. 22 is a block diagram of a control system usable with the thirteenth embodiment.

FIG. 22 is a block diagram of a control system for an ink jet recording apparatus according to Embodiment 13. It comprises a host computer 201 for supplying the image data to be recorded, a memory (RAM) 202 for storing ejection nozzle data corresponding to the number of ink ejections, a processor controller 203. A recording head 204 has 128 nozzles arranged at the density of 16 nozzles/mm. A memory (ROM) 205 stores the ejection volume data for each nozzle.

Figure 23:
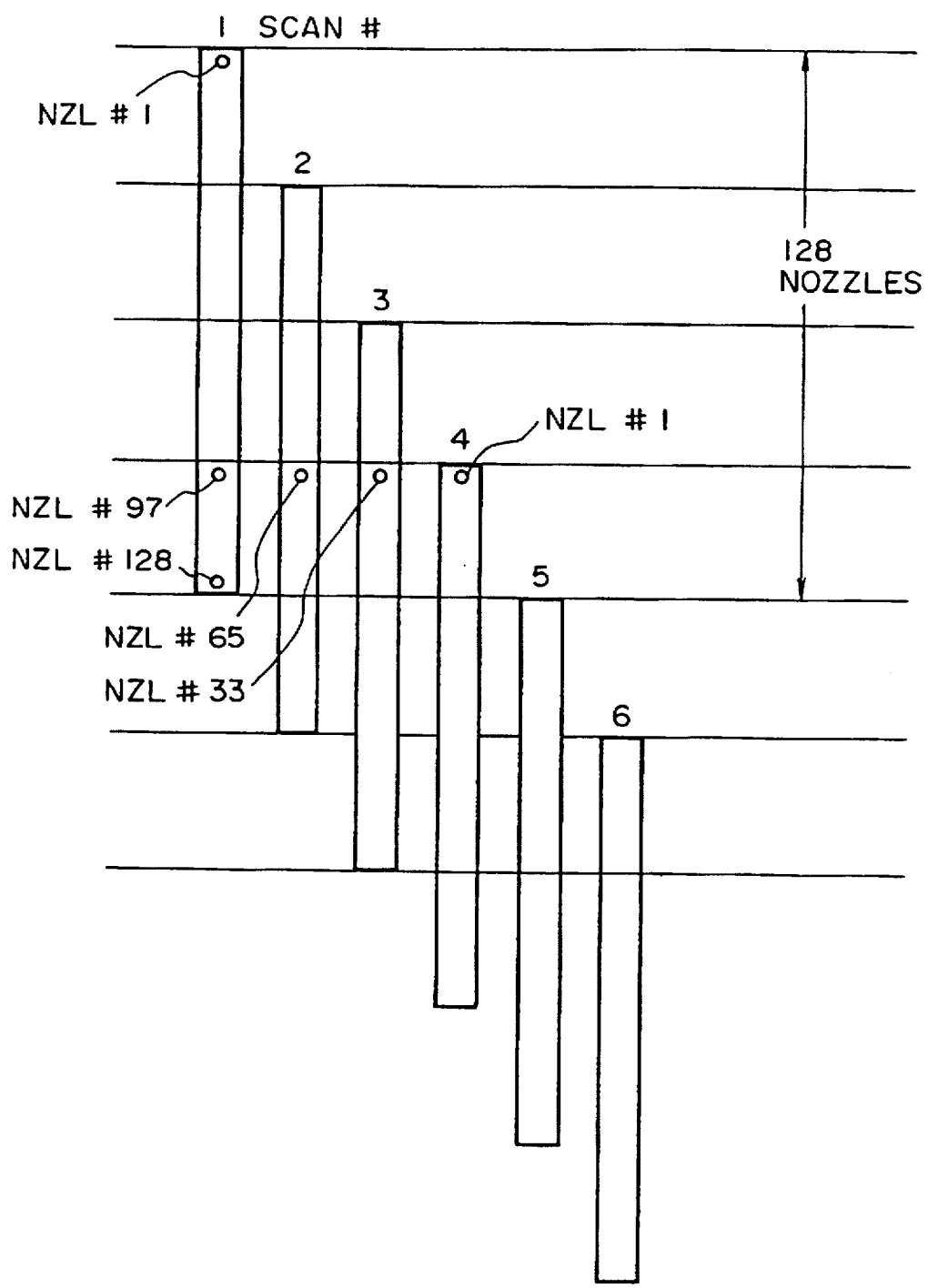
FIG. 23 illustrates the recording operation in the thirteenth embodiment.

Using this apparatus, one pixel is recorded by 4 scans, wherein the number of droplets per pixel ranges between 0–4, inclusive so that 5 tone gradation image can be recorded. In FIGS. 23 and 24, the recording method is illustrated. In this Figure, the 128 nozzles are arranged vertically. For the convenience of explanation, the nozzle is numbered 1, 2, . . . , 128 from the top.

The volume of the liquid droplet ejected by each nozzle is determined through a known method. The data are stored in the ROM. In this embodiment, the volume is determined in the following manner. The ejected in the droplet is photographed using optical microscope and TV camera, and the volume is calculated on the basis of the image thereof.

In operation, the recording operation is carried out using only nozzles Nos. 97–128, while the carriage is moved at a speed of 31.75 mm/sec in the main scan direction. Then, pixels 1–32 from the top of the recording material is recorded by 0 or 1 ink droplet, as shown in FIG. 24 at portion (a). Then, the recording material is fed upwardly (sub-scan direction) through a distance corresponding to 32 pixels (in the Figure, the recording head is moved downwardly relative to the recording material, for the convenience of explanation). Then, the recording operation is carried out using the nozzles numbers 65–96. As shown in FIG. 24, portion (b), the nozzles Nos. 65–96 effect further recording on the pixels 1–32 having been subjected to the recording operation of the nozzles Nos. 97–128 in the previous scan. The nozzles Nos. 97–128 effect the recording for the new 33–64 pixels. Therefore, the pixels 1–32 are recorded by 0–2 droplets per pixel.

Subsequently, the recording material is fed upwardly through a distance corresponding to 32 pixels, and the recording operation is carried out using nozzles Nos. 33–128 (FIG. 24, portion (c)). Further, the sheet is fed upwardly through the same distance, and the recording operation is carried out using all of the nozzles, i.e., Nos. 1–128 (FIG. 24, portion (d)). The above operations are repeated to cover the entire surface. Then, the first pixel, for example, is recorded by the ink droplets ejected through 4 nozzles, i.e., nozzles Nos. 1, 33, 65 and 97 (the order of ejections is the opposite).

The number of ink droplets to be shot to one pixel is determined on the basis of the image data. In this embodiment, the number is 0, 1, 2, 3 and 4 (5 kinds) since 5 tone gradation recording is effected. Which nozzles are to be used for ejecting the number of droplets, is determined by the processor using the data stored in the ROM, so that as many different nozzle combinations as possible are used and so that the sum of the ink volumes through the used nozzles is as close as possible to the average of the ejection volume of the entire recording head.

Assuming, for example, that the ejection volumes of nozzles Nos. 1, 33, 65 and 97 are 8 pl, 10 pl, 10 pl and 12 pl and that the average ejection volume of 128 nozzles of the recording head is 10 pl. When the number of droplets to be shot is 1, No. 33 or No. 65 nozzle is used. When it is 2, No. 1 nozzle and No. 97 nozzle, or No. 33 nozzle and No. 65 nozzle, are used. When it is 3, No. 1 nozzle, No. 33 nozzle and No. 97 nozzle, or No. 1 nozzle, No. 65 nozzle and No. 97 nozzles, are used. If it is 4, all of these nozzles, i.e., 4 nozzles are used.

The above calculations are effected for all pixels, and the recording operation is carried out while determining the nozzles to be used.

Figure 25:
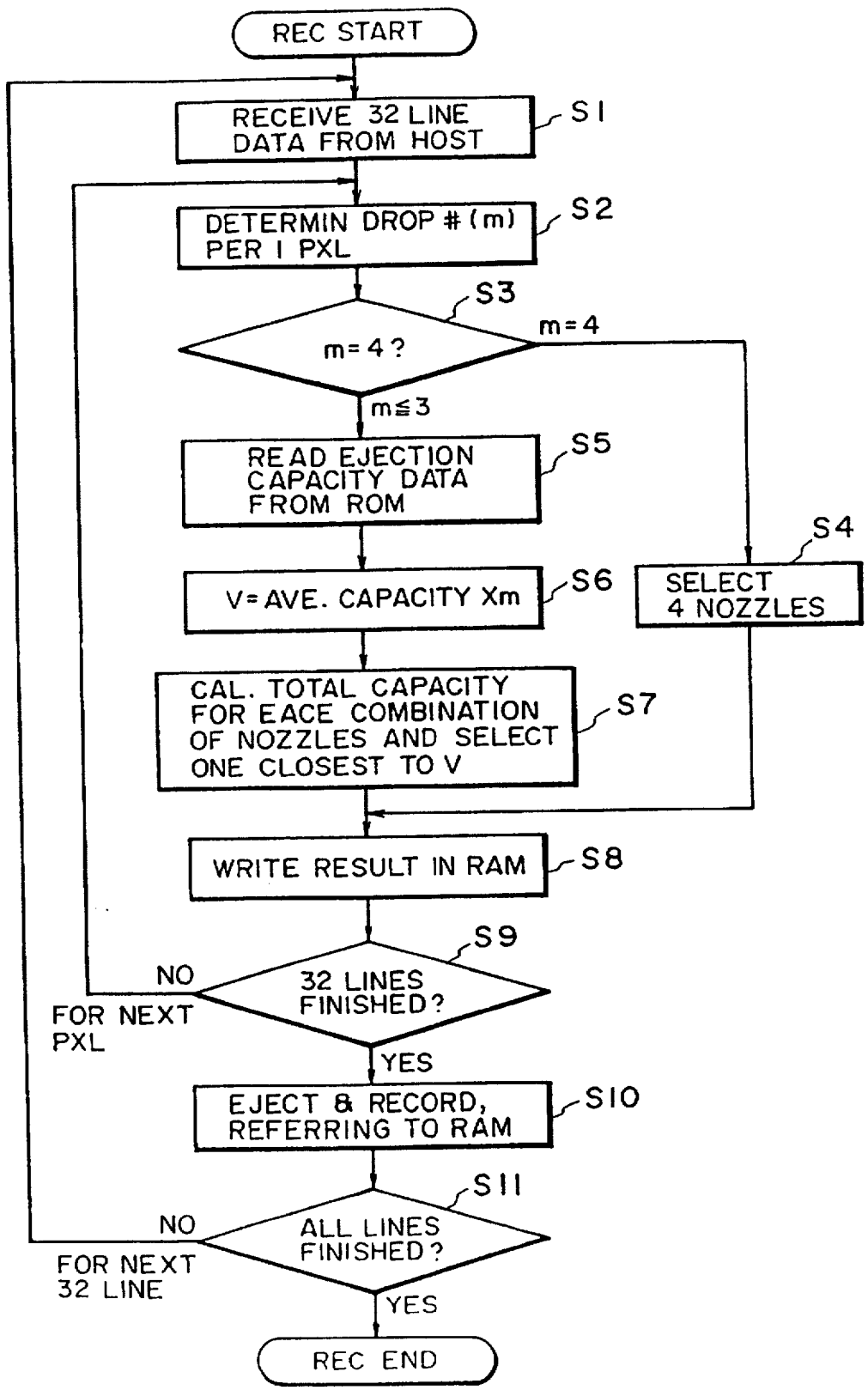
FIG. 25 is a flow chart of an image forming operation in the thirteenth embodiment.

FIG. 25 is a flow chart of the operations for the above. In FIG. 25, when the recording operation starts, the image data for 32 lines is received by the host computer 11 at step S1. At step S2, the number of ink droplets (m) to be shot to one pixel is determined from the image data. Here, m is 0-4. At step S3, if m=4, the operation proceeds to step S4 where 4 nozzles are selected. On the other hand, if m≦3 at step S3, the operation proceeds to step S5 where the ejection volume data is read out of the ROM 15. At step S6, average ejection volume Xm=V is calculated. At step S7, the total ejection volume is calculated as the combination of the nozzles to be used, as shown in FIG. 26. On the basis of the calculation, the combination closest to V is selected. The result of selection is written in the RAM 12 at step S8.

The operations in steps S2-S8 are repeated until all of the pixels in 32 lines are finished (step S9). All the pixels are dealt with, the ink droplets are ejected at step S10, referring to the RAM 12, thus effecting record. The operations in steps S1-S10 are repeated until all the lines are covered (step S11).

The recording operations have been carried out through the recording method, and it has been confirmed that the variation in the ink volumes from the nozzles are compensated for all tone levels, and that the stripes and unevenness are less conspicuous.

In this embodiment, the ejection volume data of the nozzles are stored in the ROM, and the nozzles to be used are determined by the processor. However, the relations between the image signals and the nozzles to be used are determined beforehand, and the results are stored in a ROM. In this embodiment, the number of ink droplets ejected for one pixel from one nozzle per scan is either 0 or 1, but plural number may be used.

Embodiment 14

Figure 27:
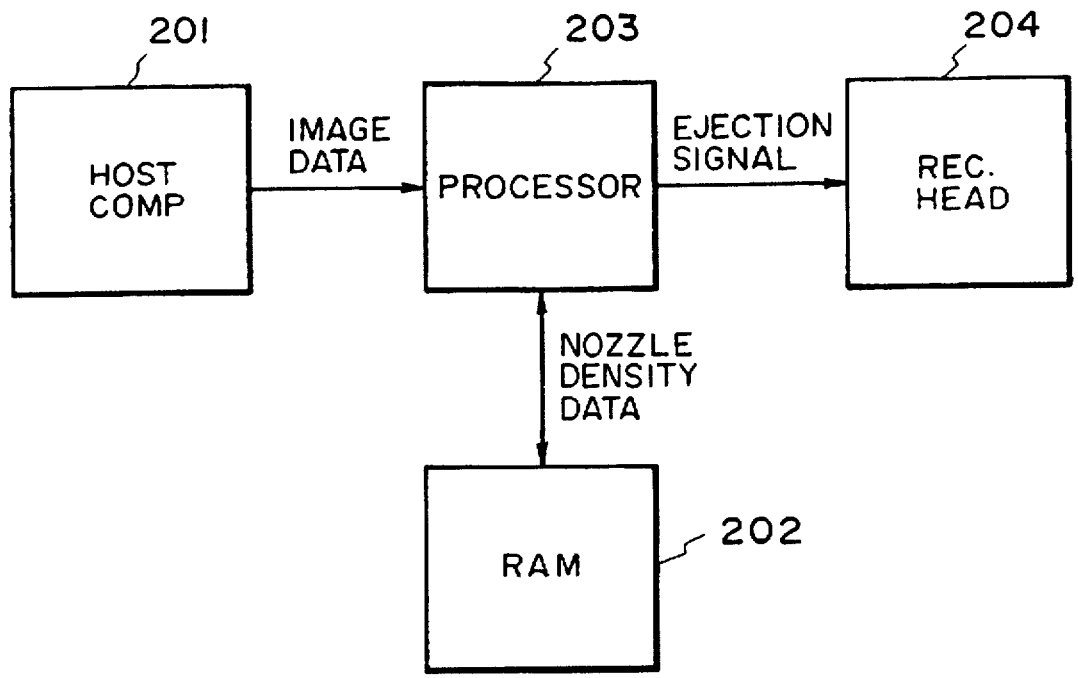
FIGS. 27 and 28 are block diagrams of the control systems usable with the fourteenth and fifteenth embodiments.

FIG. 27 is a block diagram of a control system of an ink jet recording apparatus of Embodiment 14. It comprises a host computer 201 for supplying the image data to be recorded, a memory (RAM) for storing the density or tone level data for the respective nozzles and a controller and processor 203. Designated by a reference numeral 204 is an ink jet recording head having 128 nozzles arranged at the density of 16 nozzles/mm.

Using all the nozzles to be used, the gray scales corresponding to various signal levels are recorded. The gray scales are read by a known density measuring device. Thus, the density-signal data are determined for the nozzles. This is stored in the RAM 202. When the recording operation is carried out for the recording medium, the operations are the same as Embodiment 13, but the nozzles to be used are determined, referring to the density data stored in the RAM 202.

In this embodiment, the density data is stored in the RAM 202, and therefore, even if the density data for the nozzles changes for some reason or another after the recording apparatus is sold, it is possible for the user or the service man to change the data in the RAM 202. Even if one or more nozzles failed, the data in the RAM 202 may be changed so as to use another working nozzle in place of the failed nozzle, thus expanding the service life of the recording head.

Embodiment 15

Figure 28:
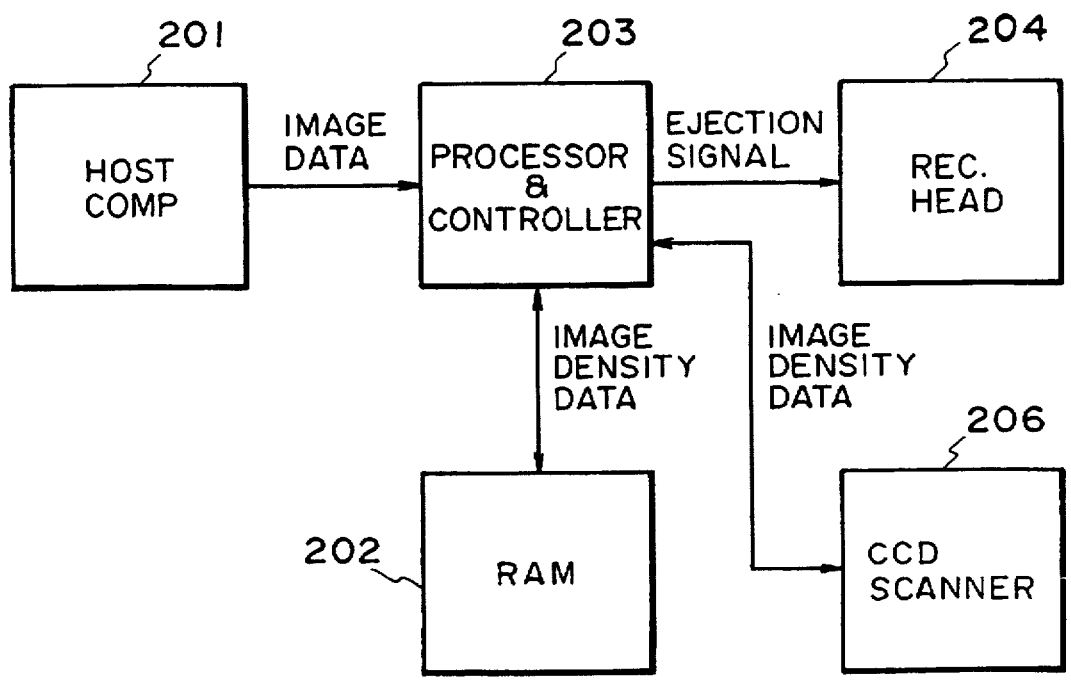

FIG. 28 is a block diagram of a control system for an ink jet recording apparatus according to Embodiment 15. It comprises a host computer 201 for supplying the image data to be recorded, a memory (RAM) 202 for storing density level data for each nozzles and a processor and controller 203. Designated by a reference numeral 204 is an ink jet recording head having 128 nozzles at the density of 16 nozzles/mm. The control system also comprises a CCD scanner.

In this embodiment, the gray scales corresponding to various signal levels are recorded using all nozzles to be used. Then, the gray scales are read by the CCD scanner 206 to determine density-signal data for respective nozzles. The data are stored in the RAM 202. The recording operation is carried out in the similar manner as in Embodiment 13, but the nozzles to be used are selected, referring to the density data stored in the RAM 202. In this embodiment, the apparatus has a built-in data reading device (CCD scanner). Therefore, even if the density data for the nozzles change for one reason or another after the apparatus is sold, the user can easily correct the data, and therefore, the maintenance is easier.

In this embodiment, the record density of the nozzles are determined on the basis of OD level when one nozzle is operated, or the ejection volume which is substantially one-to-one correspondence with the OD level. However, the ejection speed or the like which is closely related with the ejection volume.

According to Embodiments 13-15, the density variation among the picture elements can be minimized, and therefore, the clear images can be provided with simple system structure as compared with the conventional apparatus.

Embodiment 16

Figures 29, 30:
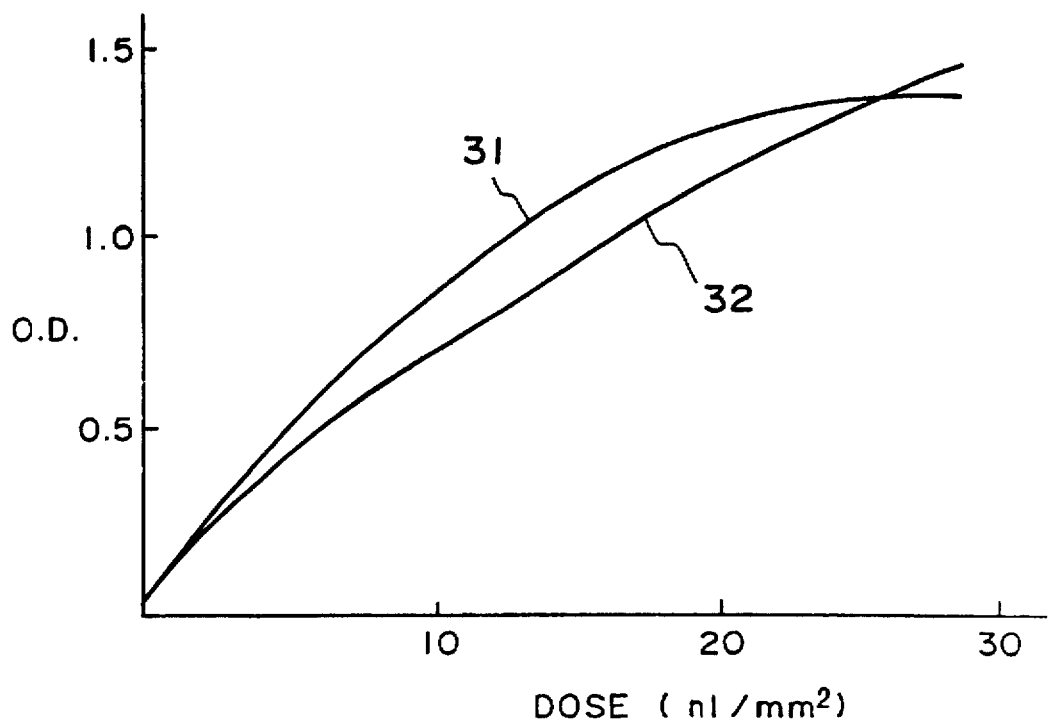
FIG. 29 illustrates the difference in the tone gradation due to the picture element formation difference.
FIG. 30 is a table showing the components of the recording liquid.

FIG. 29 shows the OD level when the recording liquid shown in FIG. 30 is shot on a coated sheet. The used multi-nozzle recording head has 48 nozzles arranged at a nozzle pitch of 63.5 microns. The ejection liquid volume per nozzle is 0.008 nl. The pixel pitch in the main scan direction is 63.5 microns which is equal to the nozzle pitch. In FIG. 29, designated by 31 is the OD levels when the recording liquid is ejected in one scan, where as reference numeral 32 designate the OD levels when the recording liquid is shot by plural scans. In the latter case, the recording liquid is shot at the same position, but in the former case, the centers of the dots are deviated with the increase of the number of dots (multi-droplet recording). This is the cause of the difference of the curves. As will be understood from this Figure, the OD level becomes different by 0.2 at the maximum although the total volume of the shot liquid is the same.

The present invention positively uses this, namely when one recording liquid is used, the reflection density (OD) of the dot provided by one scan is different from the reflection density of the dot provided by plural scans, even if the total amount per unit area is the same. The apparatus of this embodiment is the same as the apparatus in Embodiment 1 except for the number of nozzles is 12. The structure of the control system is the same as shown in FIG. 12.

The description will be made as to the method of 5 tone gradation record.

FIG. 31 shows the concept of the recording method of this embodiment. The recording head 1 has 12 nozzles arranged vertically. For the convenience of explanation, the nozzles are numbered 1, 2, . . . , 12 from the top.

In operation, the recording operation is carried out using only nozzles Nos. 7–12, while the carriage is moved in the main scan direction. As a result, as show in FIG. 31 at portion (a), pixels 1–6 from the top on the recording material are recorded by 0, 1 or 2 ink droplets. Then, the recording material is fed upwardly (sub-scan direction) through a distance corresponding to 6 pixels (in the Figure, the recording head is shown as moving downwardly, for the convenience of explanation). Then, the recording operation is carried out using nozzles Nos. 1–12. As a result, as shown in FIG. 31 at portion (b), the nozzles Nos. 1–6 effect the recording with 0 or 1 droplet on pixels 1–6 which have been subjected to the recording operation of the nozzles Nos. 7–12 in the previous scan. The nozzles Nos. 7–12 record new pixels 7–12 with 0, 1 or 2 droplets. Therefore, the pixels 1–6 are recorded by 0–3 droplets per pixel.

The sheet is fed upwardly through a distance of 6 pixels, and the recording operation is carried out using the nozzles Nos. 1–12. As shown in FIG. 31 at portion (c), the repetition of the above-described operations produces the record on the whole surface with 0–3 droplets.

FIG. 32 illustrates the recording operation in more detail. In this embodiment, one pixel is recorded by 3 droplets at the maximum. Conventionally, the multi-droplet tone recording using 3 droplets at the maximum per one pixel can produce 4 tone levels, but in the present embodiment, 5 tone levels can be provided.

Portion (a) of FIG. 32 shows the recorded image according to this embodiment. ○ or ◎ indicates the droplet or droplets. The used multi-nozzle head had 12 nozzles each capable of 0.031 nl per ejection. The recording density is 16 pixels per 1 mm. The image was provided by two scans (p) and (c).

Dots 14, 15, 16 and 17 are provided by 1 droplet, 2 droplets, 2 droplets and 3 droplets per pixel, respectively. The image density increases in the order named. Reference numerals 14', 15', 16' and 17' indicate pixels for the dots 14, 15, 16 and 17, respectively. The pixel 14' is recorded by one droplet only through the first scan. The pixel 15' is recorded by one droplet in the first scan and one droplet in the second scan, in which the droplets are shot at the same point in the pixel. The pixel 16' is recorded by two droplets in the first scan, and therefore, the shot position of the droplets are deviated by a distance determined from the scanning speed and the ejection frequency. The pixel 17' is recorded by the same droplets as in the pixel 16' plus one droplet in the second scan (3 droplets in total), in which the third droplets provided by the second scan is deviated to the right from the second droplets in the first scan. The droplet ejection timing is controlled so that the three droplets are disposed at the regular intervals. The density in this pixel is the same as a pixel shot by one scan at the regular intervals.

The pixels 15' and 16' are each recorded by two droplets per pixel. However, the dot record 16 of the pixel 16' has a higher image density than the dot record 15 of the pixel 15'. For this reason, 5 tone gradations (including no ejection) can be provided. In this embodiment, similarly to the case of FIG. 29, the coated sheet and water ink is used.

Figure 33:
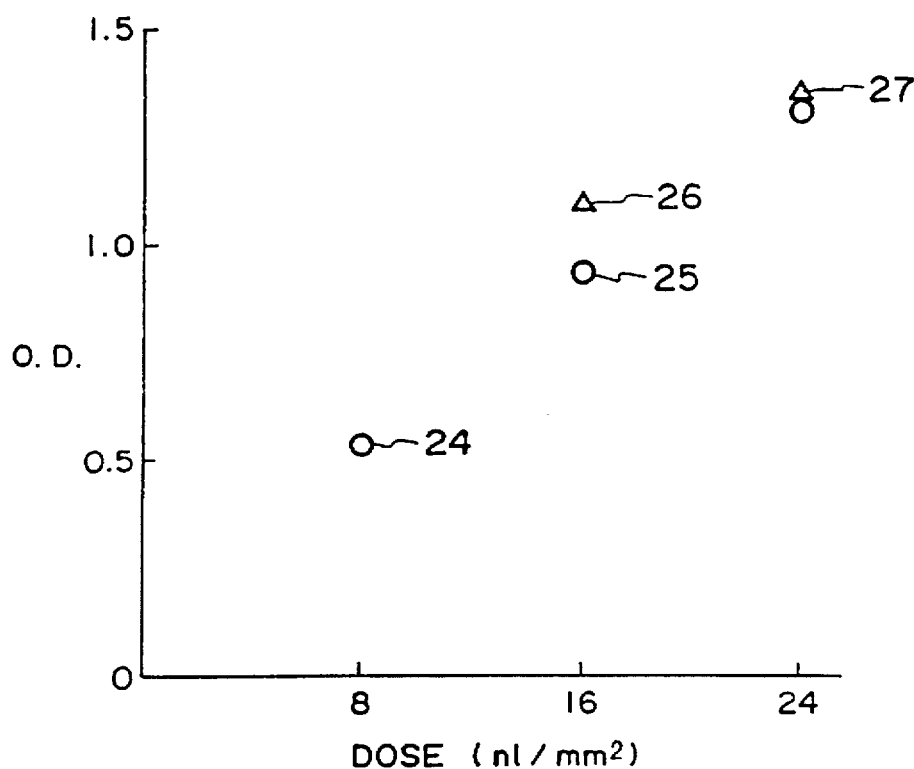
FIG. 33 illustrates the tone gradation in the sixteenth embodiment.

The reason why the dot 16 has a higher density than the dot image 15 is the same as with FIG. 29. FIG. 33 shows the results of image density measurements. In this Figure, reference numerals 24, 25, 26 and 27 indicate the image densities of the dots 14, 15, 16 and 17 of FIG. 32. In FIG. 33, "Δ" is the image densities when plural droplets are shot with 20 microns deviation for one pixel; "○" indicates the image densities when the droplets are shot at the same position for one pixel. The image densities 25 and 26 (OD levels) are different by approximately 0.2 due to the difference of the shot positions despite they are provided by 2 droplets per pixel. As will be understood, this embodiment positively uses the difference.

According to this embodiment, the number of tone gradations is increased in effect by 1 without changing the recording head structure. The better quality images can be provided. When the image having the image density of approximately 1.0 OD, the two droplet ejection per one pixel can be selected from 15 and 16 levels in FIG. 32 in accordance with the image signal, and therefore, the halftone level can be expressed more finely.

In this embodiment, the two scanning operations are carried out with the deviation of the distance corresponding to 6 nozzles in the sub-scan direction. However, it is possible to effect the recording without deviation in the sub-scan direction between the two scans. In this case, the image processing software is simplified.

Embodiment 17

FIG. 17 illustrates Embodiment 17, in which the use is made with a recording head having 15 nozzles each capable of ejecting 0.023 nl recording liquid per ejection. The Figure shows schematically the recorded image, in which "○" indicates a dot provided by one droplet; "◎" indicates a dot provided by two droplets shot on the same point; and "⊚" indicates a dot provided by three droplets shot at the same point. The partly overlapped "∞" indicates a dot or one pixel provided by plural droplets through one scan. The used recording liquid and the sheet are the same as in the previous embodiment. The recording density is the same, that is, 16 pixels/mm in this embodiment, 4 droplets per pixel per scan at the maximum is capable. One pixel is scanned three times, and 8 tone gradations are possible.

Figure 34:
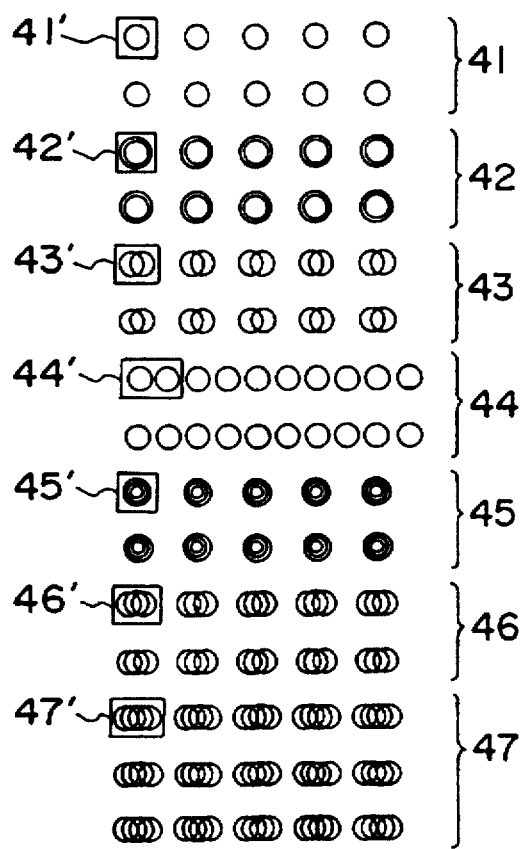
FIG. 34 shows the detail of the image formation in the seventeenth embodiment.

In FIG. 34, reference numerals 41–47 indicate recorded patterns for the respective tone levels. Reference numerals 41'–47' indicate single pixels in the respective patterns. Reference numerals 41, 43, 44, 46 and 47 are dot images recorded by one scan. The number of droplets per pixel is 1, 2, 2, 3 and 4, respectively. Reference numeral 42 indicates a dot image recorded by 2 scans. Reference numeral 45 designates a dot image provided by 3 scans. Reference numerals 43 and 44 indicate dot images provided by two droplets per pixel, and the dot 43 is recorded by the first and second shots among the four shots, and the latter is recorded by the first and third shots. In the pixel 43', the two dot are partly overlaid, but in the pixel 44', the two dots are separate from each other.

Figure 35:
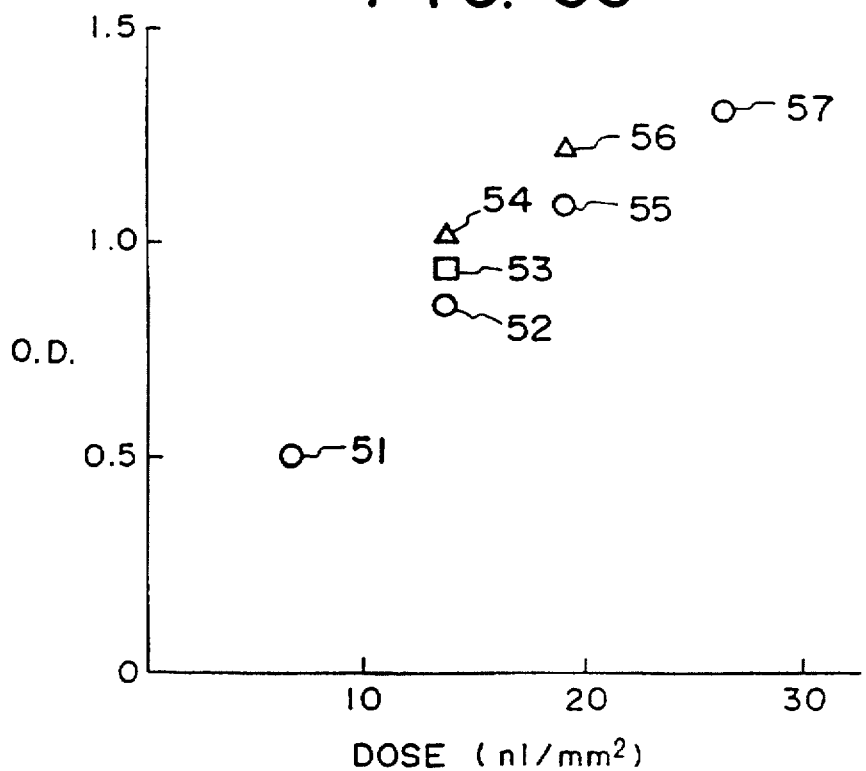
FIG. 35 illustrates the tone gradation in the seventeenth embodiment.

FIG. 35 shows the OD levels for the respective patterns of FIG. 34. In this Figure, reference numerals 51–57 indicate the density of the dots 41–47. As described with respect to the foregoing embodiment, the image density decreases with the degree of overlapping of the dots if the number of droplets per pixel is the same. Therefore, the density 52 of the dot 42<the density 53 of the dot 43<the density 54 of dot 44.

Similarly, the density 55 of the dot 45<the density 56 of the dot 46.

In both of the droplets 43 and 44, the number of droplets $m_1$ through the first scan is 2, the number of droplets through second or third scan is 0 ($m_2=m_3=0$). However, in this embodiment, the timings of the two droplet shots for one pixel in one scan, are selected in accordance with the image signal. In this Example, the time interval between the two droplets is changed. This embodiment is the same as the previous embodiment in that whether the same number of droplets is shot in one scan or in plural scans, is determined in accordance with the image signal.

Similarly to Embodiment 16, the recording head or the sheet is moved in the sub-scan direction by the distance corresponding to 5 nozzles, for each scanning operation. Thus, one pixel is scanned three times. By doing so, the variation in the ink volumes of the nozzles is flatten, and therefore the image involves less conspicuous stripes and unevenness.

The three scans may be carried out without deviation the recording head in the sub-scan direction. In this case, the image processing software is simplified.

In accordance with Embodiments 16 and 17, a larger number of tone gradations can be provided even if the total number of droplets for one pixel is the same. This is because the number of droplets per scan is changed so that the shot positions of the droplets are changed.

Embodiment 18

Figures 36, 37:
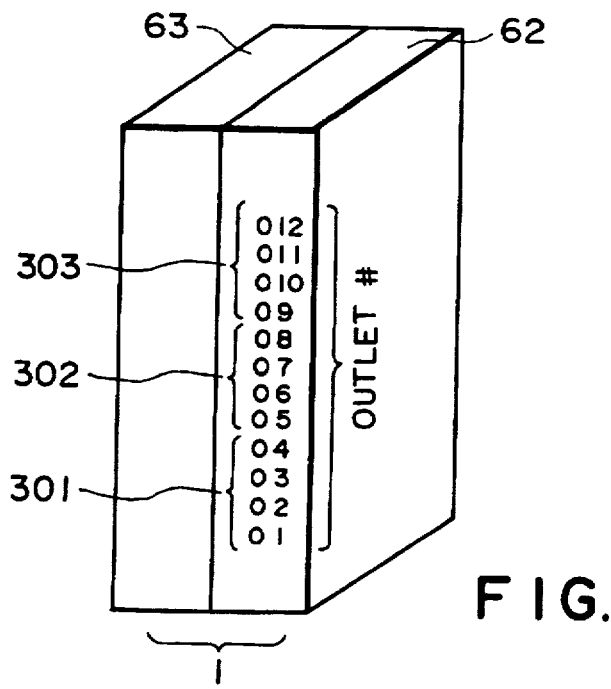
FIG. 36 is a perspective view of a recording head according to the eighteenth embodiment.
FIG. 37 illustrates the recording operation using the recording head of the eighteenth embodiment.

The apparatus of this embodiment is the same as Embodiment 1 (FIG. 1) except for that the recording head has groups of nozzles, which groups provide different ink ejection volumes. FIG. 36 schematically shows the structure of the recording head in this embodiment. For the sake of simplicity of explanation, the recording head comprises three groups of ejection outlets 301, 302 and 303, each group having four successive ejection outlets. Each of the ejection outlets in the first group 301 are designed to eject 5 pl in the volume (ejection outlets Nos. 1–4). Each of the ejection outlets in the second group 302 is designed to eject a droplet of 8 pl (ejection outlet Nos. 5–8). Each of the ejection outlets in the third group 303 is designed to eject a droplet of 11 pl (ejection outlet Nos. 9–12). The ejection outlet groups 301–303 are arranged vertically in the Figure, in other words, the groups are arranged along one line in the sub-scan direction which is substantially perpendicular to the main scan direction along which the recording head is moved.

The recording head 1 comprises base members 62 and 63, and the ejection outlets are opened at the surface of the base plate 62 faced to the recording material 2. In order to produce the recording head 1 at low cost, the conventional manufacturing process can be used substantially as it is. However, in order to permit the use, the volume ratio between the maximum ink droplet and the minimum ink droplet is desirably not more than 3.0. The maximum ink droplet in this embodiment is 11 pl, and the minimum ink droplet is 5 pl. The volume ratio is 2.2, and therefore, the above-described desirable condition is satisfied, so that the recording head can be produced at relatively low cost.

FIG. 37 shows the printing operation. The large outer square frame defines the entire record area of the recording material 2 to be covered by plural scans of the carriage 4. Five recording region (A, B, C, D and E) correspond to the ejection outlet grooves ejecting different volumes of droplet (3 volumes). The width of each of the regions measured in the vertical direction corresponds to the distance of one feed of the recording material 11. In the first scan, ink droplets of 5 pl is ejected using the ejection outlets Nos. 1–4 (301) to the top region A in accordance with the tone level of the image data (tone data), thus effecting dot-printing. Subsequently, the recording material 2 is fed upwardly in the Figure by 63.5 microns (ejection outlet pitch) ×4 (the number of ejection outlets)=254 microns. Thereafter, the second scan is started.

In the second scan, the ejection outlets Nos. 1–4 (group 301) now at the region B eject ink droplets of each 5 pl in accordance with the tone of the image data as in the first scan, thus effecting the dot printing. Simultaneously, the ejection outlets Nos. 5–8 (group 302) now at the region A eject the droplets of the ink on the region A having been scanned by the first scan, in accordance with the tone of the image data. The ejection outlets here each eject 8 pl of the ink. In this recording, the droplet of 8 pl is not shot at the position where the 5 pl ink droplet is not shot in the first scan. After the second scan is completed, the recording material 2 is fed by the same distance, 245 microns, in the upward direction. Thereafter, the third scanning operation is started.

In the third scan, the ejection outlets Nos. 1–4 (301) now in the third region C and ejection outlets Nos. 5–8 (302) now in the region B eject the ink droplets to effect the similar printing as in the second scan. Simultaneously, the ejection outlets Nos. 9–12 (303) now in the region A eject 11 pl ink droplets in accordance with the image data. Similarly, the 11 pl ink droplets are not shot to the positions where the 5 pl and 8 pl droplets are not shot in the first and second scans.

When the third scan is completed, the region C includes two states having 0 pl ink droplet (no ink) per pixel and having 5 pl ink droplet per pixel, respectively. The region B includes three states having 0 pl droplet, 5 pl droplets and 13 pl droplets (=5 pl+8 pl). The region A includes four states having 0 pl droplet, 5 pl droplets, 13 pl droplets (=5 pl+8 pl) and 24 pi (=5 pl+8 pl+11 pl) per pixel, respectively.

Similarly a fourth scan and fifth scan are carried out so that dots are printed on the recording material 11 in accordance with the tone levels of the image data. When the record in the region A expands all over the record area of the recording material 2, and the ejection outlets Nos. 8–12 of the recording head (103) reaches the region E, and the printing operation is carried out. Then, the recording operation is completed.

In this embodiment, the same volume ejection outlets constitute a block, and a plurality of such blocks are provided. However, it is a possible alternative that the ejection outlets providing different volumes of ink droplets may be alternately arranged, with the same advantageous recording effect.

FIG. 37 shows a relation between the reflection image density and the ink volume per pixel of the recorded image on the recording material 2 as described in conjunction with FIG. 37. In the embodiment of FIGS. 36 and 37, level 0 (no ink) provides the reflection density of 0.05 (the reflection density of the recording sheet 2 itself); the first level (I) of 5 pl provides 0.47; the second level (II) of 13 pl provides 1.02; and the third level (III) of 24 pl provides 1.38.

As will be understood, as compared with the method proposed in U.S. Pat. No. 4,746,935, the intervals between adjacent reflection densities are more even, and therefore, the tone property is better. The reflection density at the first level (I) is 0.47 which is equivalent to the reflection density provided by 5 ink droplets (maximum) per pixel in the conventional multi-droplet method, when the maximum levels of the reflection densities in the images are the same. Accordingly, the density levels of the image formed through this embodiment is comparable to the image provided by 5 ink droplet per pixel through the conventional multi-droplet method. As regards the printing speed, this embodiment requires only three overlaying shots per pixel, and the printing speed can be increased by approx. 20%.

The image data (tone level data) in this embodiment are produced by logarithmic correction γ correction and subsequent 4 level error diffusion treatment to the data read from an original image by a monochromatic scanner, for example.

Embodiment 19

Figure 39:
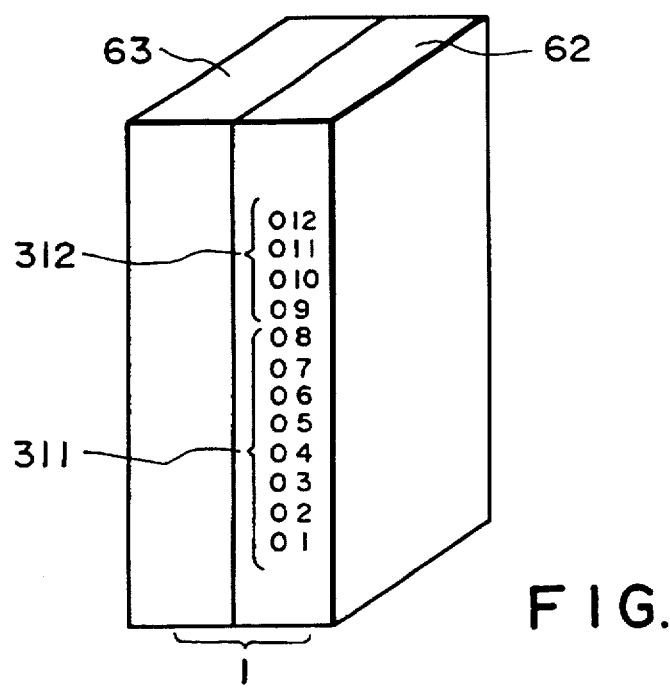
FIG. 39 is a perspective view of a recording head according to a nineteenth embodiment.

FIG. 39 shows the structure of the recording head 1 in Embodiment 19. In this embodiment, the ejection outlets are divided into two groups 311 and 312. The ejection outlets of the group 311 provides 5 pl ink droplets, and the ejection outlets of the group 312 provides 14 pl ink droplets. The number of ejection outlets in the group 311 providing 5 pl ink droplets is 8; and the number of ejection outlets in the group 312 providing 14 pl ink droplets, is 4. Similarly to the Embodiment 18 in FIG. 36, the recording head 1 is mounted on a carriage 4 of the serial type printer. The scanning operation is carried out as shown in FIG. 37, and the halftone image is recorded on the recording material 2 corresponding to the image data.

Referring to FIG. 37, the operation of this embodiment will be described. In the first scan, only the ejection outlets Nos. 4–8 (311) are used to eject the ink droplets of 5 pl each to the pixels which are to receive 24 pl/pixel ink and 10 pl/pixel ink in the region A, and simultaneously, the 5 pl droplets are ejected to approx. 50% of the pixels which are to receive 5 pl/pixel. Then, the recording material is fed upwardly by 254 microns in FIG. 37. Then, the second scan is started.

In the second scan, the ejection outlets Nos. 1–4 (311) in the region B eject the ink droplets as in the first scan. Simultaneously, the ejection outlets Nos. 5–8 (311) now in the region A eject the ink droplets to the pixels which are to receive 5 pl/pixel droplet and which have not received the droplet from the ejection outlets Nos. 1–4 in the first scan. In addition, the ejection outlets Nos. 5–8 eject 5 pl ink droplets to the pixels which are to receive 24 pl/pixel ink and 10 pl/pixel ink. Subsequently, the recording material 2 is fed upwardly by a distance of 254 microns in FIG. 37. Then, the third scan is started.

In the third scan, the ejection outlets Nos. 1–4 and ejection outlets Nos. 5–8 now in the regions C and B, respectively eject the ink droplet of 5 pl as in the second scan. Simultaneously, the ejection outlets Nos. 9–12 (312) now in the region A eject the ink droplets of 14 pl to only such pixels as are to receive 24 pl/pixel ink.

When the third scan is completed, the recording operation is completed in the region A by four volumes of ink droplets, namely 0 pl (no ink), 5 pl, 10 pl and 24 pl droplets. In the region B at this time, 0 pl, 5 pl and 10 pl ink droplets are overlaid per pixel, and in the region C, 0 pl and 5 pl droplets are overlaid per pixel.

Figure 38:
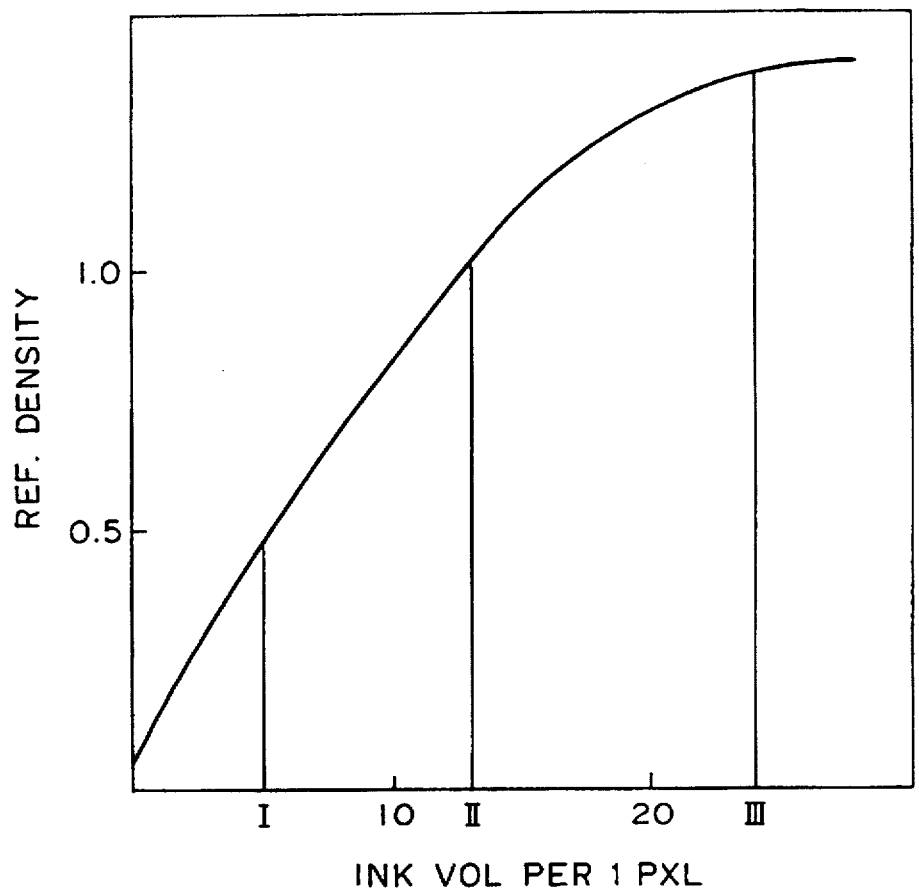
FIG. 38 is a graph of reflection density vs. ink volume per pixel in the eighteenth embodiment.

In the fourth and fifth scans, the similar printing operations are carried out. When the record state of the region A expands all over the record area, the printing operation is completed. In this embodiment, the ink volumes per pixel is 0 pl, 5 pl, 10 pl and 24 pl, and therefore, substantially the same print quality as in Embodiment 1 can be provided, as will be understood from FIG. 38.

Particularly in this embodiment, the pixels which are to receive 5 pl ink per pixel receives the ink selectively (at random, for example) from first group (ejection outlets Nos. 1–4) and second group (ejection outlets Nos. 5–8). This is done in order to reduce the density variation in the direction of the array of the ejection outlets attributable to the manufacturing variation of the recording head. A pixel which is to receive 5 pl/pixel ink is recorded with the ink ejected through a single ejection outlet per pixel. Therefore, if all of 5 pl/pixel pixels are printed by first ink droplets only, the non-uniformity may be conspicuous depending on the nature of the image. In this embodiment, the 5 pl/pixel pixels are recorded by both of the first and second ink droplets to flatten the variation. Therefore, according to this embodiment, the tone record is good without density unevenness.

In both of the Embodiments 18 and 19, a group of ejection outlets providing smaller volumes, is disposed at a lower position, and therefore, when a large volume droplet and a small volume droplet are overlaid with each other, the small volume droplet is first shot. However, the order of record is not limited to this. The opposite arrangement having the large volume ejection outlets are disposed at the lower position, is possible.

In Embodiments 18 and 19, the ejection outlets are arranged in the direction of sub-scan, and one pixel is recorded by overlaying ink droplets from ejection outlets in the different groups providing different volumes of droplet, and therefore, the number of scans for recording one pixel is reduced. The image quality in the high density region and the high light region can be increased substantially without reduction of the recording speed.

In the foregoing embodiment, the volume ratio of the ejected ink droplets are so selected that the tone levels of the pixels overlayingly recorded are different at regular intervals. The large volume ink droplet is always overlaid on the small volume droplet, and therefore, the volume ratio between the maximum droplet and the minimum droplet can be made smaller, and the number of combinations of the different ink droplets is reduced substantially to one half. This makes easier the image signal processing for the selection of the ejection outlets. As a result, the halftone image can be produced relatively at low cost and without increase of the manufacturing cost of the main assembly and the recording head of the apparatus.

In this embodiment, the ejection outlets providing the minimum volume ink droplets may be grouped into plural groups (two, in this embodiment), a pixel to receive one droplet of the minimum volume is recorded selectively by one group is ejection outlet or another, for example, alternately for the adjacent pixels. By doing so, the density variation along the line of the ejection outlets due to the manufacturing variation or the like, can be flattened.

The volume of the ink droplet used in the low density region can be made smaller than the average of n ink volume ejected through n different ejection outlets. Therefore, the high density tone level or levels which are less influential to the tone reproduction can be omitted, and the number of tone levels in the low image density portion which are more important in the tone reproduction can be properly selected. Therefore, the good image can be provided at low cost even if the number of tone levels per pixel is small.

Embodiment 20

The apparatus of this embodiment is the same as with Embodiment 1 except for the recording head has 42 nozzles. The 4 tone gradation recording will be described using the apparatus of this embodiment. One pixel is recorded selectively by 0–3 ink droplets.

Figure 40:
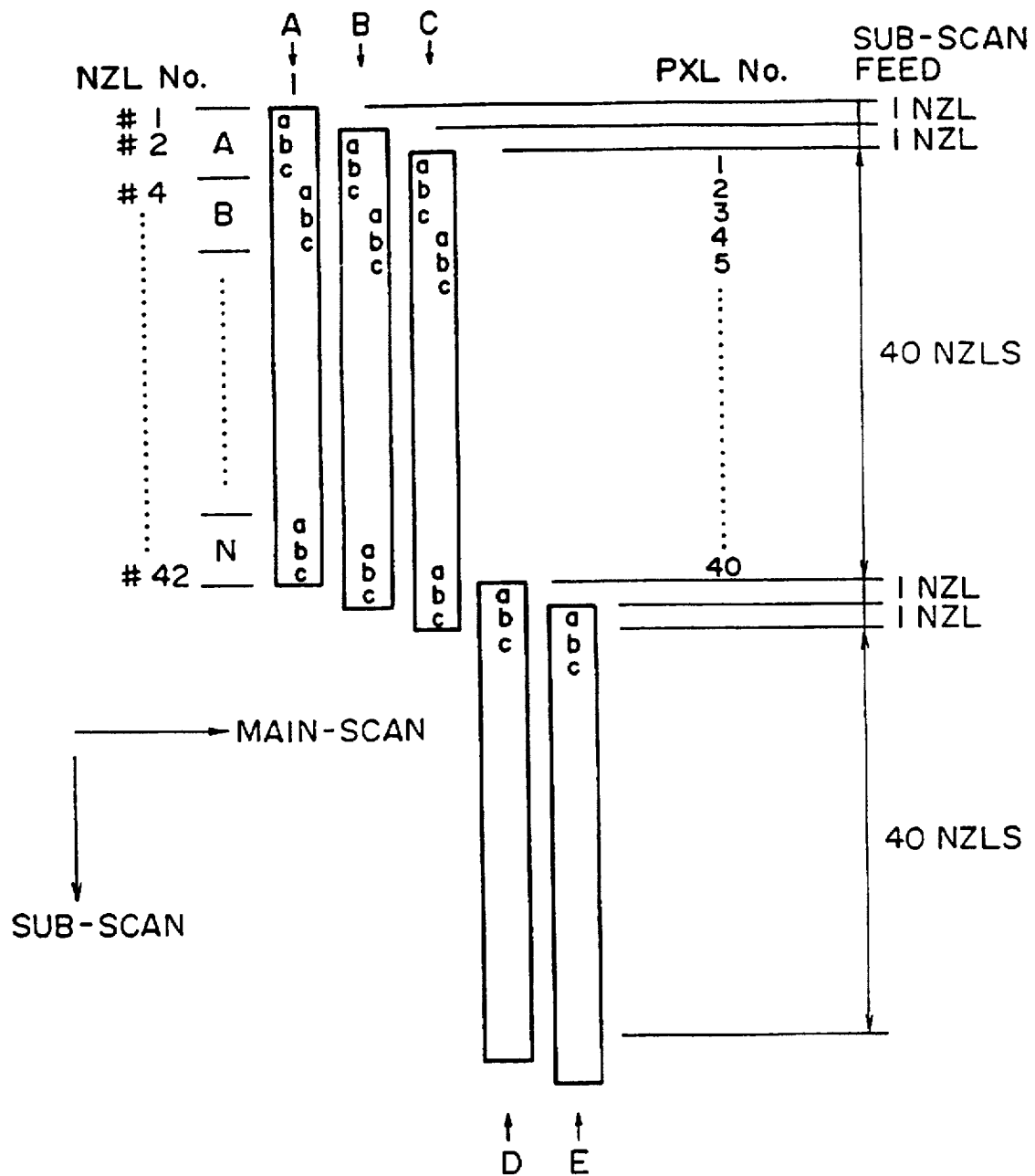
FIGS. 40–44 illustrates the recording methods in the twentieth–twenty-fourth embodiments.

FIG. 40 illustrates the concept of the recording method in this embodiment. The recording head 1 schematically shown, has 42 nozzles arranged vertically in the Figure. For the convenience of explanation, the nozzles are numbered 1, 2, 3, . . . 42, from the top. The 42 nozzles are grouped into 14 blocks each having 3 nozzles. The blocks are named A, B, . . . , N. The nozzles in each block are designated by a–c. In this embodiment, the nozzles a in all of the blocks eject the droplet for a pixel where the image datum is not lower than 1; the nozzles b eject the droplets for a pixel where the image datum is not lower than 2; and the nozzles c eject the droplets where the image datum is at level 3. The recording operation is carried out using only nozzles Nos. 3–42 while the carriage is being moved (A in FIG. 40). As a result, pixels 1–40 from the top of the recording sheet (sub-scan direction) are recorded by 0 or 1 ink droplet.

Then, the recording sheet is fed upwardly by a distance corresponding to one pixel (in the Figure the recording head is shown as being moved relative to the sheet, for the easy understanding, in addition, it is shown by the position deviated in the main scan direction). Then, the recording operation is effected using nozzles Nos. 2–42 (B in FIG. 40). As a result, the nozzles Nos. 2–41, effect the recording for the pixels 1–40. The nozzle No. 42 (nozzle c) effects the recording for the pixels at the position of pixel 41. Subsequently, the recording sheet is further fed upwardly by the distance corresponding to one pixel, and the recording operation is carried out using the nozzles Nos. 1–42 (C in FIG. 40), the nozzle No. 41 (nozzle b) effects the recording for the pixel at the position 41, and the nozzle No. 42 (nozzle c) effects the recording at the position 42. As a result, the nozzles Nos. 1–40 record the pixels 1–40 having been subjected to the previous and further previous recording operations, thus the image is produced by 0–3 dots. For example, the pixel at position 40 is recorded by No. 42 nozzle (nozzle c), No. 41 nozzle (nozzle b) and No. 40 nozzle (nozzle a) in the order named.

Then, the recording sheet is fed upwardly through a distance corresponding to 40 pixels, and the recording operation is carried out by the nozzles Nos. 1–42 (FIG. 3, D, the No. 1 nozzle (nozzle a) effects the recording for the position 41, and No. 2 nozzle (nozzle b) effects the recording for a position 42). Subsequently, the recording sheet is fed upwardly through a distance corresponding to one pixel (FIG. 40, E), and the recording operation is carried out using the nozzles Nos. 2–42. Further, the recording sheet is fed upwardly through a distance corresponding to one pixel, and the recording operation is carried out using the nozzles Nos. 1–42. Then, the recording sheet is fed upwardly through a distance corresponding to 40 pixels, and the similar operations are repeated. By repeating such operations, all of the pixels are recorded by nozzles c, b and a, and the image is formed over the entire surface by 4 tone levels.

At the bottom of the image, the nozzles Nos. 42, No. 41, No. 40, . . . are sequentially stopped for each scanning operation.

Noting particular pixels, the first pixel (position 1) is recorded by the nozzles Nos. 1, 2 and 3; the second pixel is recorded by the nozzles Nos. 2, 3 and 4. In this manner, each pixel is recorded by successive different 3 nozzles, and therefore, the variation in the ink volumes of the nozzles is flattened in the image. As shown in FIG. 40, the pixels at positions 2, 3 and 4, is recorded only by the nozzle No. 4 as regards the image data 1. Therefore, even if No. 5 nozzle ejection is oblique, it is not influential to the resultant image. As regards image datas 2 and 3, if the nozzle No. 5 ejection is deviated, the deviation is influential to the pixels at 3, 4 and 5 in the main scan direction. However, whenever the nozzle No. 5 is used, the No. 4 nozzle is also used, and the influence is reduced as a result.

Various images have been formed through the recording method, and it has been confirmed that clear images without stripes and unevenness can be provided as compared with the conventional recording method in which one pixel is recorded by plural ink droplets ejected by the same nozzle.

Embodiment 21

Figure 41:
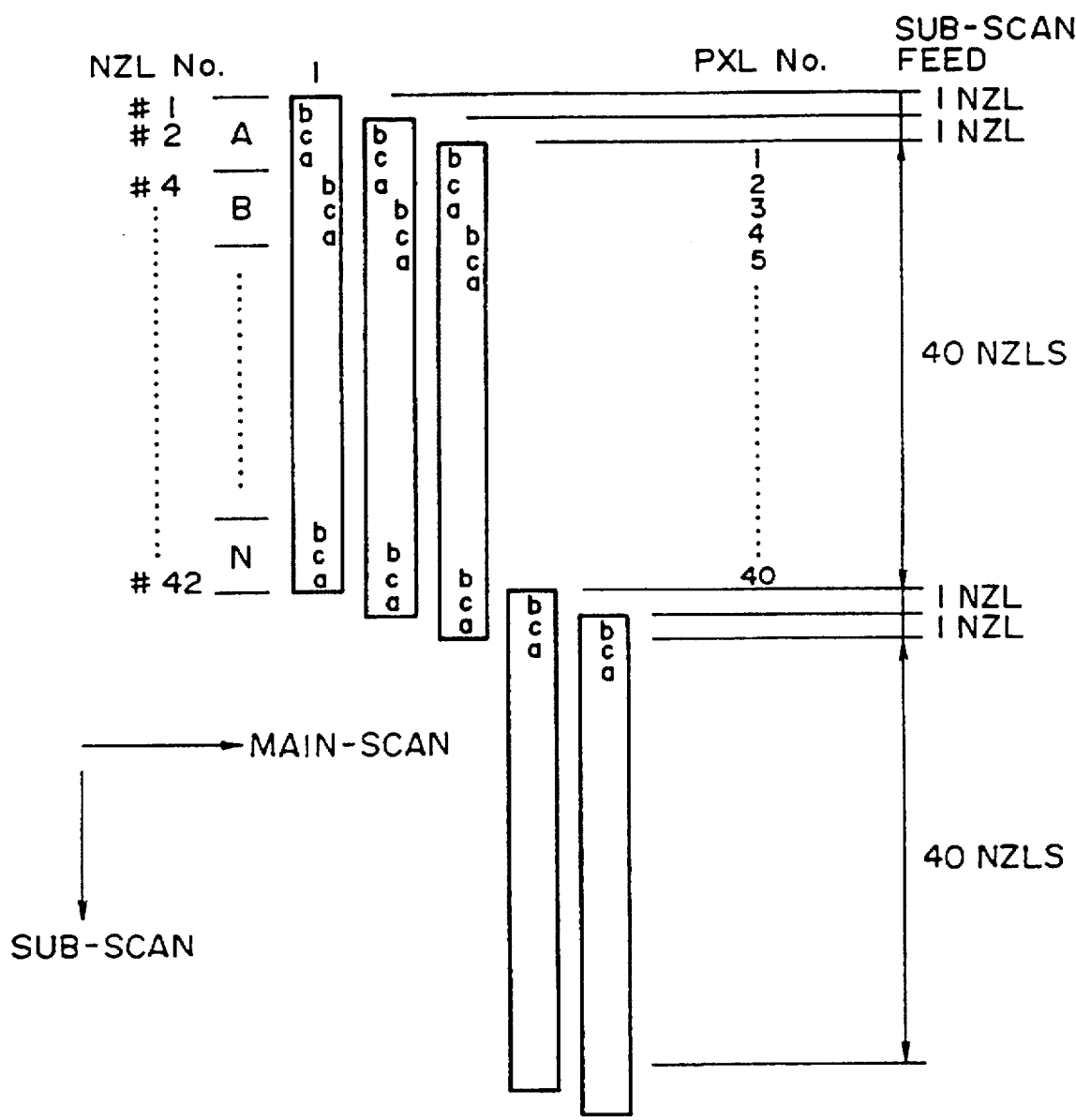

FIG. 41 shows Embodiment 21. The recording head 1 of this embodiment is similar to that of Embodiment 20 in that it comprises 42 ink ejection outlets at the density of 16 nozzles/mm. However, No. 4 nozzle ejects the ink in a deviated direction. In such a case, the nozzle allotment a, b and c in each of the blocks is changed to b, c and a. Then, the nozzles a deal with the image data having a level not lower than 2; the nozzles b deal with the image data having the level 3; and the nozzles c deal with the image data having a level not lower than 1. The feeding in the sub-scan direction is the same as in Embodiment 1. In this embodiment, the stripes appearing in the image at the boundary between block A recording and block B recording, are removed, and a good image was produced.

Embodiment 22

In this embodiment, the recording head 1 is provided with 128 nozzles, and 17 tone gradation recording is effected. That is, the number of droplets per pixel ranges between 0–16, inclusive.

Figure 42:
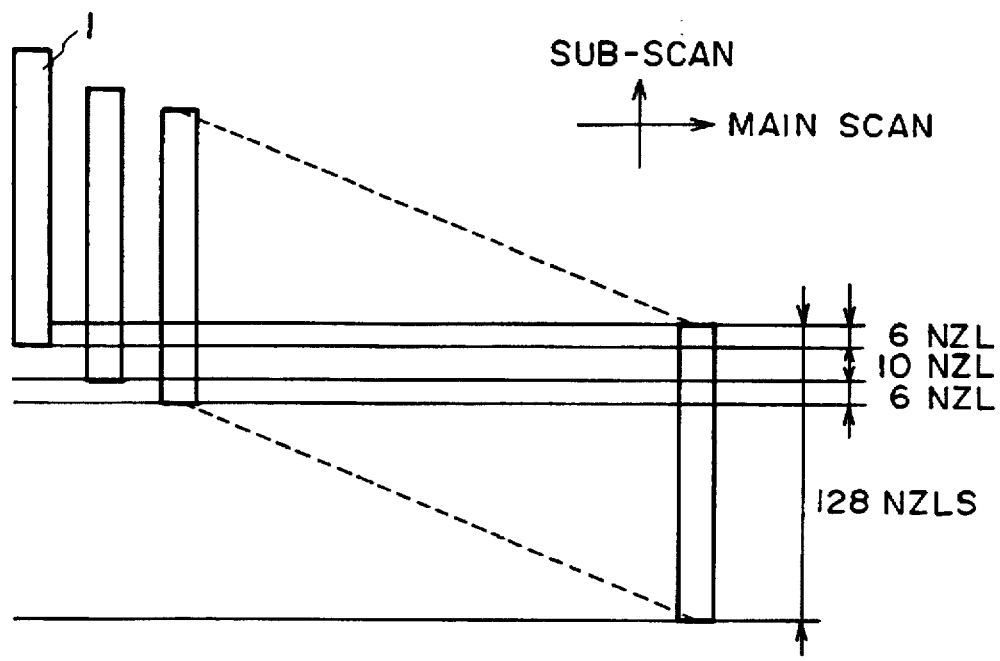

FIG. 42 illustrates the concept of the recording method of Embodiment 22. The schematically shown recording head 1 has 128 nozzles arranged vertically in the Figure. For the convenience of explanation, the nozzles are numbers 1, 2, 3, . . . , 128 from the top.

In operation, the recording operation is carried out using only the nozzles Nos. 123–128 (6 nozzles) while the carriage is being moved. As a result, the pixels at positions 1–6 from the top are recorded by 0 or 1 ink droplet.

Subsequently, the sheet is fed upwardly by a distance corresponding to 10 pixels (in the Figure, the recording head is shown as being moved downwardly relative to the recording sheet, for the convenience of illustration). Then, the recording operation is carried out using the nozzles Nos. 113–128. In this operation, the nozzles Nos. 113–120 effect the recording for the pixels at positions 1–6 having been subjected to the recording operation of the nozzles Nos. 123–128 in the previous scan. The nozzles Nos. 119–128 effect the recording at new positions 7–16. Therefore, the pixels 1–6 are recorded by 0, 1 or 2 ink droplets per pixel.

Thereafter, the recording sheet is fed upwardly through a distance corresponding to 6 pixels. Then, the recording operation is carried out using the nozzles Nos. 107–128. By repeating such recording operations, the pixels at positions 1–8 are recorded by 0–16 droplets, when the 16th record is completed, so that an image having 17 tone gradations or levels can be provided. The same operations are repeated for 17th and subsequent scans, the 17 tone level image can be provided all over the surface. At the bottom of the image, the 6 nozzles and 10 nozzles from the bottom are stopped successively after scan.

Noting the pixel at position 1, for example, the pixel is recorded by ink droplets ejected through 16 different nozzles, namely nozzles Nos. 1, 11, 17, 27, 33, 43, 49, 59, 65, 75, 81, 91, 97, 107, 113 and 123 (the order of the recording actions is the opposite). Therefore, the ink volume variation among the nozzles is flattened on the image, and therefore, the resultant image has less conspicuous stripes and unevenness.

Using the above recording method, various images have been recorded, and it has been confirmed that the images are clear without stripe and unevenness, as compared with the conventional recording method in which a pixel is recorded by plural ink droplets ejected through the same nozzle.

Embodiment 23

Figure 43:
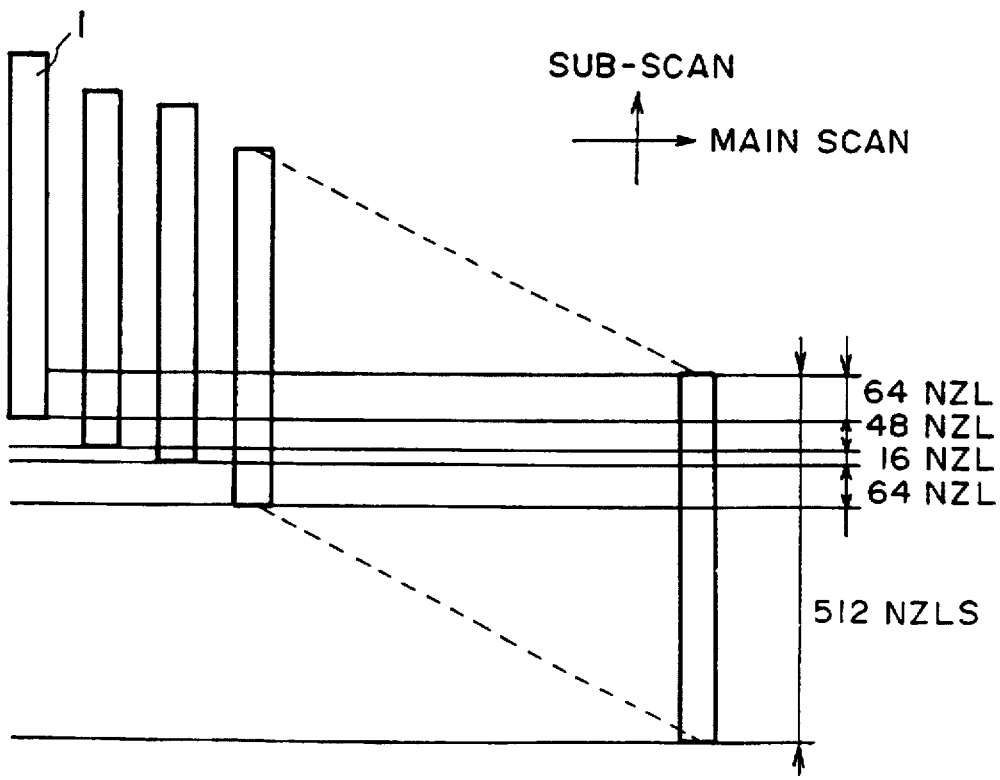

FIG. 43 shows Embodiment 23. The apparatus comprises a recording head 1 having 512 ink ejection outlets arranged at the density of 16 nozzles/mm. The feed amount in the sub-scan direction corresponds to 64 pixels, 48 pixels or 16 pixels. The feeding of these amounts are repeated to effect 13 tone gradation recording.

Embodiment 24

Figure 44:
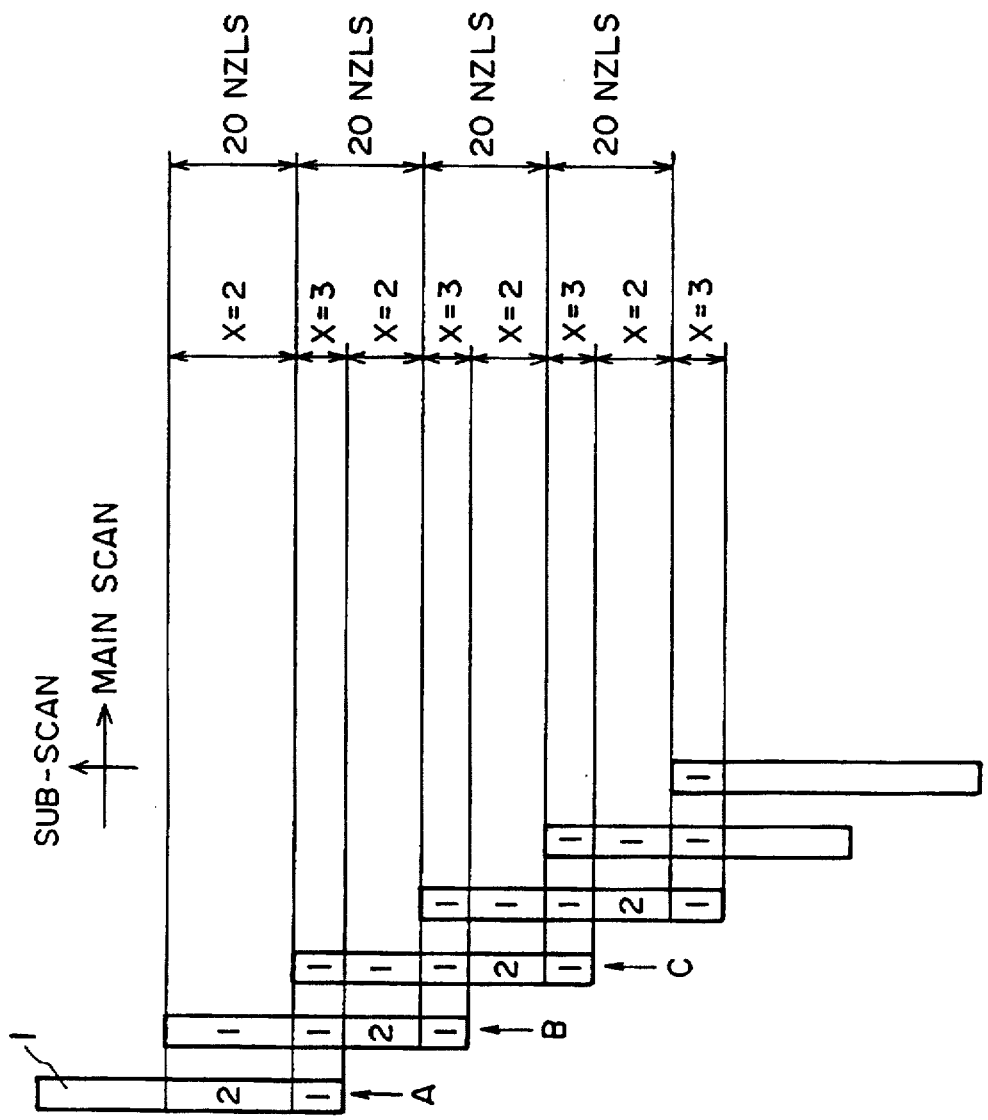

FIG. 44 shows Embodiment 24. The apparatus of this embodiment has a recording head 1 provided with 48 ink ejection outlets arranged at the density of 16 nozzles/mm. 4 tone gradation recording is effected using this head. The recording head 1 is provided with 48 nozzles arranged in the vertical direction on the Figure. For the convenience of explanation, the nozzles are numbered 1, 2, 3, . . . , 48 from the top.

The first recording operation is carried out using only the nozzles Nos. 21–48, while the carriage is moved in the main scan direction (A in the Figure). At this time, the pixels at positions 1–20 (nozzles Nos. 21–40) from the top of the recording sheet, namely the positions where x=2 (x: number of overlaid droplets) are recorded by 2/pixel droplets (maximum), whereas pixels 20–28 from the top of the recording sheet (nozzle Nos. 41–48), namely the positions where the number of overlaid droplets is 3, is recorded by 1/pixel droplet (maximum).

Subsequently, the recording sheet is fed upwardly through a distance corresponding to 20 pixels (in the Figure, the recording head is shown as being downwardly relative to the recording sheet, for the convenience of illustration). Then, the recording operation is carried out using all of the nozzles (B). At this time, the nozzles Nos. 1–28 eject the ink droplet 1/pixel (maximum). The nozzles Nos. 29–40 ejects 2/pixel droplets (maximum). In the rest of the portion (nozzles Nos. 41–48) is recorded by 1/pixel droplet (maximum).

The recording sheet is fed upwardly again through a distance corresponding to 20 pixels. The nozzles Nos. 1–28 eject the droplets at 1 droplet/pixel at the maximum; and the nozzles Nos. 29–40 eject 2 droplets/pixel; and the nozzles Nos. 41–48 eject 1 droplet/pixel (C).

The operations (upward feeding of the recording sheet through the distance of 20 pixels, 1/pixel recording by nozzles Nos. 1–28 and 41–48, and 2/pixel recording by nozzles Nos. 29–40) are repeated. As a result, each of the pixels is recorded by 0, 1, 2 or 3 ink droplets, and therefore, 4 tone gradation image can be provided. At the bottom of the image, the nozzles Nos. 1–20 effect the recording at 1 droplet/pixel at the maximum.

In brief, the maximum number of droplets per pixel is 3, the pixel which is to receive two overlaid droplets receives 0–2 droplets during the first scan and receives 0–1 droplets in the second scan. The pixel which is to receive three overlaid droplets receives 0–1 ink droplets in each scan.

Using the recording method of this embodiment, various images have been formed, and it has been confirmed that the clear images can be provided without stripes and unevenness as compared with the conventional recording method in which plural ink droplets are ejected through 1 nozzle/pixel.

An additional advantage is that it is not required to the sub-scan feed distance is not necessarily constant, and therefore, it is not influenced by the number of nozzles or the nozzle pitch or the like.

Embodiment 25

FIG. 45 shows the structure of the apparatus of Embodiment 25. It comprises an ink jet recording head 7 for selectively ejecting black (Bk), cyan (C), magenta (M) and yellow (Y) ink droplets. The recording head includes a black head unit 71Bk, cyan head unit 71C, magenta head unit 71M and yellow head unit 71Y. The recording head 71 is mounted on a carriage 74, and is movable in the main scan directions along guide rails 75A and 75B by a carriage feeding motor (FIG. 47) which will be described hereinafter. Through ink ejection outlets or nozzles (FIG. 46), black, cyan, magenta or yellow ink droplets are selectively ejected to the recording material (a sheet of paper) 72, so that an image is formed on the recording material 72 in accordance with the input signal. The recording material 72 is wrapped on a platen roller 73, which is rotated by a sheet feeding motor (FIG. 47), so that it is fed in the sub-scan direction crossing with the main scan direction at a predetermined pitch.

As show in FIG. 46, the recording head 71 comprises black, cyan, magenta and yellow head units 71Bk, 71C, 71M and 71Y. In each of the head units, 1–N nozzles 76 are arranged in the sub-scan direction from the carriage 74 side at a predetermined regular intervals $p_0$. In the Figure, "Bi" indicates i-th nozzle for the black color. Similarly, "Ci", "Mi" and "Yi" indicates the i-th nozzles for the cyan color, the magenta color and the yellow color, respectively.

Figure 47:
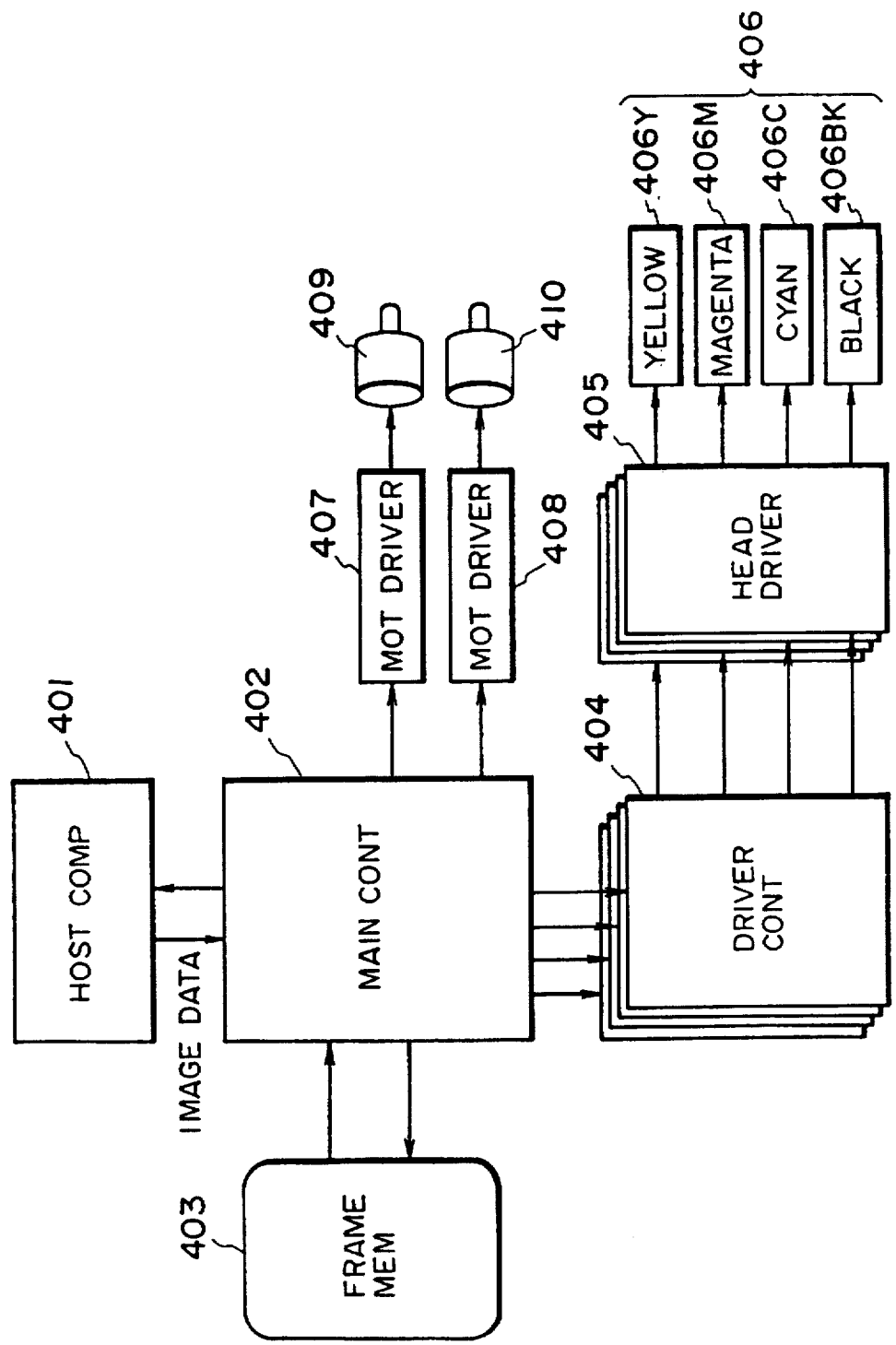
FIG. 47 is a block diagram of a control system for an ink jet recording apparatus.

FIG. 47 shows the control circuit for the apparatus of this embodiment. It corresponds to FIG. 12. In FIG. 47, the recording head 406 includes four color head units 406Y, 406M, 406C and 406BK. Correspondingly, the driver controller 404 and the head driver 405 are provided for the four colors. In this embodiment, high quality color images can be recorded.

Figure 48:
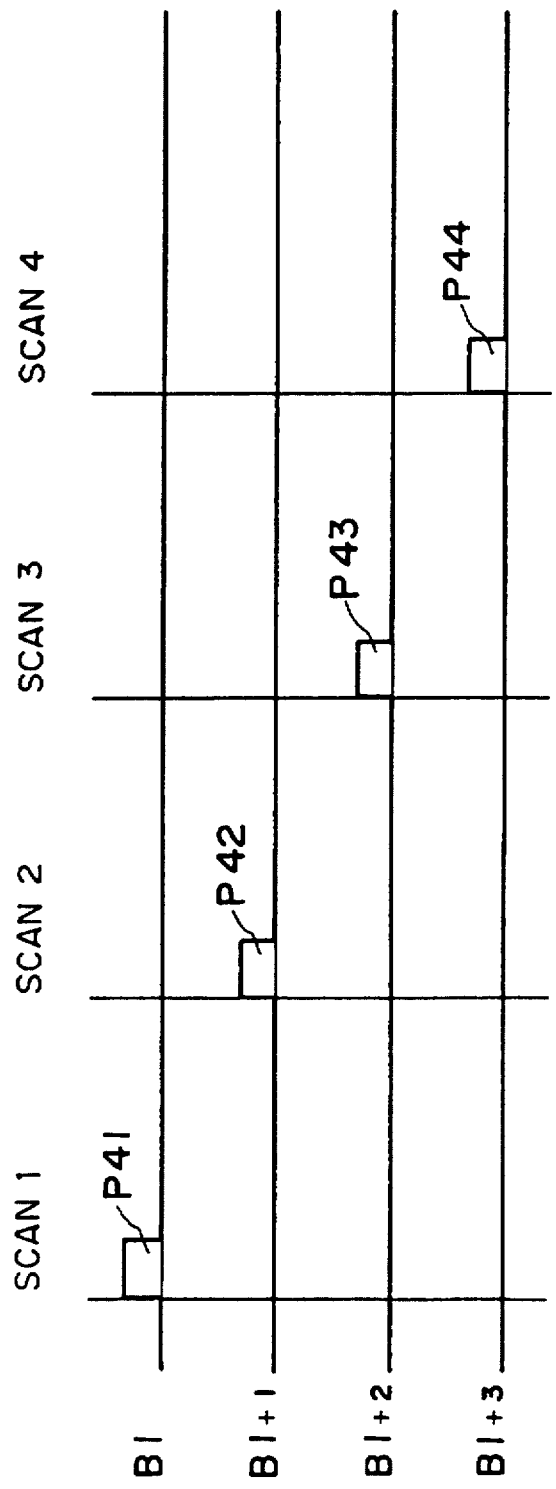
FIG. 48 is a timing chart of ejection signals.

FIGS. 48 and 49, similarly to Embodiment 20 in conjunction with FIG. 40, illustrate the head 71 drive timing and picture element recording process through the multi-scan system in which four droplets are overlaid substantially at the same position at the maximum. The multi-scan system is such that a plurality of droplets are shot substantially at the same position to provide one pixel having a tone gradation. However, depending on the level of the tone gradation, one pixel is provided by one droplet.

When a nozzle Bi scans (scan 1) a selected position 503 on the recording material 72, an ejection signal P41 is selectively applied to the ejection means in the nozzle Bi (heat generating element, for example) so that the liquid droplet Di is ejected through the nozzle Bi (FIG. 49 at portion (a)). After the scan 1 operation, the recording material is fed by one pitch $p_0$ which is the same as the nozzle interval in the sub-scan direction. Subsequently, the nozzle Bi+1 scans the scanning line along which the liquid droplet Di has been ejected (scan 2), during which the nozzle Bi+1 ejects the liquid droplet Di+1 by application of a selective ejection signal P42 so as to overlay the droplet Di+1 on the pixel 504 already having the droplet Di on the recording material 72 (FIG. 49 at portion (b)). After the second scan, the recording material 72 is fed in the sub-scan direction at the pitch $p_0$ equal to the nozzle interval. Then, the nozzle Bi+2 scans the scanning line along which the liquid droplets Di have been ejected (scan 3), during which an ejection signals P43 is selectively applied to eject the liquid droplet Di+2 through the nozzle Bi+2 (FIG. 49 at portion (c)). Similarly, the recording material 72 is fed through the pitch $p_0$. Then, during the scanning by the nozzle Bi+3 (scan 4), an ejection signal P44 is applied so that the liquid droplet Di+3 is ejected through the nozzle Bi+3 (FIG. 49 at portion (d)). Thus, the recording of the pixel 505 is completed (FIG. 49 at portion (e)).

After the completion of scan 4, the recording material 72 is fed through the distance $(N-3) \times p_0$ (N: the number of nozzles). Then, the pixel formation is started by the liquid droplet through the nozzle Bi. In the above process, the size of the dot in the pixel on the recording material (size of the recorded dot of the ink) can be changed by application or non-application of the ejection signal P41, P42, P43 and P44, so that plural tone gradations can be expressed.

Figure 50:
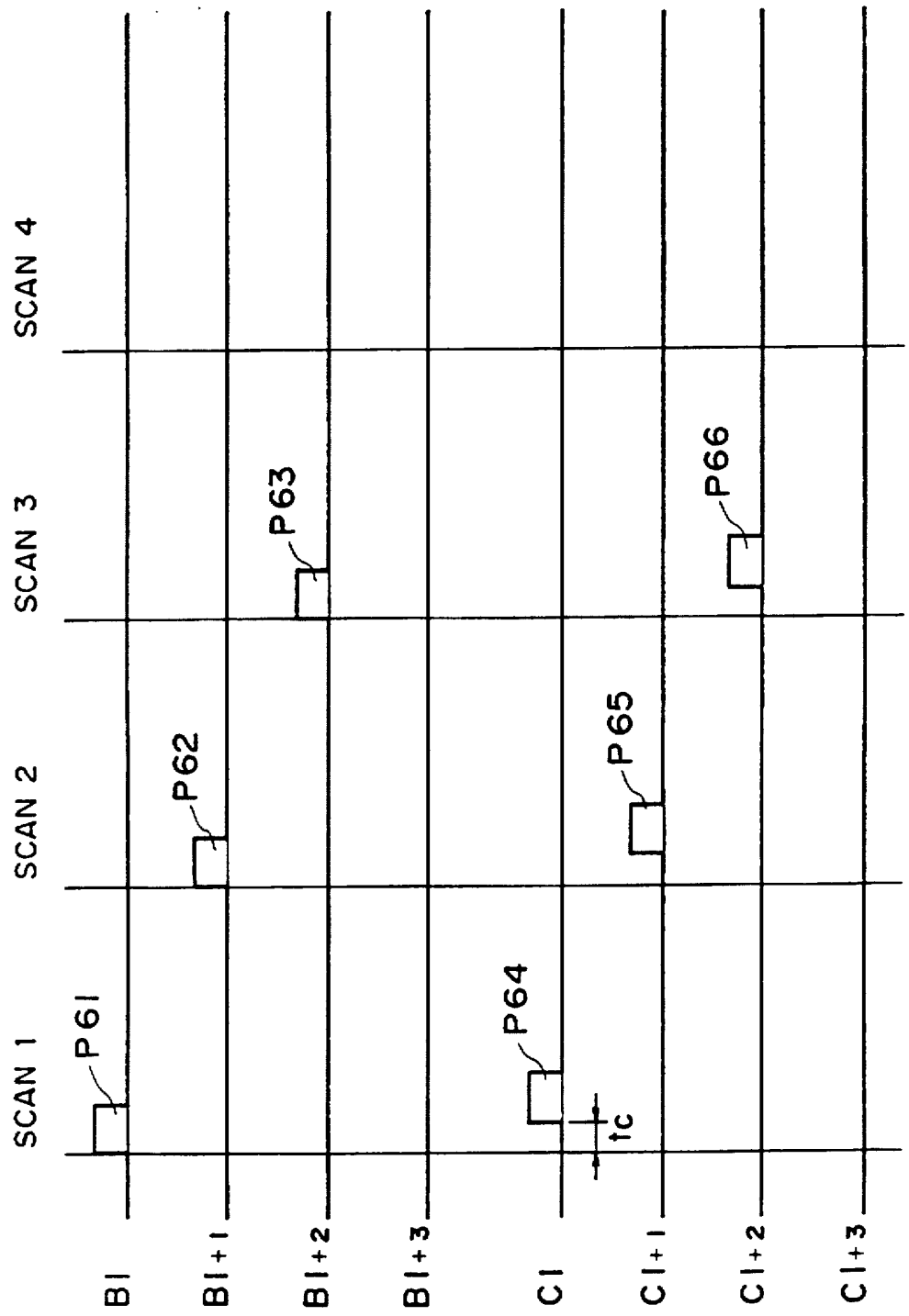
FIG. 50 is a timing chart of ejection signals in a comparison example.

FIGS. 50 and 51 show a comparison example in which the drive timing and the image forming process are illustrated when the black and cyan pixels are formed adjacent to each other by 3 droplets respectively on the recording material 72 using the same timing as in FIG. 48. In scan 1, the black liquid droplet is ejected through nozzle Bi in response to ejection signal P61, so that a pixel 711 is recorded. After elapse of predetermined time period tc, a cyan liquid droplet is ejected through a nozzle Ci in response to an ejection signal P64 so that a pixel 721 is recorded adjacent to the pixel 711. Similarly, in scan 2, the ejection signals P62 and P65 are applied, and the liquid droplets ejected through nozzles Bi+1 and Ci+2 are overlaid on the pixels 711 and 721. At this time, each of the black and cyan droplets on the recording material 72 have such sizes out of contact from each other, and therefore, the black pixel and cyan pixel are formed without color mixture. When, however, the ejected droplets are deposited by ejection signals P63 and P66 in the scan 3, the black color and the cyan color inks which have not yet completed seeping in contact with each other as a result of expansions of the dots, so that partly mixed pixel 721 results. This occurs in the wide part of the image.

Figure 52:
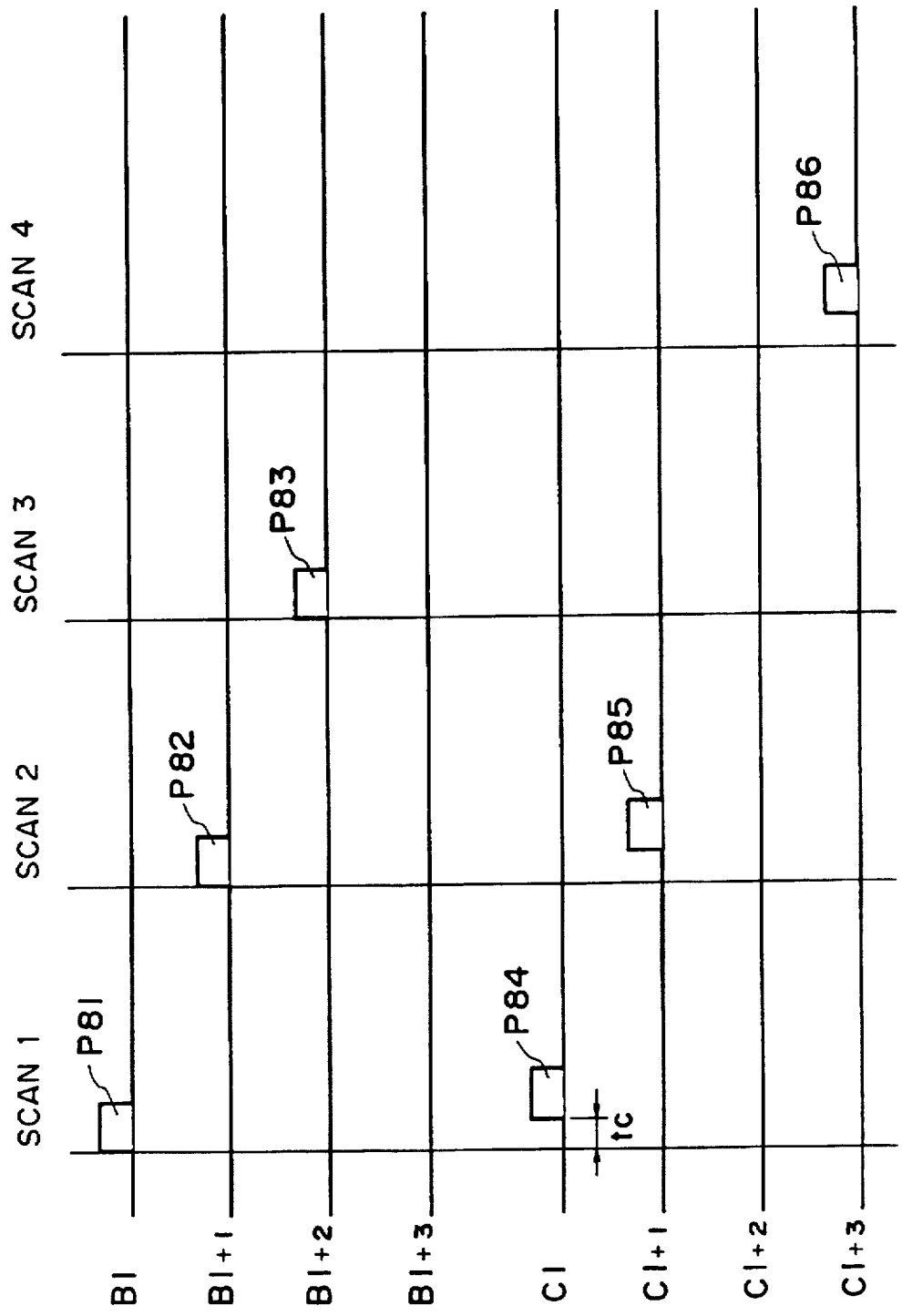
FIG. 52 is a timing chart of ejection signals according to the twenty-fifth embodiment of the present invention.

FIGS. 52 and 53 show the drive timing and the image formation process when the black and cyan pixels are formed by respectively three droplets on the recording material 72 through the multi-scan recording method of this embodiment. In this embodiment, both of the black and cyan droplets are not ejected in the scan 3, but only the black droplet is ejected in response to ejection signal P83 (FIG. 52) and is overlaid on the pixel 912 recorded by the first and second scan to provide a pixel 913 (FIG. 53). At this time, the cyan color does not expand on the recording material 72, and therefore, the ink is not mixed. Subsequently, in the scan 4, the cyan droplet is ejected by the application of the ejection signal P86 in the scan 4 (FIG. 52). At this time, the cyan dot at the pixel 923 expands to such an extent that it becomes in contact with the black dot at the pixel 913 (FIG. 53). However, the black ink on the pixel 913 ejected in the scan 3, has already sufficiently seeped into the recording material, and therefore, the mixture as shown in FIG. 51 does not occur. Through the above process, the recording of the adjacent pixels 913 and 912 is completed. Thus, the color mixture can be reduced, and therefore, the image quality is improved.

In this embodiment, it is a possible alternative that the cyan droplet is ejected in the scan 3, and the black droplet is ejected in the scan 4. It is also a possible alternative that the scan in which the different color ink ejections are prevented from being carried out simultaneously, is not limited to the scans 3 and 4, but may be applied to the other scan or scans. Generally, the color mixture tends to occur with increase of the number of liquid droplet shots for the same pixel, and therefore, it is preferable that the scan in which the different color ink droplets are not simultaneously ejected, is applied to the latter part of the scans for the same pixel recording.

When adjacent black and cyan color pixels are recorded by four droplets, respectively on the recording material 72 through the multi-scan recording method, it is possible that a fifth scan may be added without feeding the recording material 72 in addition to the scans of FIG. 52. By doing so, the expansion timing of the different color ink dots which are adjacent on the recording material 72 may be deviated, thus reducing the color mixture.

Embodiment 26

Figure 54:
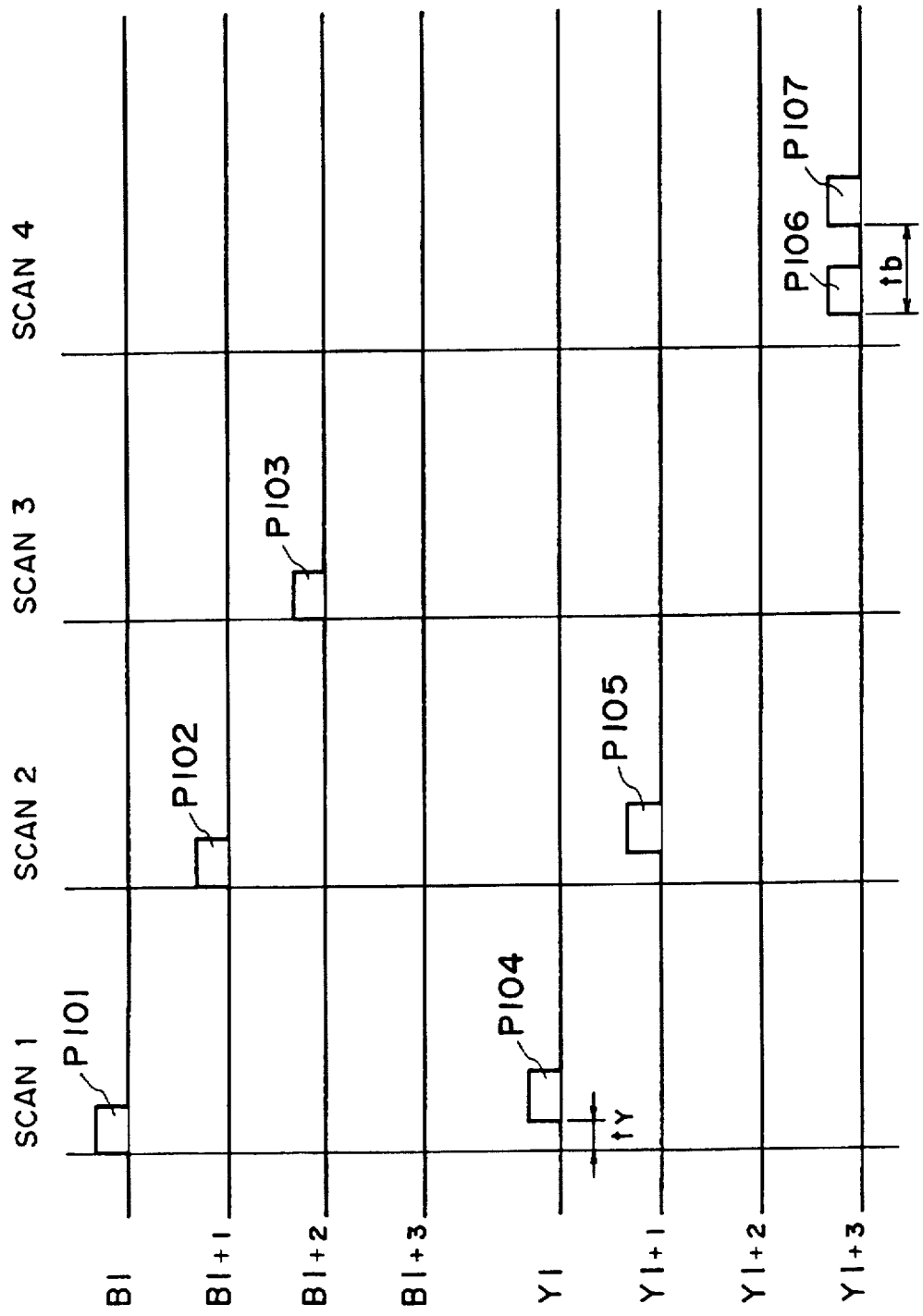
FIGS. 54 and 55 are timing charts of ejection signals in twenty-sixth and twenty-seventh embodiments of the present invention.

FIG. 54 shows the drive timing according to Embodiment 26. In this embodiment, a black dot by three droplets and a yellow dot by four droplets are formed at adjacent pixels on the recording material 72. In this embodiment, in the scans 1, 2 and 3, the ejecting means in the black nozzles Bi, Bi+1 and Bi+2 are supplied with ejection signals P101, P102 and P103, respectively, by which the nozzles eject the black liquid droplet to record the black pixel. The yellow pixel is recorded in the different manner. In scans 1 and 2, the ejection means in the yellow nozzles Yi and Yi+1 are supplied with ejection signals P104 and P105, by which the liquid droplets are ejected through the nozzles to record the yellow pixel. At this stage, because of the balance of the size of the dots of these colors, the black dot and the yellow dot are not merged or mixed, as shown in FIG. 53. In the scan 3, the droplets to be overlaid on the yellow pixel by the ejection signals P104 and P105 are not ejected, and therefore, the yellow dot does not expand.

Subsequently, the ejection means in the yellow nozzle Yi+3 is supplied with ejection signals P106 and P107 in the scan 4, continuously but with a time interval Tb not resulting the conspicuous image disturbance. By doing so, two yellow liquid droplets are continuously ejected through the nozzle Yi+3, and they are overlaid on the pixel recorded in response to the ejection signals P104 and P105. By the shots of the two droplets, the yellow pixel is recorded by 4 droplets. At this time, the yellow pixel expands to such an extent as to be in contact with the adjacent black dot. However, the black ink seeps into the recording material or it is fixed before the scan 4, and therefore, they are not mixed on the recording material 72. Therefore, the mixture shown in FIG. 51 can be avoided.

From the standpoint of stabilized ejection, it is preferable that the record interval tb between the ejection signals P106 and P107 is preferably not less than refilling time of the nozzle Yi+3 and sufficiently shorter than the recording head movement period between adjacent yellow pixels to be recorded by the nozzle Yi+3 in the scanning direction. The configuration of the ejection signals continuously applied to the ejection means in the same nozzle in a single scan for recording one pixel, the number of the groups, the profile of the ejection signal, the applicating timing or the like are properly determined by one skilled in the art in consideration of the ink seeping properly, ink fixing property, the nature of the image, the ejection property of the recording head or the like.

For example, where a black dot with four droplets and a yellow dot with four droplets are formed at adjacent pixels, the ejection signals are applied in the scans 1 and 2 to eject four black droplets in total, and thereafter, in the scans 3 and 4, four yellow droplets in total are ejected onto the recording material.

Embodiment 27

Figure 55:
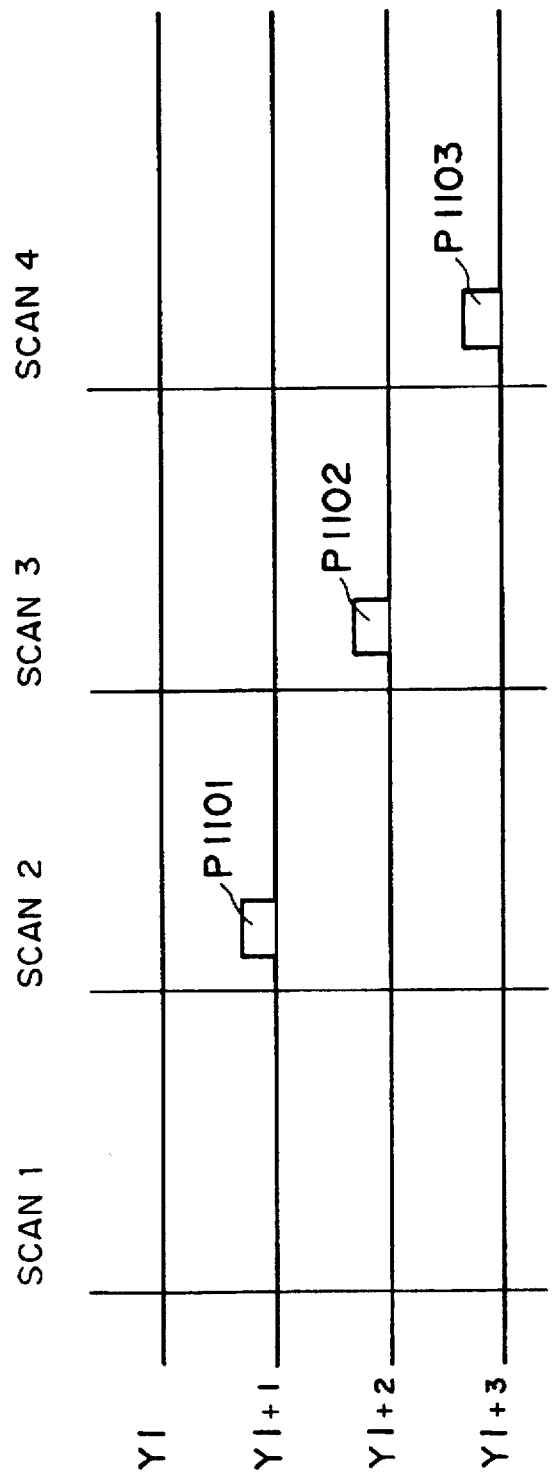

FIGS. 55 and 58 show the drive timing and the image forming process in Embodiment 27. In this embodiment, three yellow droplets dot is formed adjacent, in the sub-scan direction, to a black pixel at which three black droplets are already received but do not seep into the recording material at high speed. The recording method is multi-scan type.

In this embodiment, the yellow droplet ejection timing only is modified when the yellow pixel is recorded after the scanning operation for the black recording for the pixel 1211 is completed and after the sheet is fed by $(N-3) \times p_0$ is carried out. More particularly, the liquid droplet is not ejected through the nozzle Yi in the scan 1. Next, in the scans 2, 3 and 4, the ejection means in the nozzles Yi+1, Yi+2 and Yi+3 are supplied with ejection signals P1101, P1102 and P1103, so that a pixel 1223 is recorded by yellow liquid. In this manner, the yellow dot recording and expansion thereof at a pixel adjacent to the black pixel 1211 is deviated in the timing to permit or promote the fixing of the black dot in the pixel 1211, and therefore, the color mixture can be effectively prevented.

In the Embodiments 25–27, the combination of the colors, and the scanning numbers of the like are not limiting. Also, the direction of the recording material feed is not limiting. The recording method of these embodiments may be used selectively only when the color mixture occurs due to the liquid overlaying nature of color inks at one pixel. According to these embodiments, the desired effects can be obtained without particular limitation to the pattern of the pixels on the recording material. In the foregoing descriptions of the embodiments, the adjacent pixels are to be formed one ink color, respectively, but the present invention is effective when at least one of the pixels is to be recorded by plural color inks (mixture of color).

In Embodiments 25–27, one pixel is recorded by plural scans and plural droplets using a recording head having plural nozzles. In this case, the method comprises a first scanning step in which the liquid droplets are ejected selectively through the ejection outlets and a second scanning step in which the liquid is not ejected through the ejection outlets, in which when different color pixels are adjacent to each other on the recording material, the first scanning step is executed after the second scanning step at the time of at least one of the two color dots. Therefore, after the liquid is sufficiently seeped in the recording material or fixed on the recording material, the liquid droplet is deposited on the adjacent pixel, so that the color mixture can be prevented, and the good color images can be provided.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

The present invention is not limited to the thermal type ink jet system but is applicable to the other type system such as piezoelectric ink jet system.

The recording material is not limited to the paper but is applicable to cloth such as the one for necktie.

While the invention has been described with reference to the structures disclosed herein, it is not confined to the details set forth and this application is intended to cover such modifications or changes as may come within the purposes of the improvements or the scope of the following claims.

What is claimed is:

1. A liquid jet recording method of recording on a recording material with liquid droplets discharged through n (n≧2) scanning nozzles arranged at a first pitch p in a width measured in a direction of a sub-scan, comprising the steps of:

performing a first main scan by relative movement between the n scanning nozzles and the recording material in which each of a plurality of pixels are recorded with at least one of the liquid droplets through one of the n scanning nozzles, wherein a number of the liquid droplets used to record each pixel corresponds to respective tone level signals and is not more than k where k≧1;

performing a sub-scan by a relative movement between the n scanning nozzles and the recording material in a direction substantially transverse to a direction of the first main scan, in which a distance s of the relative movement in the substantially transverse direction is less than the width; and performing a second main scan in which each of the plurality of pixels is recorded with at least one of the liquid droplets through a different one of the n scanning nozzles, the number of the liquid droplets used to record each of the plurality of pixels in the second main scan corresponding to the respective tone level signals and being not more than k;

wherein g is a number of tone levels and g≧3, and wherein the steps of performing the sub-scan and the second main scan are performed for at least (g−1)/(k−1) times so as to record g tone images by discharging substantially a same volume of the liquid droplets of which a maximum number is g−1, for each of the plurality of pixels.

2. A method according to claim 1, wherein the liquid droplets are not discharged during at least one of said first and said second main scan steps.

3. A method according to claim 1, wherein scanning nozzles are operated in accordance with a scheme such that the scanning nozzles are operated at substantially even frequencies among the n scanning nozzles.

4. A method according to claim 1, wherein scanning nozzles to be operated are selected at each second main scan step in accordance with the pitch of the n scanning nozzles.

5. A method according to claim 1, wherein plural liquid droplets are deposited for a pixel by one or more of the first main scan step and the second main scan steps.

6. A method according to claim 1, wherein a volume of the liquid droplets discharged during the first main scan is different than the volume of the liquid droplets discharged during a subsequent one of the second main scans.

7. A method according to claim 1, wherein an amount of the liquid droplets discharged during an initial sub-scan is different than the amount of the liquid droplets discharged during a subsequent sub-scan.

8. A method according to claim 1, wherein in each of the n scanning nozzles, thermal energy is used to cause a change of state in a liquid to discharge the liquid droplet through the nozzle.

* * * * *

UNITED STATES PATENT AND TRADEMARK OFFICE
CERTIFICATE OF CORRECTION

PATENT NO. : 5,777,640
DATED : July 7, 1998
INVENTOR(S) : SHIOYA ET AL.

It is certified that error appears in the above-indentified patent and that said Letters Patent is hereby corrected as shown below:

On the title page: Item

UNITED STATES PATENT [19]

"Shioya et al." should read --Shioya--.

Inventors: [75]

"Inventors: Makoto Shioya, Tokyo, Yasuyuki Tamura; Hiroto Takahashi, both of Yokohama; Masayoshi Tachihara, Chofu; Tadashi Yamamoto; Genji Inada, both of Yokohama; Tatsuo Kimura, Kawasaki; Jun Ashiwa, Yokohama, all of Japan"

should read --Inventor: Makoto Shioya, Tokyo, Japan--.

Title [54]

"MAIN-SCAN" should read --MAIN SCAN--.

UNITED STATES PATENT AND TRADEMARK OFFICE
CERTIFICATE OF CORRECTION

PATENT NO. : 5,777,640
DATED : July 7, 1998
INVENTOR(S) : SHIOYA ET AL.

Page 2 of 5

It is certified that error appears in the above-indentified patent and that said Letters Patent is hereby corrected as shown below:

References Cited [56]

FOREIGN PATENT DOCUMENTS

"2004523     1/1990     Japan" should read

--2-4523     1/1990     Japan--.

COLUMN 1

Line 4, "MAIN-SCAN" should read --MAIN SCAN--.

COLUMN 6

Line 13, "is a side view" should read --are side views--.

Line 17, "FIG. 51 is a top plan view" should read --FIGS. 51(a)-51(c) are top plan views--.

Line 22, "FIG. 53 is a top plan view" should read --FIGS. 53(a)-53(d) are top plan views--.

UNITED STATES PATENT AND TRADEMARK OFFICE
CERTIFICATE OF CORRECTION

PATENT NO. : 5,777,640　　　　　　　　　Page 3 of 5
DATED : July 7, 1998
INVENTOR(S) : SHIOYA ET AL.

It is certified that error appears in the above-indentified patent and that said Letters Patent is hereby corrected as shown below:

Line 27, "FIG. 56 is a top plan view" should read --FIGS. 56(a)-56(d) are top plan views--.

COLUMN 13

Line 28, "portion 8)" should read --portion B)--.

COLUMN 16

Line 1, "articular" should read --particular--.

COLUMN 28

Line 39, "49," should read --49(a)-49(e),--.

COLUMN 29

Line 16, "51" should read --51(a)-51(c)--.
Line 38, "53" should read --53(a)-53(d)--.

UNITED STATES PATENT AND TRADEMARK OFFICE
CERTIFICATE OF CORRECTION

PATENT NO. : 5,777,640          Page 4 of 5
DATED : July 7, 1998
INVENTOR(S) : SHIOYA ET AL.

It is certified that error appears in the above-indentified patent and that said Letters Patent is hereby corrected as shown below:

Line 46, "(FIG. 53)." should read --(FIG. 53(c))--.

Line 53, "53)." should read --53(d)).--.

Line 55, "FIG. 51" should read --FIG. 51(c)--.

COLUMN 30

Line 29, "FIG. 53." should read --FIG. 53(b).--.

Line 57, "applicating" should read --application--.

UNITED STATES PATENT AND TRADEMARK OFFICE
CERTIFICATE OF CORRECTION

PATENT NO.  : 5,777,640
DATED       : July 7, 1998
INVENTOR(S) : SHIOYA et al

It is certified that error appears in the above-identified patent and that said Letters Patent is hereby corrected as shown below:

COLUMN 34

Line 20, "(g-1)/(k-1)" should read -- (g-1)/k-1 --.

Signed and Sealed this

Second Day of March, 1999

Attest:

Q. TODD DICKINSON

*Attesting Officer*  *Acting Commissioner of Patents and Trademarks*